(12) United States Patent
Luo et al.

(10) Patent No.: US 12,296,323 B2
(45) Date of Patent: May 13, 2025

(54) PHOSPHORUS-MODIFIED MFI-STRUCTURED MOLECULAR SIEVE, CATALYTIC CRACKING AUXILIARY AND CATALYTIC CRACKING CATALYST CONTAINING PHOSPHORUS-MODIFIED MFI-STRUCTURED MOLECULAR SIEVE, AND PROCESSES FOR PREPARING THE SAME

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Yibin Luo, Beijing (CN); Chengqiang Wang, Beijing (CN); Ying Ouyang, Beijing (CN); Enhui Xing, Beijing (CN); Xingtian Shu, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 252 days.

(21) Appl. No.: 17/996,187

(22) PCT Filed: Apr. 13, 2021

(86) PCT No.: PCT/CN2021/086824
§ 371 (c)(1),
(2) Date: Oct. 13, 2022

(87) PCT Pub. No.: WO2021/208885
PCT Pub. Date: Oct. 21, 2021

(65) Prior Publication Data
US 2023/0191380 A1    Jun. 22, 2023

(30) Foreign Application Priority Data

Apr. 13, 2020 (CN) .......................... 202010283498.2
Oct. 28, 2020 (CN) .......................... 202011169092.8
Oct. 29, 2020 (CN) .......................... 202011175729.4

(51) Int. Cl.
*B01J 29/80* (2006.01)
*B01J 21/16* (2006.01)
(Continued)

(52) U.S. Cl.
CPC .............. *B01J 29/80* (2013.01); *B01J 21/16* (2013.01); *B01J 27/16* (2013.01); *B01J 29/084* (2013.01); *B01J 29/40* (2013.01); *B01J 29/85* (2013.01); *B01J 35/647* (2024.01); *B01J 37/0018* (2013.01); *B01J 37/0072* (2013.01); *B01J 37/04* (2013.01); *B01J 37/06* (2013.01); *B01J 37/08* (2013.01); *B01J 37/28* (2013.01); *C01B 39/026* (2013.01); *C01B 39/38* (2013.01); *C01B 39/54* (2013.01); *C10G 11/05* (2013.01); *B01J 2029/062* (2013.01); *B01J 2229/183* (2013.01); *B01J 2229/37* (2013.01); *C10G 2300/1044* (2013.01); *C10G 2300/107* (2013.01); *C10G 2300/1074* (2013.01); *C10G 2300/205* (2013.01); *C10G 2300/206* (2013.01); *C10G 2300/301* (2013.01); *C10G 2300/304* (2013.01);
(Continued)

(58) Field of Classification Search
CPC ... B01J 29/80; B01J 21/16; B01J 27/16; B01J 29/084; B01J 29/40; B01J 29/85; B01J 35/647; B01J 37/0018; B01J 37/0072; B01J 37/04; B01J 37/06; B01J 37/08; B01J 37/28; B01J 2029/062; B01J 2229/183; B01J 2229/37; B01J 35/30; B01J 2229/186; C01B 39/026; C01B 39/38; C01B 39/54; C01B 39/10; C10G 11/05; C10G 2300/1044; C10G 2300/107; C10G 2300/1074; C10G 2300/205; C10G 2300/206; C10G 2300/301; C10G 2300/304; C10G 2300/308; C10G 2400/20; Y02P 20/52; C01P 2002/85; C01P 2006/16
See application file for complete search history.

(56) References Cited

U.S. PATENT DOCUMENTS

| | | | |
|---|---|---|---|
| 3,758,403 A | 9/1973 | Rosinski et al. | |
| 3,972,832 A | 8/1976 | Butter et al. | |
| 5,171,921 A | 12/1992 | Gaffney et al. | |
| 5,951,963 A * | 9/1999 | He | B01J 29/85 423/709 |
| 5,997,728 A | 12/1999 | Adewuyi et al. | |

FOREIGN PATENT DOCUMENTS

| | | | |
|---|---|---|---|
| CN | 1325940 A | * | 12/2001 |
| CN | 101759199 A | | 6/2010 |

(Continued)

OTHER PUBLICATIONS

CN 1325940 translation (Year: 2001).*
Cn 106140270A translation (Year: 2016).*

*Primary Examiner* — Randy Boyer
*Assistant Examiner* — Juan C Valencia
(74) *Attorney, Agent, or Firm* — NKL Law; Allen Xue

(57) ABSTRACT

A phosphorus-modified MFI-structured molecular sieve is characterized in that the molecular sieve has a K value, satisfying: 70%≤K≤90%; for example, 75%≤K≤90%; further for example, 78%≤K≤85%. The K value is as defined in the specification. A cracking auxiliary or cracking catalyst contains the phosphorus-modified MFI molecular sieve.

27 Claims, No Drawings

(51) Int. Cl.
*B01J 27/16* (2006.01)
*B01J 29/06* (2006.01)
*B01J 29/08* (2006.01)
*B01J 29/40* (2006.01)
*B01J 29/85* (2006.01)
*B01J 35/64* (2024.01)
*B01J 37/00* (2006.01)
*B01J 37/04* (2006.01)
*B01J 37/06* (2006.01)
*B01J 37/08* (2006.01)
*B01J 37/28* (2006.01)
*C01B 39/02* (2006.01)
*C01B 39/38* (2006.01)
*C01B 39/54* (2006.01)
*C10G 11/05* (2006.01)

(52) U.S. Cl.
CPC ... *C10G 2300/308* (2013.01); *C10G 2400/20* (2013.01)

(56) References Cited

FOREIGN PATENT DOCUMENTS

| | | | |
|---|---|---|---|
| CN | 102452669 | A | 5/2012 |
| CN | 102838130 | A | 12/2012 |
| CN | 103007990 | A | 4/2013 |
| CN | 103007991 | A | 4/2013 |
| CN | 104841479 | A | 8/2015 |
| CN | 104998668 | A | 10/2015 |
| CN | 106140270 | A * | 11/2016 |
| CN | 106994364 | A | 8/2017 |
| CN | 107649173 | A | 2/2018 |
| CN | 107973317 | A | 5/2018 |
| CN | 108726535 | A | 11/2018 |
| JP | S61201618 | A | 9/1986 |
| JP | 106277522 | A | 10/1994 |
| JP | H10297918 | A | 11/1998 |
| JP | 2013209282 | A | 10/2013 |
| JP | 2017501871 | A5 | 1/2018 |

* cited by examiner

PHOSPHORUS-MODIFIED MFI-STRUCTURED MOLECULAR SIEVE, CATALYTIC CRACKING AUXILIARY AND CATALYTIC CRACKING CATALYST CONTAINING PHOSPHORUS-MODIFIED MFI-STRUCTURED MOLECULAR SIEVE, AND PROCESSES FOR PREPARING THE SAME

CROSS-REFERENCE TO RELATED APPLICATIONS

This application is a U.S. national stage entry of PCT international application no. PCT/CN2021/086824, filed on Apr. 13, 2021, which claims priority to the Chinese patent application with the application No. 202010283498.2 filed on Apr. 13, 2020, the Chinese patent application with the application No. 202011169092.8 filed on Oct. 28, 2020, the Chinese patent application with the application No. 202011175729.4 filed on Oct. 29, 2020; the content of each is herein incorporated by reference in its entirety for all purposes.

TECHNICAL FIELD

The present invention relates to a phosphorus-modified MFI-structured molecular sieve, a catalytic cracking auxiliary containing phosphorus-modified MFI-structured molecular sieve(s), and a catalytic cracking catalyst containing phosphorus-modified MFI-structured molecular sieve(s), the present invention also relates to preparation processes for phosphorus-modified MFI-structured molecular sieve, catalytic cracking auxiliary containing phosphorus-modified MFI-structured molecular sieve(s), and catalytic cracking catalyst containing phosphorus-modified MFI-structured molecular sieve(s); and the present invention also relates to use of the catalytic cracking auxiliary and the catalytic cracking catalyst in the catalytic cracking of hydrocarbon oils.

BACKGROUND TECHNOLOGY

A typical representative of the molecular sieves having an MFI framework structure is the ZSM-5 molecular sieve, which is a widely used zeolite molecular sieve catalytic material developed by Mobil Corporation of the United States in 1972. ZSM-5 molecular sieve has a structure of three-dimensional intersectional channels. The channels along the a-axis are straight channels having a sectional dimension of 0.54×0.56 nm and being approximately circular. The channels along the b-axis are zigzag channels having a sectional dimension of 0.51×0.56 nm and being elliptical. ZSM-5 molecular sieve has openings composed of ten-membered rings, and are between the small-pore zeolite and the large-pore zeolite in the size of the openings, so it has a unique shape-selective catalytic effect. ZSM-5 molecular sieve has a unique pore structure, good shape-selective catalysis, and isomerization performance, high thermal and hydrothermal stability, a high specific surface area, a wide silica-alumina ratio variation range, unique surface acidity, and a relatively low carbon formation, so it is widely used as catalyst and catalyst support and has been successfully used in production processes such as alkylation, isomerization, disproportionation, catalytic cracking, methanol-to-gasoline, and methanol-to-olefins. ZSM-5 molecular sieve is introduced into catalytic cracking and C4 hydrocarbon catalytic cracking and shows excellent catalytic performance, and the utilization of its molecular shape selectivity can greatly improve the lower carbon olefin yield.

Since 1983, the ZSM-5 molecular sieve has been used as a catalytic cracking octane number auxiliary/catalyst in the catalytic cracking process, aiming to improve the octane number of catalytic cracking gasoline and the selectivity for light olefins. U.S. Pat. No. 3,758,403 firstly reported the use of ZSM-5 molecular sieve as an active component for increasing propylene production, and it was used together with REY as an active component of an FCC catalyst, or it was prepared together with REY to form an FCC catalyst. U.S. Pat. No. 5,997,728 disclosed the use of ZSM-5 molecular sieve without any modification as an auxiliary for increasing propylene production. However, the propylene yield of the above two technologies is not high.

Although the HZ SM-5 molecular sieve has good shape selectivity performance and isomerization performance, its disadvantage is poor hydrothermal stability, and it is easy to deactivate under rigorous high-temperature hydrothermal conditions, which reduces the catalytic performance.

In the 1980s, Mobil Corporation discovered that phosphorus can improve the hydrothermal stability of ZSM-5 molecular sieves, and at the same time, the modification of ZSM-5 molecular sieves with phosphorus increases the yield of low-carbon olefins. Conventional additives usually contain phosphorus-activated ZSM-5, which selectively converts primary cracked products (e.g., gasoline olefins) to C3 and C4 olefins. ZSM-5 molecular sieve is modified by introducing an appropriate amount of inorganic phosphorus compounds after synthesis, which can stabilize the framework aluminum under rigorous hydrothermal conditions.

CN106994364A discloses a process for a phosphorus-modified ZSM-5 molecular sieve. The process comprises firstly mixing one or more phosphorus-containing compounds selected from phosphoric acid, diammonium hydrogen phosphate, ammonium dihydrogen phosphate, and ammonium phosphate with a ZSM-5 molecular sieve having high alkali metal ion content to obtain a mixture with a phosphorus loading (as P2O5) of at least 0.1 wt %, drying and calcining the mixture, then perform an ammonium-exchanging step and a water-washing step so that the alkali metal ion content is reduced to 0.10 wt % or less, and then perform steps of drying and hydrothermal aging at 400-1000° C. under 100% water vapor. The phosphorus-containing ZSM-5 molecular sieve obtained by this process has high total acid content, excellent cracking conversion rate, and propylene selectivity, and relatively high liquefied gas yield.

U.S. Pat. No. 5,171,921 discloses a process for modifying a ZSM-5 molecular sieve. This process comprises producing an HZSM-5 molecular sieve according to the conventional steps: synthesis→filtering→ammonium exchanging→drying→calcining, and then modifying the ZSM-5 molecular sieve with phosphoric acid, drying, and calcining to obtain a phosphorus-modified HZSM-5 molecular sieve, wherein the P2O5 loading is usually in the range of 1-7 wt %. However, phosphoric acid or phosphoric acid ammonium salts will self-aggregate to form phosphorus species in different aggregation states during the calcining process. During the hydrothermal treatment process, only the phosphate groups entering the pores interact with the framework aluminum to retain the B acid center, reducing the distribution of phosphorus species. A hierarchical ZSM-5 molecular sieve is a ZSM-5 molecular sieve containing both micropores and mesopores. Various types of hierarchical ZSM-5 molecular sieves with mesoporous channels are usually prepared by the hard template method, the soft template method, the acid-base post-treatment method, and the like.

Although the modification of a (hierarchical) ZSM-5 molecular sieve with an appropriate amount of an inorganic phosphorus compound can retard the framework dealumination and improve the hydrothermal stability, and phosphorus atoms will combine with the distorted four-coordinated framework aluminum to form weak B acid centers, so as to achieve higher conversion of long-chain alkane cracking and higher selectivity for light olefins, but the modification of a (hierarchical) ZSM-5 molecular sieve with an excessive inorganic phosphorus compound will block the channels of the molecular sieve, reduces the pore volume and the specific surface area, and occupies a large amount of strong B acid centers. Moreover, in the prior art, phosphoric acid or phosphoric acid ammonium salts will self-polymerize to form phosphorus species in different aggregation states during the calcining process, the coordination of phosphorus and the framework aluminum is insufficient, the utilization efficiency of phosphorus is low, and the phosphorus modification does not always achieve satisfactory hydrothermal stability improvement results. Therefore, new technologies are urgently needed to promote the coordination of phosphorus and the framework aluminum, improve the hydrothermal stability of the phosphorus-modified (hierarchical) ZSM-5 molecular sieve, and further increase the cracking activity.

SUMMARY OF THE INVENTION

One object of the present invention is to provide a phosphorus-modified MFI-structured molecular sieve different from the prior art, the molecular sieve has a high dispersity of phosphorus species so that when applied to the catalytic cracking reaction of petroleum hydrocarbons, an excellent cracking conversion and an excellent lower carbon olefin yield can be obtained, and at the same time, a higher liquefied gas yield can be obtained. Another object of the present invention is to provide a catalytic cracking auxiliary based on using a phosphorus-modified ZSM-5 molecular sieve having a high dispersity of phosphorus species as the active component so that in the catalytic cracking reaction of petroleum hydrocarbons, an excellent cracking conversion and an excellent lower carbon olefin yield can be obtained, and at the same time, a higher liquefied gas yield can be obtained. Another object of the present invention is to provide a catalytic cracking catalyst based on using a phosphorus-modified MFI-structured molecular sieve having a high dispersity of phosphorus species as one of the active components so that in the catalytic cracking reaction of petroleum hydrocarbons, an excellent cracking conversion and an excellent lower carbon olefin yield can be obtained, and at the same time, a higher liquefied gas yield can be obtained. Another object of the present invention is to provide processes for preparing the above-mentioned phosphorus-modified MFI-structured molecular sieve, the above-mentioned catalytic cracking auxiliary, and the above-mentioned catalytic cracking catalyst. Another object of the present invention is to provide the use of the above-mentioned catalytic cracking auxiliary and the above-mentioned catalytic cracking catalyst.

In order to achieve the above objects, the present invention provides a phosphorus-modified MFI-structured molecular sieve, which is characterized in that the K value of the molecular sieve satisfies: 70%≤K≤90%, the K=[the mass content of phosphorus within a region having an area of 100 square nanometers and a vertical depth from 5 to 10 nm at any crystal surface of the crystal grain of a molecular sieve, as measured by the EPMA method]/[the mass content of phosphorus within a region having an area of 100 square nanometers and a vertical depth from 0 to 2 nm at any crystal surface of the crystal grain of a molecular sieve, as measured by the XPS method]×100%, wherein the XPS analysis on the surface of the molecular sieve is performed by using the ESCAREB 250 Type X-ray photoelectron spectrometer of Thermo Fisher-VG Company, the excitation source is a monochromatic AlKα X-ray with a power of 150 W, and the charge shift is calibrated with the C1s peak (284.8 eV) from a contaminated carbon; the EPMA analysis on the surface of the molecular sieve is performed with JXA-8230 energy spectrometer X-ray detector, wherein for the count rate and the counting time, the totalized counting number is generally greater than $10^5$, the counting rate is $10^3$-$10^4$ CPS, and the counting time is 10-100 seconds.

In the above-mentioned phosphorus-modified MFI-structured molecular sieve, the molar ratio of the phosphorus content as P2O5 to the alumina content is ≥0.01; for example, ≥0.2; further for example, ≥0.3; still further for example, 0.4-0.7; the above-mentioned phosphorus-modified MFI-structured molecular sieve can be a micropore ZSM-5 molecular sieve or a hierarchical ZSM-5 molecular sieve, with a loading amount of phosphorus (as P2O5) of at least 0.1 wt %, wherein for the micropore ZSM-5 molecular sieve, it has a silica/alumina molar ratio of 15-1000, for example, 20-200; for the hierarchical ZSM-5 molecular sieve, it has a proportion of the mesopore volume relative to the total pore volume of greater than 10%, an average pore diameter of 2-20 nm, and a silica/alumina molar ratio of 15-1000, for example, 20-200.

In order to achieve the above objects, the present invention provides a catalytic cracking auxiliary, wherein based on the dry basis weight of the catalytic cracking auxiliary, the catalytic cracking auxiliary comprises 5-75 wt % of a phosphorus-modified MFI-structured molecular sieve; wherein the phosphorus-modified MFI-structured molecular sieve has a K value satisfying: 70%≤K≤90%; for example, 75%≤K≤90%; further for example, 78%≤K≤85%, the K=[the mass content of phosphorus within a region having an area of 100 square nanometers and a vertical depth from 5 to 10 nm at any crystal surface of the crystal grain of a molecular sieve, as measured by the EPMA method]/[the mass content of phosphorus within a region having an area of 100 square nanometers and a vertical depth from 0 to 2 nm at any crystal surface of the crystal grain of a molecular sieve, as measured by the XPS method]×100%, wherein the XPS analysis on the surface of the molecular sieve is performed by using the ESCAREB 250 Type X-ray photoelectron spectrometer of Thermo Fisher-VG Company, the excitation source is a monochromatic AlKα X-ray with a power of 150 W, and the charge shift is calibrated with the C1s peak (284.8 eV) from a contaminated carbon; the EPMA analysis on the surface of the molecular sieve is performed with JXA-8230 energy spectrometer X-ray detector, wherein for the count rate and the counting time, the totalized counting number is generally greater than $10^5$, the counting rate is $10^3$-$10^4$ CPS, and the counting time is 10-100 seconds.

In the above-mentioned phosphorus-modified MFI-structured molecular sieve, the molar ratio of the phosphorus content as P2O5 to the alumina content is ≥0.01; for example, ≥0.2; further for example, ≥0.3; still further for example, 0.4-0.7; the above-mentioned phosphorus-modified MFI-structured molecular sieve can be a micropore ZSM-5 molecular sieve or a hierarchical ZSM-5 molecular sieve, with a loading amount of phosphorus (as P2O5) of at least 0.1 wt %, wherein for the micropore ZSM-5 molecular sieve, it has a silica/alumina molar ratio of 15-1000, for example, 20-200; for the hierarchical ZSM-5 molecular sieve, it has a proportion of the mesopore volume relative to the total pore volume of greater than 10%, an average pore diameter of 2-20 nm, and a silica/alumina molar ratio of 15-1000, for example, 20-200;

In the catalytic cracking auxiliary of the present invention, based on the dry basis of the catalytic cracking auxiliary, the catalytic cracking auxiliary can also comprise 1-40 wt % of a binder and 0-65 wt % of a second clay. The binder contains a phosphorus-aluminum inorganic binder. The phosphorus-aluminum inorganic binder is a phosphorus-aluminum glue and/or a first clay-containing phosphorus-aluminum inorganic binder.

In order to achieve the above objects, the present invention provides a catalytic cracking catalyst containing phosphorus-modified MFI-structured molecular sieve(s), based on the dry basis of the catalyst, the catalytic cracking catalyst contains 1-25 wt % of Y zeolite, 5-50 wt % of a phosphorus-modified MFI-structured molecular sieve, 1-60 wt % of an inorganic binder and optionally 0-60 wt % of a second clay, wherein the inorganic binder comprises a phosphorus-aluminum inorganic binder and/or other inorganic binder(s); the phosphorus-modified MFI-structured molecular sieve has a K value satisfying: 70%≤K≤90%; for example, 75%≤K≤90%; further for example, 78%≤K≤85%, the K=[the mass content of phosphorus within a region having an area of 100 square nanometers and a vertical depth from 5 to 10 nm at any crystal surface of the crystal grain of a molecular sieve, as measured by the EPMA method]/[the mass content of phosphorus within a region having an area of 100 square nanometers and a vertical depth from 0 to 2 nm at any crystal surface of the crystal grain of a molecular sieve, as measured by the XPS method]×100%, wherein the XPS analysis on the surface of the molecular sieve is performed by using the ESCAREB 250 Type X-ray photoelectron spectrometer of Thermo Fisher-VG Company, the excitation source is a monochromatic AlKα X-ray with a power of 150 W, and the charge shift is calibrated with the C1s peak (284.8 eV) from a contaminated carbon; the EPMA analysis on the surface of the molecular sieve is performed with JXA-8230 energy spectrometer X-ray detector, wherein for the count rate and the counting time, the totalized counting number is generally greater than $10^5$, the counting rate is $10^3$-$10^4$ CPS, and the counting time is 10-100 seconds.

In the above-mentioned phosphorus-modified MFI-structured molecular sieve, the molar ratio of the phosphorus content as P2O5 to the alumina content is ≥0.01; for example, ≥0.2; further for example, ≥0.3; still further for example, 0.4-0.7; the above-mentioned phosphorus-modified MFI-structured molecular sieve can be a micropore ZSM-5 molecular sieve or a hierarchical ZSM-5 molecular sieve, with a loading amount of phosphorus (as P2O5) of at least 0.1 wt %, wherein for the micropore ZSM-5 molecular sieve, it has a silica/alumina molar ratio of 15-1000, for example, 20-200; for the hierarchical ZSM-5 molecular sieve, it has a proportion of the mesopore volume relative to the total pore volume of greater than 10%, an average pore diameter of 2-20 nm, and a silica/alumina molar ratio of 15-1000, for example, 20-200;

In the above-mentioned catalytic cracking catalyst, the Y zeolite can comprise at least one of a PSRY zeolite, a rare earth-containing PSRY zeolite, a USY zeolite, a rare earth-containing USY zeolite, a REY zeolite, a REHY zeolite and an HY zeolite; for example, the inorganic binder contains a phosphorus-aluminum inorganic binder; further for example, the phosphorus-aluminum inorganic binder is a phosphorus-aluminum glue and/or a first clay-containing phosphorus-aluminum inorganic binder.

In order to achieve the above objects, the present invention provides a process of preparing the phosphorus-modified MFI-structured molecular sieve, which is characterized in that it is obtained by the immersion method that comprises: the contact by mixing an aqueous solution of the phosphorus-containing compound at a temperature of 40-150° C., for example, 50-150° C., further for example, 70-130° C. and an MFI-structured molecular sieve at 40-150° C., for example, 50-150° C., further for example, 70-130° C. at substantially the same temperature for at least 0.1 hours, then the drying, and the calcining at 200-600° C., air or water vapor for at least 0.1 hours; or, vigorously mixing and stirring a phosphorus-containing compound, an MFI-structured molecular sieve and water, adjusting (for example, increasing) the temperature to 40-150° C., for example, 50-150° C., further for example, 70-130° C., maintaining for at least 0.1 hours, then drying, and calcining at 200-600° C., air or water vapor for at least 0.1 hours.

In the process of preparing the phosphorus-modified MFI-structured molecular sieve, the MFI-structured molecular sieve can be a hydrogen-type micropore ZSM-5 molecular sieve or a hydrogen-type hierarchical ZSM-5 molecular sieve. They are obtained by ammonium exchange to reduce the sodium content to Na2O<0.1 wt % and have a silica-alumina ratio (the molar ratio of silicon oxide to aluminum oxide) in the range of ≥10, usually 10-200.

In the process of preparing the phosphorus-modified MFI-structured molecular sieve, the molar ratio of the phosphorus-containing compound (as phosphorus) (as oxide) to the MFI-structured molecular sieve (for example, hydrogen-type ZSM-5 molecular sieve or hydrogen-type hierarchical ZSM-5 molecular sieve) (as aluminum) (as oxide) is 0.01-2; for example, the molar ratio of the two is 0.1-1.5; further for example, the molar ratio of the two is 0.2-1.5. The phosphorus-containing compound is selected from organic phosphorous compounds, such as trimethyl phosphate, triphenylphosphine, trimethyl phosphite, tetrabutylphosphonium bromide, tetrabutylphosphonium chloride, tetrabutylphosphonium hydroxide, triphenylethylphosphonium bromide, triphenylbutylphosphonium bromide, triphenylbenzylphosphonium bromide, hexamethylphosphoric triamide, dibenzyl diethylphosphoramidite, 1,3-bis((triethyl-phosphaneyl)methyl)benzene and the like, inorganic phosphorous compounds, such as phosphoric acid, ammonium hydrogen phosphate, diammonium hydrogen phosphate, ammonium phosphate, and boron phosphate or a mixture thereof, and the like. The inventors have found that when boron phosphate is used as one of the phosphorus-containing compounds and the hydrothermal calcining is performed at 300-500° C., phosphorus has better dispersity in the molecular sieve. Therefore, for example, the combination of phosphorus-containing compounds is a mixture of boron phosphate and one or more of trimethyl phosphate, triphenylphosphine, trimethyl phosphite, phosphoric acid, ammonium hydrogen phosphate, diammonium hydrogen phosphate, and ammonium phosphate. In the boron phosphate-containing mixture, boron phosphate comprises 10%-80% by weight, for example, 20%-40%, and further for example, 25%-35%.

In the process of preparing the phosphorus-modified MFI-structured molecular sieve, the contacting is to make an aqueous solution of the phosphorus-containing compound at a temperature of 30-150° C. and a hydrogen-type MFI-structured molecular sieve at a temperature of 30-150° C. in contact at substantially the same temperature for at least 0.1 hours through the immersion method. The contact is performed for example, in a higher temperature range above 40° C., for example, 50-150° C., further for example, 70-130° C., which can produce a better result, i.e., the better dispersion of phosphorus species, and the easier migration of phosphorus into the crystal interior of the hydrogen-type MFI-structured molecular sieve to combine with the framework aluminum, which further improves the coordination degree of phosphorus and the framework aluminum, and finally contributes to improving the hydrothermal stability of the molecular sieve. The substantially same temperature means that the temperature difference between the temperature of the aqueous solution of the phosphorus-containing compound and the temperature of the hydrogen-type MFI-structured molecular sieve is within ±5° C. For example, the temperature of the aqueous solution of the phosphorus-containing compound is 80° C., and the HZSM-5 molecular sieve needs to be heated to 75-85° C.

In the process of preparing the phosphorus-modified MFI-structured molecular sieve, the contacting may also be to mix the phosphorus-containing compound, the (hydrogen-type) MFI-structured molecular sieve, and water, and maintain at 30-150° C. for at least 0.1 hours. For example, in order to produce a better result, i.e., the better dispersion of phosphorus species, and the easier migration of phosphorus into the crystal interior of the molecular sieve to combine with the framework aluminum, to further improve the coordination degree of phosphorus and the framework aluminum, and to finally improve the hydrothermal stability of the molecular sieve, the phosphorus-containing compound, the hydrogen-type MFI-structured molecular sieve, and water are mixed, and then maintained at a higher temperature range above 40° C. for 0.1 hours, for example, a temperature range of 50-150° C., further for example, a temperature range of 70-130° C. With respect to the contacting, the weight ratio of water/molecular sieve is 0.5-1, and the time is 0.5-40 hours. For example, the calcining is performed at 450-550° C., under the water vapor atmosphere.

The present invention improves the hydrothermal stability of the phosphorus-modified molecular sieve by promoting the coordination of phosphorus species with the framework aluminum of the MFI-structured molecular sieve. In the cracking of n-tetradecane, the phosphorus-containing MFI-structured molecular sieve of the present invention can provide an excellent cracking conversion and an excellent lower carbon olefin yield, and concurrently can produce a higher liquefied gas yield.

In order to achieve the above objects, the present invention provides a process of preparing a catalytic cracking auxiliary, the process comprises a phosphorus-modified MFI-structured molecular sieve, a binder, and optionally a second clay are vigorously mixed and stirred with water, and spray-dried to produce the catalytic cracking auxiliary, which is characterized in that wherein the phosphorus-modified MFI-structured molecular sieve is prepared with the process of preparing the phosphorus-modified MFI-structured molecular sieve of the present invention.

In the process of preparing the catalytic cracking auxiliary, the binder for example, contains a phosphorus-aluminum inorganic binder. The phosphorus-aluminum inorganic binder is a phosphorus-aluminum glue and/or a first clay-containing phosphorus-aluminum inorganic binder; based on the dry basis weight of the first clay-containing phosphorus-aluminum inorganic binder, the first clay-containing phosphorus-aluminum inorganic binder contains 10-40 wt %, for example, 15-40 wt % of aluminum component (as Al2O3), 45-90 wt %, 45-80 wt % of phosphorus component (as P2O5) and greater than 0 and not more than 40 wt % of a first clay on a dry basis, and the first clay-containing phosphorus-aluminum inorganic binder has a P/Al weight ratio of 1.0-6.0, a pH of 1-3.5, and a solid content of 15-60 wt %; the first clay comprises at least one of kaolin, sepiolite, attapulgite, rectorite, smectite and diatomite; the binder may also include at least one other inorganic binder of pseudo-boehmite, alumina sol, silica-alumina sol and water glass; the second clay is at least one selected from kaolin, sepiolite, attapulgite, rectorite, smectite, giagerite, halloysite, hydrotalcite, bentonite and diatomite.

In the process of preparing the catalytic cracking auxiliary, based on the catalytic cracking auxiliary, the binder comprises on the dry basis 3-39 wt % of the phosphorus-aluminum inorganic binder and on the dry basis 1-30 wt % of the other inorganic binder.

The process of preparing the catalytic cracking auxiliary further comprises: the spray-dried product is subjected to a first calcining, and then washed, and optionally dried to produce the catalytic cracking auxiliary; wherein for the first calcining, the calcining temperature is 300-650° C., the calcining time is 0.5-8 h; the drying temperature is 100-200° C., the drying time is 0.5-24 h.

The process of preparing the catalytic cracking auxiliary can further comprise: the first clay-containing phosphorus-aluminum inorganic binder is prepared with the following steps: an alumina source, the first clay and water are vigorously mixed and stirred to disperse into a slurry having a solid content of 5-48 wt %; wherein the alumina source is aluminum hydroxide and/or alumina that can be peptized by an acid, relative to 10-40 parts by weight, for example, 15-40 parts by weight of the alumina source (as Al2O3), the used amount of the first clay based on the dry weight is greater than 0 part by weight and not more than 40 parts by weight; a concentrated phosphoric acid is added to the slurry under stirring according to the weight ratio of P/Al=1-6, and the resulting mixed slurry is reacted at 50-99° C. for 15-90 minutes; wherein P in the P/Al is the weight of phosphorus as the simple substance in phosphoric acid, Al is the weight of aluminum as the simple substance in the alumina source.

In order to achieve the above objects, the present invention provides the use of the catalytic cracking auxiliary, that is, a process for catalytically cracking a hydrocarbon oil, which process comprises: reacting the hydrocarbon oil by contacting the above-mentioned catalytic cracking auxiliary under a catalytic cracking condition. For example, the hydrocarbon oil is reacted by contacting a catalyst mixture containing the catalytic cracking auxiliary and a catalytic cracking catalyst; in the catalyst mixture, the content of the catalytic cracking auxiliary is 0.1-30 wt %. The catalytic cracking condition includes: the reaction temperature is 500-800° C.; the hydrocarbon oil is one or more selected from crude oil, naphtha, gasoline, atmospheric residue, vacuum residue, atmospheric gas oil, vacuum gas oil, straight-run gas oil, propane light/heavy deasphalted oil, coker gas oil, and coal liquefication product. In the catalytic cracking reaction of petroleum hydrocarbons, the catalytic cracking auxiliary provided by the present invention can provide an excellent cracking conversion and an excellent lower carbon olefin yield, and concurrently can provide a higher liquefied gas yield.

In order to achieve the above objects, the present invention also provides a process of preparing a catalytic cracking catalyst, the process comprises a Y zeolite, a phosphorus-modified MFI-structured molecular sieve, an inorganic binder, and optionally a second clay are vigorously mixed and stirred with water, and spray-dried to produce the catalytic cracking catalyst, which is characterized in that wherein the phosphorus-modified MFI-structured molecular sieve is prepared with the process of preparing the phosphorus-modified MFI-structured molecular sieve of the present invention.

In the process of preparing a catalytic cracking catalyst of the present invention, the binder is a phosphorus-aluminum inorganic binder. The phosphorus-aluminum inorganic binder is a phosphorus-aluminum glue and/or a first clay-containing phosphorus-aluminum inorganic binder; based on the dry basis weight of the first clay-containing phosphorus-aluminum inorganic binder, the first clay-containing phosphorus-aluminum inorganic binder contains 10-40 wt %, for example, 15-40 wt % of aluminum component (as Al2O3), 45-90 wt %, for example, 45-80 wt % of phosphorus component (as P2O5) and greater than 0 and not more than 40 wt % of a first clay on a dry basis, and the first clay-containing phosphorus-aluminum inorganic binder has a P/Al weight ratio of 1.0-6.0, a pH of 1-3.5, and a solid content of 15-60 wt %; the first clay comprises at least one of kaolin, sepiolite, attapulgite, rectorite, smectite, and diatomite.

In the process of preparing a catalytic cracking catalyst of the present invention, the second clay is at least one selected from kaolin, sepiolite, attapulgite, rectorite, smectite, giagerite, halloysite, hydrotalcite, bentonite, and diatomite.

In the process of preparing a catalytic cracking catalyst of the present invention, based on the catalytic cracking catalyst, the binder comprises on the dry basis 3-39 wt % of the phosphorus-aluminum inorganic binder and on the dry basis 1-30 wt % of other inorganic binder(s), the other inorganic binder comprises at least one of pseudo-boehmite, alumina sol, silica-alumina sol, and water glass.

The process of preparing a catalytic cracking catalyst of the present invention further comprises: the spray-dried product is subjected to a first calcining, and then washed, and optionally dried to produce the catalytic cracking catalyst; wherein for the first calcining, the calcining temperature is 300-650° C., the calcining time is 0.5-8 h; the drying temperature is 100-200° C., the drying time is 0.5-24 h.

The process of preparing a catalytic cracking catalyst of the present invention can further comprise: the first clay-containing phosphorus-aluminum inorganic binder is prepared with the following steps: an alumina source, the first clay and water are vigorously mixed and stirred to disperse into a slurry having a solid content of 5-48 wt %; wherein the alumina source is aluminum hydroxide and/or alumina that can be peptized by an acid, relative to 10-40 parts by weight, for example, 15-40 parts by weight of the alumina source (as Al2O3), the used amount of the first clay based on the dry weight is greater than 0 part by weight and not more than 40 parts by weight; a concentrated phosphoric acid is added to the slurry under stirring according to the weight ratio of P/Al=1-6, and the resulting mixed slurry is reacted at 50-99° C. for 15-90 minutes; wherein P in the P/Al is the weight of phosphorus as the simple substance in phosphoric acid, Al is the weight of aluminum as the simple substance in the alumina source.

In order to achieve the above objects, the present invention provides the use of the catalytic cracking catalyst, that is, a process for catalytically cracking a hydrocarbon oil, which process comprises: reacting the hydrocarbon oil by contacting the above-mentioned catalytic cracking catalyst under a catalytic cracking condition. The catalytic cracking condition includes: the reaction temperature is 500-800° C.; the hydrocarbon oil is one or more selected from crude oil, naphtha, gasoline, atmospheric residue, vacuum residue, atmospheric gas oil, vacuum gas oil, straight-run gas oil, propane light/heavy deasphalted oil, coker gas oil, and coal liquefication product. In the catalytic cracking reaction of petroleum hydrocarbons, the catalytic cracking catalyst provided by the present invention can provide an excellent cracking conversion and an excellent lower carbon olefin yield, and concurrently can provide a higher liquefied gas yield.

DETAILED DESCRIPTION

Specific embodiments of the present invention will be described in detail below. It should be understood that the specific embodiments described herein are only used to illustrate and explain the present invention and are not intended to limit the present invention.

In the present invention, pores with a pore size less than 2 nm are called micropores; pores with a pore size greater than 50 nm are called macropores, and pores with a pore size of 2-50 nm are called mesopores.

In the present invention, the first clay refers to the clay contained in the phosphorus-aluminum inorganic binder; and the second clay refers to the clay other than the first clay, and "first" and "second" are only to distinguish whether or not the clay is in the phosphorus-aluminum inorganic binder. The first clay includes, but is not limited to, kaolin, sepiolite, attapulgite, rectorite, smectite, and diatomite. The second clay includes, but is not limited to, kaolin, sepiolite, attapulgite, rectorite, smectite, diatomite, giagerite, halloysite, hydrotalcite, and bentonite.

In the present invention, the binder and the inorganic binder are synonymous.

The binder of the present invention comprises a phosphorus-aluminum inorganic binder and other inorganic binder(s).

According to the present invention, the other inorganic binder(s) refers to a binder that does not contain both phosphorus and aluminum elements, and the phosphorus-aluminum inorganic binder includes a phosphorus-aluminum glue and a first clay-containing phosphorus-aluminum inorganic binder.

According to the present invention, examples of other inorganic binder(s) include, but are not limited to, pseudo-boehmite, alumina sol, silica-alumina sol, and water glass.

According to the present invention, the active component in the phosphorus-aluminum glue is aluminum dihydrogen phosphate, and its theoretical ratio is P2O5/Al2O3=3:1 (molar ratio). The phosphorus-aluminum glue can be used as a binder to prepare a catalyst with excellent strength. In the present invention, the actual ratio of P2O5/Al2O3 in the phosphorus-aluminum glue is 3:1 or higher, for example, 3:1-10:1, further for example, greater than 3:1 and not greater than 5:1. For example, the phosphorus-aluminum glue can be obtained by vigorously mixing and stirring an alumina source with water to disperse into a slurry; adding a concentrated phosphoric acid to the slurry under stirring, and allowing the resulting mixed slurry to react for a period of time (e.g., 15-90 minutes at 50-99° C.); the alumina source can be at least one selected from ρ-alumina, x-alumina, η-alumina, γ-alumina, κ-alumina, σ-alumina, θ-alumina, gibbsite, bayerite, nordshandite, diaspore, boehmite and pseudo-boehmite, the concentration of the concentrated phosphoric acid can be 60-98 wt %, further for example, 75-90 wt %, the feeding rate of phosphoric acid is, for example, 0.01-0.10 kg phosphoric acid/min/kg alumina source, further for example, 0.03-0.07 kg phosphoric acid/min/kg alumina source.

According to the present invention, the first clay-containing phosphorus-aluminum inorganic binder refers to such a binder that, based on the dry basis weight, the first clay-containing phosphorus-aluminum inorganic binder contains 10-40 wt %, for example, 15-40 wt % of aluminum component (as Al2O3), 45-90 wt %, for example, 45-80 wt % of phosphorus component (as P2O5) and greater than 0 and not more than 40 wt % of a first clay on a dry basis, and the first clay-containing phosphorus-aluminum inorganic binder has a P/Al weight ratio of 1.0-6.0, a pH of 1-3.5, and a solid content of 15-60 wt %.

According to the present invention, the first clay-containing phosphorus-aluminum inorganic binder can be prepared by the following method: an alumina source, the first clay, and water are vigorously mixed and stirred to disperse into a slurry having a solid content of 5-48 wt %; wherein the alumina source is aluminum hydroxide and/or alumina that can be peptized by an acid, relative to 10-40 parts by weight, for example, 15-40 parts by weight of the alumina source (as Al2O3), the used amount of the first clay based on the dry weight is greater than 0 part by weight and not more than 40 parts by weight; a concentrated phosphoric acid is added to the slurry under stirring according to the weight ratio of P/Al=1-6, and the resulting mixed slurry is reacted at 50-99° C. for 15-90 minutes; wherein P in the P/Al is the weight of phosphorus as the simple substance in phosphoric acid, Al is the weight of aluminum as the simple substance in the alumina source. the alumina source can be at least one selected from ρ-alumina, x-alumina, η-alumina, γ-alumina, κ-alumina, σ-alumina, θ-alumina, gibbsite, bayerite, nordshandite, diaspore, boehmite and pseudo-boehmite, the concentration of the concentrated phosphoric acid can be 60-98 wt %, further for example, 75-90 wt %, the feeding rate of phosphoric acid is, for example, 0.01-0.10 kg phosphoric acid/min/kg alumina source, further for example, 0.03-0.07 kg phosphoric acid/min/kg alumina source.

The present invention provides a phosphorus-modified MFI-structured molecular sieve, which is characterized in that the molecular sieve has a K value, satisfying: 70%≤K≤90%; for example, 75%≤K≤90%; further for example, 78%≤K≤85%; wherein, the K=[the mass content of phosphorus within a region having an area of 100 square nanometers and a vertical depth from 5 to 10 nm at any crystal surface of the crystal grain of a molecular sieve, as measured by the EPMA method]/[the mass content of phosphorus within a region having an area of 100 square nanometers and a vertical depth from 0 to 2 nm at any crystal surface of the crystal grain of a molecular sieve, as measured by the XPS method]×100%, wherein the XPS analysis on the surface of the molecular sieve is performed by using the ESCAREB 250 Type X-ray photoelectron spectrometer of Thermo Fisher-VG Company, the excitation source is a monochromatic AlKα X-ray with a power of 150 W, and the charge shift is calibrated with the C1s peak (284.8 eV) from a contaminated carbon; the EPMA analysis on the surface of the molecular sieve is performed with JXA-8230 energy spectrometer X-ray detector, wherein for the count rate and the counting time, the totalized counting number is generally greater than $10^5$, the counting rate is $10^3$-$10^4$ CPS, and the counting time is 10-100 seconds.

The phosphorus-modified MFI-structured molecular sieve has the molar ratio of the phosphorus content as P2O5 to the alumina content of ≥0.01, for example, ≥0.2, further for example, ≥0.3, still further for example, 0.4-0.7. For example, the phosphorus-modified MFI-structured molecular sieve is a micropore ZSM-5 molecular sieve or a hierarchical ZSM-5 molecular sieve. The micropore ZSM-5 molecular sieve has a silica/alumina molar ratio of 15-1000, for example, 20-200. The hierarchical ZSM-5 molecular sieve has a proportion of the mesopore volume relative to the total pore volume of greater than 10%, an average pore diameter of 2-20 nm, and a silica/alumina molar ratio of 15-1000, for example, 20-200.

The present invention also provides a process of preparing the above-mentioned phosphorus-modified MFI structured molecular sieve, wherein the phosphorus-modified MFI-structured molecular sieve is obtained by the immersion method, comprising: the contact by mixing an aqueous solution of the phosphorus-containing compound at a temperature of 40-150° C., for example, 50-150° C., further for example, 70-130° C. and an MFI-structured molecular sieve at 40-150° C., for example, 50-150° C., further for example, 70-130° C. at substantially the same temperature for at least 0.1 hours, then the drying, and the calcining at 200-600° C., air or water vapor for at least 0.1 hours; or, vigorously mixing and stirring a phosphorus-containing compound, an MFI-structured molecular sieve and water, adjusting (for example, increasing) the temperature to 40-150° C., for example, 50-150° C., further for example, 70-130° C., maintaining for at least 0.1 hours, then drying, and calcining at 200-600° C., air or water vapor for at least 0.1 hours.

According to the process of preparing the phosphorus-modified MFI-structured molecular sieve, the MFI-structured molecular sieve can be a hydrogen-type micropore ZSM-5 molecular sieve or a hydrogen-type hierarchical ZSM-5 molecular sieve. They are obtained by ammonium exchange to reduce the sodium content to $Na_2O$<0.1 wt % and have a silica-alumina ratio (the molar ratio of silicon oxide to aluminum oxide) in the range of ≥10, usually 10-200.

According to the process of preparing the phosphorus-modified MFI-structured molecular sieve, the molar ratio of the phosphorus-containing compound (as phosphorus) (as oxide) to the hydrogen-type ZSM-5 molecular sieve or the hydrogen-type hierarchical ZSM-5 molecular sieve (as aluminum) (as oxide) is 0.01-2; for example, the molar ratio of the two is 0.1-1.5; further for example, the molar ratio of the two is 0.2-1.5. The phosphorus-containing compound is selected from organic phosphorous compounds, such as trimethyl phosphate, triphenylphosphine, trimethyl phosphite, tetrabutylphosphonium bromide, tetrabutylphosphonium chloride, tetrabutylphosphonium hydroxide, triphenylethylphosphonium bromide, triphenylbutylphosphonium bromide, triphenylbenzylphosphonium bromide, hexamethylphosphoric triamide, dibenzyl diethylphosphoramidite, 1,3-bis((triethyl-phosphaneyl)methyl)benzene and the like, inorganic phosphorus compounds, such as phosphoric acid, ammonium hydrogen phosphate, diammonium hydrogen phosphate, ammonium phosphate, and boron phosphate or a mixture thereof, and the like. The inventors have found that when boron phosphate is used as one of the phosphorus-containing compounds and the hydrothermal calcining is performed at 300-500° C., phosphorus has better dispersity in the molecular sieve. Therefore, for example, the combination of phosphorus-containing compounds is a mixture of boron phosphate and one or more of trimethyl phosphate, triphenylphosphine, trimethyl phosphite, phosphoric acid, ammonium hydrogen phosphate, diammonium hydrogen phosphate, and ammonium phosphate. In the boron phosphate-containing mixture, boron phosphate comprises 10%-80% by weight, for example, 20%-40%, further for example, 25%-35%.

According to the process of preparing the phosphorus-modified MFI-structured molecular sieve, the contacting is to make an aqueous solution of the phosphorus-containing compound at a temperature of 30-150° C. and a hydrogen-type MFI-structured molecular sieve at a temperature of 30-150° C. in contact at substantially the same temperature for at least 0.1 hours through the immersion method. The contact is performed for example, in a higher temperature range above 40° C., for example, 50-150° C., further for example, 70-130° C., which can produce a better result, i.e., the better dispersion of phosphorus species, and the easier migration of phosphorus into the crystal interior of the hydrogen-type MFI-structured molecular sieve to combine with the framework aluminum, which further improves the coordination degree of phosphorus and the framework aluminum, and finally contributes to improving the hydrothermal stability of the molecular sieve. The substantially same temperature means that the temperature difference between the temperature of the aqueous solution of the phosphorus-containing compound and the temperature of the hydrogen-type MFI-structured molecular sieve is within ±5° C. For example, the temperature of the aqueous solution of the phosphorus-containing compound is 80° C., and the HZSM-5 molecular sieve needs to be heated to 75-85° C.

According to the process of preparing the phosphorus-modified MFI-structured molecular sieve, the contacting may also be to mix the phosphorus-containing compound, the hydrogen-type MFI-structured molecular sieve, and water, and maintain at 30-150° C. for at least 0.1 hours. For example, in order to produce a better result, i.e., the better dispersion of phosphorus species, and the easier migration of phosphorus into the crystal interior of the molecular sieve to combine with the framework aluminum, to further improve the coordination degree of phosphorus and the framework aluminum, and to finally improve the hydrothermal stability of the molecular sieve, the phosphorus-containing compound, the hydrogen-type MFI-structured molecular sieve, and water are mixed, and then maintained at a higher temperature range above 40° C. for 0.1 hours, for example, a temperature range of 50-150° C., further for example, a temperature range of 70-130° C.

According to the process of preparing the phosphorus-modified MFI-structured molecular sieve, the weight ratio of water/molecular sieve is 0.5-1, and the time is 0.5-40 hours. For example, the calcining is performed at 450-550° C., under the water vapor atmosphere.

The present invention also provides a catalytic cracking auxiliary, based on the dry basis weight of the catalytic cracking auxiliary, the catalytic cracking auxiliary contains 5-75 wt % of a phosphorus-modified MFI-structured molecular sieve; wherein, the phosphorus-modified MFI-structured molecular sieve has a K value satisfying: 70%≤K≤90%, the K=[the mass content of phosphorus within a region having an area of 100 square nanometers and a vertical depth from 5 to 10 nm at any crystal surface of the crystal grain of a molecular sieve, as measured by the EPMA method]/[the mass content of phosphorus within a region having an area of 100 square nanometers and a vertical depth from 0 to 2 nm at any crystal surface of the crystal grain of a molecular sieve, as measured by the XPS method]×100%, wherein the XPS analysis on the surface of the molecular sieve is performed by using the ESCAREB 250 Type X-ray photoelectron spectrometer of Thermo Fisher-VG Company, the excitation source is a monochromatic AlKα X-ray with a power of 150 W, and the charge shift is calibrated with the C1s peak (284.8 eV) from a contaminated carbon; the EPMA analysis on the surface of the molecular sieve is performed with JXA-8230 energy spectrometer X-ray detector, wherein for the count rate and the counting time, the totalized counting number is generally greater than $10^5$, the counting rate is $10^3$-$10^4$ CPS, and the counting time is 10-100 seconds.

In the catalytic cracking auxiliary of the present invention, in the phosphorus-modified MFI-structured molecular sieve, the K value satisfies 75%≤K≤90%, for example, the K value satisfies 78%≤K≤85%.

In the catalytic cracking auxiliary of the present invention, for the phosphorus-modified MFI-structured molecular sieve, the molar ratio of the phosphorus content as P2O5 to the alumina content is ≥0.01, for example, ≥0.2, further for example, ≥0.3, still further for example, 0.4-0.7.

In the catalytic cracking auxiliary of the present invention, for example, the phosphorus-modified MFI-structured molecular sieve is a micropore ZSM-5 molecular sieve or a hierarchical ZSM-5 molecular sieve. The micropore ZSM-5 molecular sieve has a silica/alumina molar ratio of 15-1000, for example, 20-200. The hierarchical ZSM-5 molecular sieve has a proportion of the mesopore volume relative to the total pore volume of greater than 10%, an average pore diameter of 2-20 nm, and a silica/alumina molar ratio of 15-1000, for example, 20-200.

In the catalytic cracking auxiliary of the present invention, based on the dry basis of the catalytic cracking auxiliary, the catalytic cracking auxiliary contains 5-75 wt %, for example, 8-60 wt % of a phosphorus-modified MFI-structured molecular sieve, and can also contain 1-40 wt % of a binder and 0-65 wt % of a second clay. The binder can be inorganic oxide binders that are familiar to those skilled in the art and conventionally used as the binder component of the auxiliary or catalyst, for example, one or more of pseudo-boehmite, alumina sol, silica-alumina sol, and water glass. For example, the binder contains a phosphorus-aluminum inorganic binder, that is, a phosphorus-aluminum inorganic binder or a mixture of a phosphorus-aluminum inorganic binder and other inorganic binder(s).

In the catalytic cracking auxiliary of the present invention, the phosphorus-aluminum inorganic binder is for example, a phosphorus-aluminum glue and/or a first clay-containing phosphorus-aluminum inorganic binder. Based on the dry basis of the first clay-containing phosphorus-aluminum inorganic binder, the first clay-containing phosphorus-aluminum inorganic binder contains 10-40 wt %, for example, 15-40 wt %, for example, 10-35 wt %, for example, 15-35 wt % of an aluminum component (as Al2O3), 45-90 wt %, for example, 45-80 wt %, for example, 50-75 wt % of a phosphorus component (as P2O5) and on a dry basis, greater than 0 and not more than 40 wt %, for example, 8-35 wt % of a first clay, and the first clay-containing phosphorus-aluminum inorganic binder has a P/Al weight ratio of 1.0-6.0, for example, 1.2-6.0, further for example, 2.0-5.0, a pH of 1-3.5, for example, 2.0-3.0, and solid content of 15-60 wt %. For example, in an embodiment of the phosphorus-aluminum inorganic binder, based on the dry basis weight of the phosphorus-aluminum inorganic binder, the phosphorus-aluminum inorganic binder comprises 20-40 wt % of an aluminum component (as Al2O3) and 60-80 wt % of a phosphorus component (as P2O5).

In the catalytic cracking auxiliary of the present invention, the first clay can be at least one selected from kaolin, sepiolite, attapulgite, rectorite, smectite, and diatomite; the other inorganic binder can be selected from one or more of inorganic oxide binders conventionally used in the binder component of the catalytic cracking auxiliary or catalyst, besides the phosphorus-aluminum glue and the phosphorus-aluminum inorganic binder, for example, selected from at least one of pseudo-boehmite, alumina sol, silica-alumina sol, and water glass, further for example, selected from at least one of pseudo-boehmite and alumina sol.

The catalytic cracking auxiliary of the present invention, based on the dry basis of the catalytic cracking auxiliary, further contains 0-65 wt %, for example, 5-55 wt % of a second clay. The second clay is also well known by those skilled in the art, and for example, selected from at least one of kaolin, sepiolite, attapulgite, rectorite, smectite, giagerite, halloysite, hydrotalcite, bentonite, and diatomite.

In an embodiment of the catalytic cracking auxiliary of the present invention, based on the dry basis of the catalytic cracking auxiliary, it comprises 20-60 wt % of a phosphorus-modified MFI-structured molecular sieve, 5-35 wt % of a binder and 5-55 wt % of a second clay.

The present invention also provides a process of preparing the catalytic cracking auxiliary, wherein the process comprises: a phosphorus-modified MFI-structured molecular sieve of the present invention, a binder, and optionally a second clay are vigorously mixed and stirred with water, and spray-dried to produce the catalytic cracking auxiliary.

In the process of preparing the catalytic cracking auxiliary, the binder contains a phosphorus-aluminum inorganic binder and other inorganic binder(s), on a dry basis, the ratio by weight of the phosphorus-modified MFI-structured molecular sieve: the phosphorus-aluminum inorganic binder: the other inorganic binder can be (10-75):(3-39):(1-30), for example, (10-75):(8-35):(5-25); wherein the phosphorus-aluminum inorganic binder can be a phosphorus-aluminum glue and/or a first clay-containing phosphorus-aluminum inorganic binder; the other inorganic binder can comprise at least one of pseudo-boehmite, alumina sol, silica-alumina sol, and water glass. The preparation process may comprise "mixing" or "vigorously mixing and stirring (with water)" the phosphorus-modified MFI-structured molecular sieve, the phosphorus-aluminum inorganic binder and other inorganic binder(s). No special requirement is imposed on the charging order. For example, the phosphorus-aluminum inorganic binder, other inorganic binder(s), the phosphorus-modified MFI-structured molecular sieve, and the second clay (in case of no second clay, the relevant charging step can be omitted) can be mixed, and vigorously mixed and stirred with water. Alternatively, the second clay, the phosphorus-modified MFI-structured molecular sieve, and other inorganic binder(s) can be vigorously mixed and stirred with water, and then the phosphorus-aluminum inorganic binder is added, which can help to improve the activity and selectivity of the auxiliary.

In the process of preparing the catalytic cracking auxiliary, it further comprises a step of spray-drying the slurry obtained from "vigorously mixing and stirring with water". The method of spray-drying is well known to those skilled in the art, and there is no special requirement in the present invention. Optionally, the preparation process may further comprise: the spray-dried product is subjected to a first calcining, and then washed, and optionally dried to produce the catalytic cracking auxiliary. Herein, for the first calcining, the calcining temperature can be 300-650° C., for example, 400-600° C., such as 450-550° C., and the calcining time can be 0.5-8 hours; for the washing, one of ammonium sulfate, ammonium chloride, and ammonium nitrate can be used, the washing temperature can be 40-70° C.; the drying temperature can be 100-200° C., for example, 100-150° C., and the drying time can be 0.5-24 h, for example, 1-12 h.

In an embodiment of the process of preparing the catalytic cracking auxiliary, a binder, a second clay, and water (for example, decationized water and/or deionized water) are mixed to form a slurry having a solid content of 10-50 wt %. The slurry is stirred well, adjusted with an inorganic acid such as hydrochloric acid, nitric acid, phosphoric acid, or sulfuric acid to a pH of 1-4 and maintained at this pH, allowed to stand for aging at 20-80° C. for 0-2 hours (such as 0.3-2 hours). Then an inorganic binder such as alumina sol and/or silica sol is added, and the mixture is stirred for 0.5-1.5 hours to form a gel. Then the phosphorus-modified MFI-structured molecular sieve is added to form an auxiliary slurry having a solid content of for example, 20-45 wt %. The auxiliary slurry continued to be stirred and spray-dried to form auxiliary microspheres. Then auxiliary microspheres are subjected to a first calcining, for example, at 350-650° C. or 400-600° C. such as 450-550° C. for 0.5-6 hours or 0.5-2 hours, and then washed with ammonium sulfate (wherein the washing temperature can be 40-70° C., ammonium sulfate:auxiliary microspheres:water=0.2-0.8:1:5-15 (weight ratio)) to the sodium oxide content less than 0.25 wt %, washed with water and filtered, and then dried.

In an embodiment of the process of preparing the catalytic cracking auxiliary, to the phosphorus-modified MFI-structured molecular sieve, a second clay (for example, kaolin) and a binder (for example, pseudo-boehmite) are added water (for example, decationized water and/or deionized water) and an inorganic binder such as alumina sol and/or silica sol, vigorously mixed and stirred for 0.1-10 hours (for example, 120 minutes) to produce a slurry having a solid content of 10-50 wt % (for example, 30 wt %); an inorganic acid such as hydrochloric acid, nitric acid, phosphoric acid or sulfuric acid is added to adjust the slurry to a pH of 1-4 (for example, 3.0); and then the vigorously mixing and stirring continued for 0.1-10 hours (for example, 45 minutes), then a phosphorus-aluminum inorganic binder was added, the mixture is stirred for 0.1-10 hours (for example, 30 minutes); the resulting slurry is spray-dried to produce microspheres, and the microspheres are calcined at 350-650° C. or 400-600° C. (for example, 500° C.) for 0.5-6 hours or 0.5-2 hours (for example, 1 hour) to produce the catalytic cracking auxiliary.

In an embodiment of the process of preparing the catalytic cracking auxiliary, a binder (for example, alumina sol) and a second clay (for example, kaolin) are mixed, water (for example, decationized water and/or deionized water) is added to form a slurry having a solid content of 10-50 wt % (for example, 30 wt %); the slurry is stirred well and adjusted to a pH of 1-4 (for example, 2.8) with an inorganic acid such as hydrochloric acid, nitric acid, phosphoric acid or sulfuric acid; allowed to stand for aging at 20-80° C. (for example, 55° C.) for 0.1-2 hours (for example, 1 hour); then the phosphorus-modified MFI-structured molecular sieve is added to form a slurry having a solid content of 10-50 wt % (for example, 35 wt %); the slurry is continuously stirred and then spray-dried to form auxiliary microspheres. Then auxiliary microspheres are subjected to a first calcining, for example, at 350-650° C. or 400-600° C. such as 450-550° C. for 0.5-6 hours or 0.5-2 hours (for example, at 500° C. for 1 hour), and then washed with ammonium sulfate (wherein the washing temperature can be 40-70° C., for example, 60° C., ammonium sulfate:auxiliary microspheres:water=0.2-0.8:1:5-15 (weight ratio, for example, 0.5:1:10)) to the sodium oxide content less than 0.25 wt %, washed with water and filtered, and then dried (for example, at 100-200° C., such as 110° C.).

In the process of preparing the catalytic cracking auxiliary, the first clay-containing phosphorus-aluminum inorganic binder can be prepared by using the following steps: an alumina source, the first clay, and water are vigorously mixed and stirred to disperse into a slurry having a solid content of 5-48 wt %; wherein the alumina source is aluminum hydroxide and/or alumina that can be peptized by an acid, relative to 10-40 parts by weight, for example, 15-40 parts by weight of the alumina source (as Al2O3), the used amount of the first clay based on the dry weight is greater than 0 part by weight and not more than 40 parts by weight; a concentrated phosphoric acid is added to the slurry under stirring according to the weight ratio of P/Al=1-6, and the resulting mixed slurry is reacted at 50-99° C. for 15-90 minutes; wherein P in the P/Al is the weight of phosphorus as the simple substance in phosphoric acid, Al is the weight of aluminum as the simple substance in the alumina source. The alumina source can be at least one selected from ρ-alumina, x-alumina, η-alumina, γ-alumina, κ-alumina, σ-alumina, θ-alumina, gibbsite, bayerite, nordshandite, diaspore, boehmite and pseudo-boehmite, the aluminum component in the first clay-containing phosphorus-aluminum inorganic binder is derived from the alumina source. The first clay may comprise one or more of kaolin, sepiolite, attapulgite, rectorite, smectite, and diatomite, for example, rectorite. The concentration of the concentrated phosphoric acid can be 60-98 wt %, further for example, 75-90 wt %, the feeding rate of phosphoric acid is, for example, 0.01-0.10 kg phosphoric acid/min/kg alumina source, further for example, 0.03-0.07 kg phosphoric acid/min/kg alumina source.

In the process of preparing the catalytic cracking auxiliary, the introduction of the clay into the first clay-containing phosphorus-aluminum inorganic binder not only improves the mass transfer and the heat transfer between materials during the preparation process but also avoids the binder solidification due to the overtemperature caused by the heat release from the local instant violent reaction by uneven materials; and the bonding performance of the obtained binder is comparable to that of the phosphorus-aluminum binder prepared by the method without the introduction of clay. Moreover, the introduction of clay, especially rectorite with layered structure in the process improves the heavy oil conversion ability of the catalyst composition, so that the obtained auxiliary has better selectivity.

The present invention further provides the use of the catalytic cracking auxiliary, that is, a process for catalytically cracking a hydrocarbon oil, the process comprises: reacting the hydrocarbon oil by contacting the catalytic cracking auxiliary according to the present invention under the catalytic cracking condition.

The process for catalytically cracking the hydrocarbon oil of the present invention comprises: the hydrocarbon oil is reacted by contacting a catalyst mixture containing the catalytic cracking auxiliary and a catalytic cracking catalyst under the catalytic cracking condition; in the catalyst mixture, the content of the catalytic cracking auxiliary is 0.1-30 wt %.

Optionally, the catalytic cracking condition includes: the reaction temperature is 500-800° C.; the hydrocarbon oil is one or more selected from crude oil, naphtha, gasoline, atmospheric residue, vacuum residue, atmospheric gas oil, vacuum gas oil, straight-run gas oil, propane light/heavy deasphalted oil, coker gas oil, and coal liquefaction product.

The present invention also provides a catalytic cracking catalyst containing phosphorus-modified MFI-structured molecular sieve(s), based on the dry basis of the catalyst, the catalytic cracking catalyst contains 1-25 wt % of a Y zeolite, 5-50 wt % of a phosphorus-modified MFI-structured molecular sieve, 1-60 wt % of an inorganic binder and optionally 0-60 wt % of a second clay, wherein the inorganic binder comprises a phosphorus-aluminum inorganic binder and/or other inorganic binder(s), the phosphorus-modified MFI-structured molecular sieve has a K value satisfying: 70%≤K≤90%, the K=[the mass content of phosphorus within a region having an area of 100 square nanometers and a vertical depth from 5 to 10 nm at any crystal surface of the crystal grain of a molecular sieve, as measured by the EPMA method]/[the mass content of phosphorus within a region having an area of 100 square nanometers and a vertical depth from 0 to 2 nm at any crystal surface of the crystal grain of a molecular sieve, as measured by the XPS method]×100%, wherein the XPS analysis on the surface of the molecular sieve is performed by using the ESCAREB 250 Type X-ray photoelectron spectrometer of Thermo Fisher-VG Company, the excitation source is a monochromatic AlKα X-ray with a power of 150 W, and the charge shift is calibrated with the C1s peak (284.8 eV) from a contaminated carbon; the EPMA analysis on the surface of the molecular sieve is performed with JXA-8230 energy spectrometer X-ray detector, wherein for the count rate and the counting time, the totalized counting number is generally greater than $10^5$, the counting rate is $10^3$-$10^4$ CPS, and the counting time is 10-100 seconds.

In the catalytic cracking catalyst of the present invention, the Y zeolite comprises at least one of a PSRY zeolite, a rare earth-containing PSRY zeolite, a USY zeolite, a rare earth-containing USY zeolite, a REY zeolite, a REHY zeolite and an HY zeolite.

In the catalytic cracking catalyst of the present invention, in the phosphorus-modified MFI-structured molecular sieve, the K value satisfies 75%≤K≤90%, for example, the K value satisfies 78%≤K≤85%.

In the catalytic cracking catalyst of the present invention, for the phosphorus-modified MFI-structured molecular sieve, the molar ratio of the phosphorus content as P2O5 to the alumina content is ≥0.01, for example, ≥0.2, further for example, ≥0.3, still further for example, 0.4-0.7.

In the catalytic cracking catalyst of the present invention, for example, the phosphorus-modified MFI-structured molecular sieve is a micropore ZSM-5 molecular sieve or a hierarchical ZSM-5 molecular sieve. The micropore ZSM-5 molecular sieve has a silica/alumina molar ratio of 15-1000, for example, 20-200. The hierarchical ZSM-5 molecular sieve has a proportion of the mesopore volume relative to the total pore volume of greater than 10%, an average pore diameter of 2-20 nm, and a silica/alumina molar ratio of 15-1000, for example, 20-200.

For example, in the catalytic cracking catalyst of the present invention, based on the dry basis of the catalytic cracking catalyst, the catalytic cracking catalyst may contain 2-20 wt % of Y zeolite, 10-40 wt %, for example, 20-40 wt % of phosphorus-modified MFI-structured molecular sieve, and can also contain 1-40 wt % of an inorganic binder and 0-50 wt % of a second clay. Further for example, based on the dry basis of the catalyst, it may contain 3-40 wt % of phosphorus-aluminum inorganic binder or contain 3-40 wt % of a phosphorus-aluminum inorganic binder and 1-30 wt % of other inorganic binder(s).

In the catalytic cracking catalyst of the present invention, the phosphorus-aluminum inorganic binder is a phosphorus-aluminum glue and/or a first clay-containing phosphorus-aluminum inorganic binder. Based on the dry basis of the first clay-containing phosphorus-aluminum inorganic binder, the first clay-containing phosphorus-aluminum inorganic binder contains 10-40 wt %, for example, 15-40 wt % of aluminum component (as Al2O3), 45-90 wt %, for example, 45-80 wt % of phosphorus component (as P2O5) and greater than 0 and not more than 40 wt % of a first clay on a dry basis, and the first clay-containing phosphorus-aluminum inorganic binder has a P/Al weight ratio of 1.0-6.0, a pH of 1-3.5, and a solid content of 15-60 wt %.

In the catalytic cracking catalyst of the present invention, the first clay comprises at least one of kaolin, sepiolite, attapulgite, rectorite, smectite, and diatomite.

In the catalytic cracking catalyst of the present invention, in an embodiment of the phosphorus-aluminum inorganic binder, based on the dry basis weight of the phosphorus-aluminum inorganic binder, the phosphorus-aluminum inorganic binder may comprise 10-40 wt %, for example, 15-40 wt % aluminum component (as Al2O3), 45-90 wt %, for example, 45-80 wt % of phosphorus component (as P2O5) and based on the dry weight 0-40 wt % of first clay, and may have a P/Al weight ratio of 1.0-6.0, a pH value of 1-3.5, and a solid content of 15-60 wt %; for example, it may contain 15-35 wt % of aluminum component (as Al2O3), 50-75 wt % of phosphorus component (as P2O5) and 8-35 wt % of first clay, and may have a P/Al weight ratio of for example, 1.2-6.0, further for example, 2.0-5.0, and a pH value of for example, 2.0-3.0.

In the catalytic cracking catalyst of the present invention, in another embodiment of the phosphorus-aluminum inorganic binder, based on the dry basis weight of the phosphorus-aluminum inorganic binder, the phosphorus-aluminum inorganic binder comprises 20-40 wt % of an aluminum component (as Al2O3) and 60-80 wt % of a phosphorus component (as P2O5).

In the catalytic cracking catalyst of the present invention, the other inorganic binder can be selected from one or more of the inorganic oxide binders conventionally used in the binder component of the catalytic cracking auxiliary or catalyst, besides the phosphorus-aluminum glue and the phosphorus-aluminum inorganic binder, for example, at least one selected from pseudo-boehmite, alumina sol, silica-alumina sol, and water glass, further for example, at least one selected from pseudo-boehmite and alumina sol.

The catalytic cracking catalyst of the present invention, on a dry basis, further contains 0-65 wt %, for example, 5 wt %-55 wt % of a second clay. The second clay is also well known by those skilled in the art, and for example, selected from at least one of kaolin, sepiolite, attapulgite, rectorite, smectite, giagerite, halloysite, hydrotalcite, bentonite, and diatomite.

The present invention also provides a process of preparing a catalytic cracking catalyst, wherein the process comprises a Y zeolite, the phosphorus-modified MFI-structured molecular sieve, an inorganic binder, and optionally a second clay are vigorously mixed and stirred with water, and spray-dried to produce the catalytic cracking catalyst.

In the process of preparing a catalytic cracking catalyst of the present invention, the process may also include: the calcined product is washed and optionally dried to produce the catalytic cracking catalyst; herein, for the calcining, the calcining temperature can be 300-650° C., for example, 400-600° C., preferably 450-550° C., and the calcining time can be 0.5-12 hours; for the washing, one of ammonium sulfate, ammonium chloride, and ammonium nitrate can be used, the washing temperature can be 40-80° C.; the drying temperature can be 110-200° C., for example, 120-150° C., and the drying time can be 0.5-18 h, for example, 2-12 h.

In an embodiment of the process of preparing a catalytic cracking catalyst of the present invention, an inorganic binder (for example, pseudo-boehmite, alumina sol, silica sol, silica-alumina gel, or a mixture of two or more thereof) and a second clay (for example, kaolin) and water (for example, decationized water and/or deionized water) can be mixed to form a slurry having a solid content of 10-50 wt %. The slurry is stirred well, adjusted with an inorganic acid such as hydrochloric acid, nitric acid, phosphoric acid or sulfuric acid to a pH of 1-4 and maintained at this pH, allowed to stand for aging at 20-80° C. for 0-2 hours (such as 0.3-2 hours). Then alumina sol and/or silica sol is added, and the mixture is stirred for 0.5-1.5 hours to form a gel. Then a molecular sieve (including the phosphorus-modified ZSM-5 molecular sieve and Y zeolite) is added to form a catalyst slurry having a solid content of for example, 20-45 wt %. The catalyst slurry continued to be stirred and spray-dried to form catalyst microspheres. Then catalyst microspheres are calcined, for example, at 350-650° C. or 400-600° C., for example, 450-550° C. for 0.5-6 hours or 0.5-2 hours, and then washed with ammonium sulfate (wherein the washing temperature can be 40-70° C., ammonium sulfate:catalyst microspheres:water=0.2-0.8:1:5-15 (weight ratio)) to the sodium oxide content less than 0.25 wt %, washed with water and filtered, and then dried.

In an embodiment of the process of preparing a catalytic cracking catalyst of the present invention, the phosphorus-modified ZSM-5 molecular sieve, Y zeolite, second clay (for example, kaolin), and inorganic binder (for example, pseudo-boehmite, alumina sol, silica sol, silica-alumina gel or a mixture of two or more thereof) are mixed, water (for example, decationized water and/or deionized water) and alumina sol and/or silica sol are added, the resulting mixture is vigorously mixed and stirred for 0.1-10 hours (for example, 120 minutes) to form a slurry having a solid content of 20-45 wt % (for example, 30 wt %). The slurry is adjusted to a pH of 1-4 (for example, 3.0) by adding an inorganic acid such as hydrochloric acid, nitric acid, phosphoric acid, or sulfuric acid, and then continued to be vigorously mixed and stirred for 0.1-10 hours (for example, 45 minutes). Then a phosphorus-aluminum inorganic binder is added, and the mixture was stirred for 0.1-10 hours (for example, 30 minutes) to produce a slurry. The resulting slurry was spray-dried to form catalyst microspheres. Then catalyst microspheres are calcined, for example, at 350-650° C. or 400-600° C., for example, 450-550° C. for 0.5-6 hours or 0.5-2 hours (for example, at 500° C. for 1 hour) to produce the catalytic cracking catalyst.

In an embodiment of the process of preparing a catalytic cracking catalyst of the present invention, a binder inorganic binder (for example, pseudo-boehmite, alumina sol, silica sol, silica-alumina gel, or a mixture of two or more thereof) and second clay (for example, kaolin) are mixed, water (for example, decationized water and/or deionized water) is added to form a slurry having a solid content of 10-50 wt % (for example, 30 wt %); the slurry is stirred well and adjusted to a pH of 1-4 (for example, 2.8) with an inorganic acid such as hydrochloric acid, nitric acid, phosphoric acid or sulfuric acid; allowed to stand for aging at 20-80° C. (for example, 55° C.) for 0.1-2 hours (for example, 1 hour); then the phosphorus-modified ZSM-5 molecular sieve and Y zeolite are added to form a catalyst slurry having a solid content of 20-45 wt % (for example, 35 wt %); the catalyst slurry is continuously stirred and then spray-dried to form catalyst microspheres. Then catalyst microspheres are calcined for example, at 350-650° C. or 400-600° C. such as 450-550° C. for 0.5-6 hours or 0.5-2 hours (for example, at 500° C. for 1 hour), and then washed with ammonium sulfate (wherein the washing temperature can be 40-70° C., for example, 60° C., ammonium sulfate:catalyst microspheres:water=0.2-0.8:1:5-15 (weight ratio, for example, 0.5:1:10)) to the sodium oxide content less than 0.25 wt %, washed with water and filtered, and then dried (for example, at 100-200° C., such as 110° C.).

In another embodiment of the process of preparing a catalytic cracking catalyst of the present invention, Y zeolite, a phosphorus-modified ZSM-5 molecular sieve, a phosphorus-aluminum inorganic binder, and other inorganic binder(s), and optionally a second clay can be vigorously mixed and stirred with water, and spray-dried.

In the process of preparing a catalytic cracking catalyst of the present invention, the inorganic binder comprises the phosphorus-aluminum inorganic binder and the other inorganic binder, the ratio by weight of the phosphorus-aluminum inorganic binder to the other inorganic binder can be (3-40):(1-30), for example, (5-35):(5-28), further for example, (10-30):(5-25); wherein the phosphorus-aluminum inorganic binder can be a phosphorus-aluminum glue and/or a first clay-containing phosphorus-aluminum inorganic binder; the other inorganic binder can comprise at least one of pseudo-boehmite, alumina sol, silica-alumina sol and water glass.

The process of preparing a catalytic cracking catalyst of the present invention may comprise "mixing" or "vigorously mixing and stirring (with water)" the phosphorus-modified molecular sieve, the phosphorus-aluminum inorganic binder, and other inorganic binder(s). No special requirement is imposed on the charging order. For example, the phosphorus-aluminum inorganic binder, other inorganic binder(s), the molecular sieve, and the second clay (in case of no second clay, the relevant charging step can be omitted) can be mixed, and vigorously mixed and stirred with water. Alternatively, the second clay, the molecular sieve, and other inorganic binder(s) can be vigorously mixed and stirred with water, and then the phosphorus-aluminum inorganic binder is added, which can help to improve the activity and selectivity of the catalyst.

In the process of preparing a catalytic cracking catalyst of the present invention, the preparation process further comprises a step of spray-drying the slurry obtained from the "vigorously mixing and stirring with water". The method of spray-drying is well known to those skilled in the art, and there is no special requirement in the present disclosure.

Further, in the process of preparing a catalytic cracking catalyst of the present invention, the preparation process may also include: the first clay-containing phosphorus-aluminum inorganic binder is prepared with the following steps: an alumina source, the first clay and water are vigorously mixed and stirred to disperse into a slurry having a solid content of 5-48 wt %; wherein the alumina source is aluminum hydroxide and/or alumina that can be peptized by an acid, relative to 10-40 parts by weight, for example, 15-40 parts by weight of the alumina source (as Al2O3), the used amount of the first clay based on the dry weight is greater than 0 part by weight and not more than 40 parts by weight; a concentrated phosphoric acid is added to the slurry under stirring according to the weight ratio of P/Al=1-6, and the resulting mixed slurry is reacted at 50-99° C. for 15-90 minutes; wherein P in the P/Al is the weight of phosphorus as the simple substance in phosphoric acid, Al is the weight of aluminum as the simple substance in the alumina source. The alumina source can be at least one selected from ρ-alumina, x-alumina, η-alumina, γ-alumina, κ-alumina, σ-alumina, θ-alumina, gibbsite, bayerite, nordshandite, diaspore, boehmite and pseudo-boehmite, the aluminum component in the first clay-containing phosphorus-aluminum inorganic binder is derived from the alumina source. The first clay may comprise one or more of kaolin, sepiolite, attapulgite, rectorite, smectite, and diatomite, for example, rectorite. The concentration of the concentrated phosphoric acid can be 60-98 wt %, further for example, 75-90 wt %, the feeding rate of phosphoric acid is, for example, 0.01-0.10 kg phosphoric acid/min/kg alumina source, further for example, 0.03-0.07 kg phosphoric acid/min/kg alumina source.

In the process of preparing a catalytic cracking catalyst of the present invention, the introduction of the clay into the first clay-containing phosphorus-aluminum inorganic binder not only improves the mass transfer and the heat transfer between materials during the preparation process but also avoids the binder solidification due to the overtemperature caused by the heat release from the local instant violent reaction by uneven materials; and the bonding performance of the obtained binder is comparable to that of the phosphorus-aluminum binder prepared by the method without the introduction of clay. Moreover, the introduction of clay, especially rectorite with layered structure in the process improves the heavy oil conversion ability of the catalyst, so that the obtained catalyst has better selectivity.

The present invention also provides the catalytic cracking catalyst prepared with the above-mentioned process.

The present invention further provides the use of the catalytic cracking catalyst, that is, a process for catalytically cracking a hydrocarbon oil, the process comprises: reacting the hydrocarbon oil by contacting the catalytic cracking catalyst according to the present invention under the catalytic cracking condition. The catalytic cracking condition includes: the reaction temperature is 500-800° C.; the hydrocarbon oil is one or more selected from crude oil, naphtha, gasoline, atmospheric residue, vacuum residue, atmospheric gas oil, vacuum gas oil, straight-run gas oil, propane light/heavy deasphalted oil, coker gas oil, and coal liquefication product. Hydrocarbon oil can contain heavy metal impurities such as nickel and vanadium, as well as sulfur and nitrogen impurities. For example, the content of sulfur in hydrocarbon oil can be as high as 3.0 wt %, the content of nitrogen can be as high as 2.0 wt %, and the content of metal impurities such as vanadium and nickel can be as high as 3000 ppm.

When used in the catalytic cracking process, one embodiment is that the catalytic cracking catalyst can be added to the catalytic cracking reactor alone, for example, under the catalytic cracking condition, the hydrocarbon oil is reacted by contacting the catalytic cracking catalyst of the present invention; when used in the catalytic cracking process, another embodiment is that the catalyst can be mixed with other catalytic cracking catalyst(s), for example, the hydrocarbon oil can be reacted by contacting a catalyst mixture containing the catalytic cracking catalyst of the present invention and other catalytic cracking catalyst(s). The catalyst provided by the present invention may comprise not more than 30 wt % of the total of the above mixture, for example, 1-25 wt %, further for example, 3-15 wt %.

The combined EPMA/XPS method is used to perform the phosphorus content quantitative analysis by scanning the surface, analyzing the chemical composition in microzones and corresponding to the depth structure, and the dispersity K value refers to the ratio by the percentage of the phosphorus mass content on the depth interface of the crystal grain of the molecular sieve to the phosphorus content on the surface of the crystal grain of the molecular sieve, wherein K=P2(EPMA)/P1(XPS) %, P1 (XPS) represents the mass content of phosphorus within microzones having a depth of less than 2 nm at any crystal surface of the crystal grain of a molecular sieve as quantitatively determined by XPS method, and P2 (EPMA) represents the mass content of phosphorus within microzones having a depth from 5 to 10 nm obtained with the focused ion beam (FIB) cutting as quantitatively determined by EPMA method.

The analysis on the surface of the molecular sieve is performed with the X-ray photoelectron spectroscopy (XPS) by using the ESCAREB 250 Type X-ray photoelectron spectrometer of Thermo Fisher-VG Company, wherein the excitation source is a monochromatic AlKα X-ray with a power of 150 W, and the charge shift is calibrated with the C1s peak (284.8 eV) from a contaminated carbon.

EPMA: using JXA-8230 energy spectrometer X-ray detector, the count rate and the counting time, the totalized counting number is generally greater than $10^5$, the counting rate is $10^3$-$10^4$ CPS, and the counting time is 10-100 seconds.

The present invention also provides the following technical solutions:

Aspect 1. A phosphorus-modified MFI-structured molecular sieve, which is characterized in that the molecular sieve has a K value, satisfying 70%≤K≤90%; for example, 75%≤K≤90%; further for example, 78%≤K≤85%;

Wherein, K=P1/P2×100%,

P1 is the mass content of phosphorus within a region having an area of 100 square nanometers and a vertical depth from 0 to 2 nm at any crystal surface of the crystal grain of a molecular sieve, as measured by the XPS method, P2 is the mass content of phosphorus within a region having an area of 100 square nanometers and a vertical depth from 5 to 10 nm at any crystal surface of the crystal grain of a molecular sieve, as measured by the EPMA method.

Aspect 2. The molecular sieve according to any one of the preceding aspects, wherein the molar ratio of the phosphorus content as P2O5 to the alumina content is ≥0.01; for example, ≥0.2; further for example, ≥0.3; still further for example, 0.4-0.7.

Aspect 3. The molecular sieve according to any one of the preceding aspects, wherein the phosphorus-modified MFI-structured molecular sieve is a micropore ZSM-5 molecular sieve or a hierarchical ZSM-5 molecular sieve.

Aspect 4. The molecular sieve according to any of the previous Aspects, wherein the micropore ZSM-5 molecular sieve has a silica/alumina molar ratio of 15-1000, for example, 20-200.

Aspect 5. The molecular sieve according to any of the previous Aspects, wherein the hierarchical ZSM-5 molecular sieve has a proportion of the mesopore volume relative to the total pore volume of greater than 10%, an average pore diameter of 2-20 nm, and a silica/alumina molar ratio of 15-1000, for example, 20-200.

Aspect 6. A catalytic cracking auxiliary, based on the dry basis of the catalytic cracking auxiliary, the catalytic cracking auxiliary contains 5-75 wt %, for example, 8-60 wt % of the phosphorus-modified MFI-structured molecular sieve according to any of the previous Aspects, 1-40 wt % of a binder and 0-65 wt %, for example, 5-55 wt % of a second clay.

Aspect 7. A catalytic cracking catalyst containing phosphorus-modified MFI-structured molecular sieve(s), based on the dry basis of the catalyst, the catalytic cracking catalyst contains 1-25 wt % of Y zeolite, 5-50 wt % of the phosphorus-modified MFI-structured molecular sieve according to any of the previous Aspects, 1-60 wt % of an inorganic binder and optionally 0-60 wt % of a second clay.

Aspect 8. The catalytic cracking auxiliary or the catalytic cracking catalyst according to any of the previous Aspects, wherein the binder or the inorganic binder comprises a phosphorus-aluminum inorganic binder and/or other inorganic binder(s), For example, the phosphorus-aluminum inorganic binder is a phosphorus-aluminum glue and/or a first clay-containing phosphorus-aluminum inorganic binder, further for example, the first clay is selected from kaolin, sepiolite, attapulgite, rectorite, smectite and diatomite; further for example, the first clay-containing phosphorus-aluminum inorganic binder contains 10-40 wt %, for example, 15-40 wt % of aluminum component (as Al2O3), 45-90 wt %, for example, 45-80 wt % of phosphorus component (as P2O5) and greater than 0 and not more than 40 wt % of a first clay on a dry basis, and the first clay-containing phosphorus-aluminum inorganic binder has a P/Al weight ratio of 1.0-6.0, a pH of 1-3.5, and a solid content of 15-60 wt %;

for example, the second clay is selected from kaolin, sepiolite, attapulgite, rectorite, smectite, diatomite, giagerite, halloysite, hydrotalcite, and bentonite;

for example, the other inorganic binder(s) is selected from pseudo-boehmite, alumina sol, silica-alumina sol, and water glass.

Aspect 9. The catalytic cracking catalyst according to any of the previous Aspects, wherein the Y zeolite comprises at least one of PSRY zeolite, PSRY-S zeolite, rare earth-containing PSRY zeolite, rare earth-containing PSRY-S zeolite, USY zeolite, rare earth-containing USY zeolite, REY zeolite, REHY zeolite, and HY zeolite.

Aspect 10. A process of preparing the phosphorus-modified MFI-structured molecular sieve according to any of the previous Aspects, which is characterized in that the phosphorus-modified MFI-structured molecular sieve is obtained through an immersion method, comprising: the contact by mixing an aqueous solution of the phosphorus-containing compound at a temperature of 40-150° C., for example, 50-150° C., further for example, 70-130° C. and an MFI-structured molecular sieve at 40-150° C., for example, 50-150° C., further for example, 70-130° C. at substantially the same temperature for at least 0.1 hours, then the drying, and the calcining at 200-600° C., air or water vapor for at least 0.1 hours; or, vigorously mixing and stirring a phosphorus-containing compound, an MFI-structured molecular sieve and water, adjusting the temperature to 40-150° C., for example, 50-150° C., further for example, 70-130° C., maintaining for at least 0.1 hours, then drying, and calcining at 200-600° C., air or water vapor for at least 0.1 hours.

Aspect 11. The process of preparing the phosphorus-modified MFI-structured molecular sieve according to any of the previous Aspects, wherein the phosphorus-containing compound is selected from organic phosphorous compounds and/or inorganic phosphorous compounds; for example, the organic phosphorous compound is selected from trimethyl phosphate, triphenylphosphine, trimethyl phosphite, tetrabutylphosphonium bromide, tetrabutylphosphonium chloride, tetrabutylphosphonium hydroxide, triphenylethylphosphonium bromide, triphenylbutylphosphonium bromide, triphenylbenzylphosphonium bromide, hexamethylphosphoric triamide, dibenzyl diethylphosphoramidite, 1,3-bis ((triethyl-phosphaneyl)methyl)benzene, the inorganic phosphorous compound is selected from phosphoric acid, ammonium hydrogen phosphate, diammonium hydrogen phosphate, ammonium phosphate, boron phosphate.

Aspect 12. The process of preparing the phosphorus-modified MFI-structured molecular sieve according to any of the previous Aspects, wherein the molar ratio of the phosphorus-containing compound (as phosphorus) (as oxide) to the MFI-structured molecular sieve (for example, hydrogen-type ZSM-5 molecular sieve) (as aluminum) (as oxide) is 0.01-2; for example, the molar ratio of the two is 0.1-1.5; further for example, the molar ratio of the two is 0.2-1.5.

Aspect 13. The process of preparing the phosphorus-modified MFI-structured molecular sieve according to any of the previous Aspects, wherein the phosphorus-containing compound is a mixture of boron phosphate and one or more selected from trimethyl phosphate, triphenylphosphine, trimethyl phosphite, phosphoric acid, ammonium hydrogen phosphate, diammonium hydrogen phosphate, and ammonium phosphate, in the mixture, boron phosphate comprises 10%-80% by weight, for example, boron phosphate comprises 20%-40% by weight.

Aspect 14. The process of preparing the phosphorus-modified MFI-structured molecular sieve according to any of the previous Aspects, wherein the weight ratio of water/molecular sieve in the contacting is 0.5-1, and the contacting time is 0.5-40 hours.

Aspect 15. The process of preparing the phosphorus-modified MFI-structured molecular sieve according to any of the previous Aspects, wherein the calcining is performed at 450-550° C., under the water vapor atmosphere.

Aspect 16. A process of preparing the catalytic cracking auxiliary according to any of the previous Aspects, wherein the process comprises a phosphorus-modified MFI-structured molecular sieve, a binder, and optionally a second clay are vigorously mixed and stirred with water and spray-dried to produce the catalytic cracking auxiliary.

Aspect 17. The process of preparing the catalytic cracking auxiliary according to any of the previous Aspects, wherein the binder includes or is a phosphorus-aluminum inorganic binder.

Aspect 18. The process of preparing the catalytic cracking auxiliary according to any of the previous Aspects, wherein the phosphorus-aluminum inorganic binder is a phosphorus-aluminum glue and/or a first clay-containing phosphorus-aluminum inorganic binder; based on the dry basis weight of the first clay-containing phosphorus-aluminum inorganic binder, the first clay-containing phosphorus-aluminum inorganic binder contains 10-40 wt %, for example, 15-40 wt %, or 10-30 wt %, or 15-35 wt % or 20-40 wt % of an aluminum component (as Al2O3), 45-90 wt %, for example, 45-80 wt %, or 50-75 wt % or 60-80 wt % of a phosphorus component (as P2O5) and on a dry basis, greater than 0 and not more than 40 wt %, for example, 8-35 wt % of a first clay, and the first clay-containing phosphorus-aluminum inorganic binder has a P/Al weight ratio of 1.0-6.0, for example, 1.2-6.0, further for example, 2.0-5.0, a pH of 1-3.5, for example, 2.0-3.0, and a solid content of 15-60 wt %; the first clay comprises at least one of kaolin, sepiolite, attapulgite, rectorite, smectite and diatomite.

Aspect 19. The process of preparing the catalytic cracking auxiliary according to any of the previous Aspects, wherein the second clay is at least one selected from kaolin, sepiolite, attapulgite, rectorite, smectite, giagerite, halloysite, hydrotalcite, bentonite, and diatomite.

Aspect 20. The process of preparing the catalytic cracking auxiliary according to any of the previous Aspects, wherein based on the total weight of the catalytic cracking auxiliary, the binder comprises based on the dry weight, 3-39 wt % of the phosphorus-aluminum inorganic binder and based on the dry weight, 1-30 wt % of other inorganic binders.

Aspect 21. The process of preparing the catalytic cracking auxiliary according to any of the previous Aspects, wherein the other inorganic binder(s) may also include at least one of pseudo-boehmite, alumina sol, silica-alumina sol, and water glass.

Aspect 22. The process of preparing the catalytic cracking auxiliary according to any of the previous Aspects, wherein the process further comprises: the spray-dried product is subjected to a first calcining, and then washed, and optionally dried to produce the catalytic cracking auxiliary;

wherein for the first calcining, the calcining temperature is 300-650° C., the calcining time is 0.5-8 h; the drying temperature is 100-200° C., the drying time is 0.5-24 h.

Aspect 23. The process of preparing the catalytic cracking auxiliary according to any of the previous Aspects, wherein the process further comprises: the first clay-containing phosphorus-aluminum inorganic binder is prepared with the following steps: an alumina source, the first clay and water are vigorously mixed and stirred to disperse into a slurry having a solid content of 5-48 wt %; wherein the alumina source is aluminum hydroxide and/or alumina that can be peptized by an acid, relative to 10-40 parts by weight, for example, 15-40 parts by weight of the alumina source (as Al2O3), the used amount of the first clay based on the dry weight is greater than 0 part by weight and not more than 40 parts by weight; a concentrated phosphoric acid is added to the slurry under stirring according to the weight ratio of P/Al=1-6, and the resulting mixed slurry is reacted at 50-99° C. for 15-90 minutes; wherein P in the P/Al is the weight of phosphorus as the simple substance in phosphoric acid, Al is the weight of aluminum as the simple substance in the alumina source.

Aspect 24. A process of preparing the catalytic cracking catalyst according to any of the previous Aspects, wherein the process comprises a Y zeolite, the phosphorus-modified MFI-structured molecular sieve according to any of the previous Aspects, an inorganic binder and optionally a second clay are vigorously mixed and stirred with water, and spray-dried to produce the catalytic cracking catalyst.

Aspect 25. The process of preparing the catalytic cracking catalyst according to any of the previous Aspects, wherein the inorganic binder includes or is a phosphorus-aluminum inorganic binder.

Aspect 26. The process of preparing the catalytic cracking catalyst according to any of the previous Aspects, wherein the phosphorus-aluminum inorganic binder is a phosphorus-aluminum glue and/or a first clay-containing phosphorus-aluminum inorganic binder; based on the dry basis weight of the first clay-containing phosphorus-aluminum inorganic binder, the first clay-containing phosphorus-aluminum inorganic binder contains 10-40 wt %, for example, 15-40 wt % of aluminum component (as Al2O3), 45-90 wt %, for example, 45-80 wt % of phosphorus component (as P2O5) and greater than 0 and not more than 40 wt % of a first clay on a dry basis, and the first clay-containing phosphorus-aluminum inorganic binder has a P/Al weight ratio of 1.0-6.0, a pH of 1-3.5, and a solid content of 15-60 wt %; the first clay comprises at least one of kaolin, sepiolite, attapulgite, rectorite, smectite and diatomite.

Aspect 27. The process of preparing the catalytic cracking catalyst according to any of the previous Aspects, wherein the second clay is at least one selected from kaolin, sepiolite, attapulgite, rectorite, smectite, giagerite, halloysite, hydrotalcite, bentonite, and diatomite.

Aspect 28. The process of preparing the catalytic cracking catalyst according to any of the previous Aspects, wherein based on the catalytic cracking catalyst, the inorganic binder comprises on the dry basis 3-39 wt % of the phosphorus-aluminum inorganic binder and on the dry basis 1-30 wt % of the other inorganic binder, the other inorganic binder(s) is at least one selected from pseudo-boehmite, alumina sol, silica-alumina sol, and water glass.

Aspect 29. The process of preparing the catalytic cracking catalyst according to any of the previous Aspects, wherein the process further comprises: the spray-dried product is subjected to a first calcining, and then washed, and optionally dried to produce the catalytic cracking catalyst; wherein for the first calcining, the calcining temperature is 300-650° C., the calcining time is 0.5-8 h; the drying temperature is 100-200° C., the drying time is 0.5-24 h.

Aspect 30. The process of preparing the catalytic cracking catalyst according to any of the previous Aspects, wherein the process further comprises: the first clay-containing phosphorus-aluminum inorganic binder is prepared with the following steps: an alumina source, the first clay and water are vigorously mixed and stirred to disperse into a slurry having a solid content of 5-48 wt %; wherein the alumina source is aluminum hydroxide and/or alumina that can be peptized by an acid, relative to 10-40 parts by weight, for example, 15-40 parts by weight of the alumina source (as Al2O3), the used amount of the first clay based on the dry weight is greater than 0 part by weight and not more than 40 parts by weight; a concentrated phosphoric acid is added to the slurry under stirring according to the weight ratio of P/Al=1-6, and the resulting mixed slurry is reacted at 50-99° C. for 15-90 minutes; wherein P in the P/Al is the weight of phosphorus as the simple substance in phosphoric acid, Al is the weight of aluminum as the simple substance in the alumina source.

Aspect 31. The catalytic cracking auxiliary obtained with the process of preparing the catalytic cracking auxiliary according to any of the previous Aspects.

Aspect 32. The catalytic cracking catalyst obtained with the process of preparing the catalytic cracking catalyst according to any of the previous Aspects.

Aspect 33. A process for catalytically cracking a hydrocarbon oil, which is characterized in that the process comprises: the hydrocarbon oil is reacted by contacting the catalytic cracking auxiliary according to any of the previous Aspects or the catalytic cracking catalyst according to any of the previous Aspects under a catalytic cracking condition.

Aspect 34. The process for catalytically cracking the hydrocarbon oil according to any of the previous Aspects, wherein the process comprises: the hydrocarbon oil is reacted by contacting a catalyst mixture containing the catalytic cracking auxiliary according to any of the previous Aspects and a catalytic cracking catalyst under the catalytic cracking condition; in the catalyst mixture, the content of the catalytic cracking auxiliary is 0.1-30 wt %.

Aspect 35. The process for catalytically cracking the hydrocarbon oil according to any of the previous Aspects, wherein the catalytic cracking condition includes: the reaction temperature is 500-800° C.; the hydrocarbon oil is one or more selected from crude oil, naphtha, gasoline, atmospheric residue, vacuum residue, atmospheric gas oil, vacuum gas oil, straight-run gas oil, propane light/heavy deasphalted oil, coker gas oil and coal liquefication product.

The present invention will be further described below in conjunction with specific examples, but the present invention is not limited thereby.

The instruments and reagents used in the examples of the present invention are all those commonly used by those skilled in the art unless otherwise specified.

A micro-reaction apparatus was used to evaluate the effect of the catalytic cracking auxiliary/catalytic cracking catalyst of the present invention on the yield of lower carbon olefins in the catalytic cracking of petroleum hydrocarbons.

The prepared catalytic cracking auxiliary sample/catalytic cracking catalyst sample was subjected to the aging treatment at 800° C., 100% water vapor for 17 hours on a fixed-bed aging apparatus, and evaluated on a micro-reaction apparatus. The feedstock oil is VGO or naphtha. The evaluation condition included the reaction temperature of 620° C., the regeneration temperature of 620° C., and the catalyst-oil ratio of 3.2. The micro-reactivity was measured by the ASTM D5154-2010 standard method.

The RIPP standard method mentioned in the present invention may refer to "Analysis Method of Petrochemical Industry", edited by Yang Cuiding et al., 1990 edition.

The properties of some raw materials used in the Example were as follows:

The pseudo-boehmite was an industrial product produced by Shandong Aluminum Company, with a solid content of 60 wt %.

The alumina sol was an industrial product produced by Sinopec Catalyst Qilu Branch and had an Al2O3 content of 21.5 wt %.

The silica sol was an industrial product produced by Sinopec Catalyst Qilu Branch, with a SiO2 content of 28.9 wt % and a Na2O content of 8.9%.

The kaolin was a kaolin special for catalytic cracking catalyst produced by Suzhou Kaolin Company, with a solid content of 78% by weight.

The rectorite was produced by Hubei Zhongxiang Mingliu Rectorite Development Co., Ltd., with a quartz sand content of <3.5 wt %, an Al2O3 content of 39.0 wt %, a Na2O content of 0.03 wt %, and the solid content of 77 wt %.

SB: Aluminum hydroxide powder, produced by Condex Corporation, Germany, with an Al2O3 content of 75 wt %.

Gamma-alumina, produced by Condex Corporation, Germany, with an Al2O3 content of 95 wt %.

Hydrochloric acid, chemically pure, with a concentration of 36-38 wt %, produced by Beijing Chemical Plant.

PSRY molecular sieve was an industrial product produced by Sinopec Catalyst Changling Branch, with a Na2O content of <1.5 wt %, a P2O5 content of 0.8-1.2 wt %, the unit cell constant of <2.456 nm, and the crystallinity of ≥64%.

HRY-1 commercial molecular sieve was an industrial product produced by Sinopec Catalyst Changling Branch, with a La2O3 content of 11-13 wt %, a unit cell constant of <2.464 nm, and a crystallinity of ≥40%.

Equilibrium catalyst was an industrial FCC equilibrium catalyst, which was an FCC equilibrium catalyst having the industrial brand of DVR-3, with a light oil micro-activity of 63, available from Sinopec Yanshan Petrochemical.

The following examples illustrated the phosphorus-modified hierarchical ZSM-5 molecular sieves of the present invention and the processes for preparing the same. The molecular sieves could be used in the preparation of the catalytic cracking auxiliary of the present invention and the catalytic cracking catalyst of the present invention.

Example 1-1

Example 1-1 illustrated the phosphorus-containing hierarchical ZSM-5 molecular sieve of the present invention and a process of preparing the same.

18.5 g of diammonium hydrogen phosphate, 108 g of a hydrogen-type hierarchical ZSM-5 molecular sieve (provided by Qilu Branch of Sinopec Catalyst Company, the relative crystallinity was 88.6%, the silica/alumina molar ratio was 20.8, the Na2O content was 0.017 wt %, the specific surface area was 373 m2/g, the total pore volume was 0.256 mL/g, the mesopore volume was 0.119 mL/g, and the average pore diameter was 5.8 nm, the same below) and 60 g of deionized water were vigorously mixed and stirred to form a slurry. The slurry was heated to 100° C. and maintained for 2 h, dried at 110° C. in an oven, and calcined in air at 550° C. for 2 h to produce a phosphorus-containing hierarchical ZSM-5 molecular sieve sample, which was denoted as GPZ1-1.

Comparative Example 1-1

It was identical to Example 1-1, except that the immersion method was used by immersing the hydrogen-type hierarchical ZSM-5 molecular sieve at 20° C. to produce a phosphorus-containing hierarchical ZSM-5 molecular sieve comparative sample, which was denoted as D1-1.

Example 1-2

It was identical to Example 1-1, except that the drying was followed by the treatment at 450° C., 60% water vapor for 0.5 h to produce a phosphorus-containing hierarchical ZSM-5 molecular sieve sample, which was denoted as GPZ1-2.

Comparative Example 1-2

It was identical to Example 1-2, except that the immersion method was used by immersing the hydrogen-type hierarchical ZSM-5 molecular sieve at 20° C. to produce a phosphorus-containing hierarchical ZSM-5 molecular sieve comparative sample, which was denoted as D1-2.

The phosphorus dispersity K data for GPZ1-1, D1-1, GPZ1-2, and D1-2 were shown in Table 1.

Example 2-1

Example 2-1 illustrated the phosphorus-containing hierarchical ZSM-5 molecular sieve of the present invention and a process of preparing the same.

18.5 g of diammonium hydrogen phosphate, 108 g of a hydrogen-type hierarchical ZSM-5 molecular sieve, and 120 g of deionized water were vigorously mixed and stirred to form a slurry. The slurry was maintained at 70° C. for 2 hours, dried at 110° C. in an oven, and calcined in air at 550° C. for 2 h to produce a phosphorus-containing hierarchical ZSM-5 molecular sieve sample, which was denoted as GPZ2-1.

Comparative Example 2-1

It was identical to Example 2-1, except that the immersion method was used by immersing the hydrogen-type hierarchical ZSM-5 molecular sieve at 20° C. to produce a phosphorus-containing hierarchical ZSM-5 molecular sieve comparative sample, which was denoted as D2-1.

Example 2-2

It was identical to Example 2-1, except that the drying was followed by the treatment at 600° C., 50% water vapor for 2 h to produce a phosphorus-containing hierarchical ZSM-5 molecular sieve sample, which was denoted as GPZ2-2.

Comparative Example 2-2

It was identical to Example 2-2, except that the immersion method was used by immersing the hydrogen-type hierarchical ZSM-5 molecular sieve at 20° C. to produce a comparative sample, which was denoted as D2-2.

The phosphorus dispersity K data for GPZ2-1, D2-1, GPZ2-2, and D2-2 were shown in Table 1.

Example 3-1

Example 3-1 illustrated the phosphorus-containing hierarchical ZSM-5 molecular sieve of the present invention and a process of preparing the same.

11.8 g of phosphoric acid was dissolved in 60 g of deionized water, and stirred for 2 h to produce an aqueous solution containing phosphorus; 108 g of a hydrogen-type hierarchical ZSM-5 molecular sieve was taken; the above-mentioned aqueous solution containing phosphorus and the above-mentioned hydrogen-type hierarchical ZSM-5 molecular sieve were respectively heated to 80° C. and then mixed for 4 hours, dried in an oven at 110° C., and calcined in air at 550° C. for 2 h to produce a phosphorus-modified hierarchical ZSM-5 molecular sieve, which was denoted as GPZ3-1.

Comparative Example 3-1

It was identical to Example 3-1, except that the immersion method was used by immersing the hydrogen-type hierarchical ZSM-5 molecular sieve at 20° C. with the aqueous solution containing phosphorus to produce a phosphorus-containing hierarchical ZSM-5 molecular sieve comparative sample, which was denoted as D3-1.

Example 3-2

It was identical to Example 3-1, except that the drying was followed by the treatment at 430° C., 100% water vapor for 2 h to produce a phosphorus-containing hierarchical ZSM-5 molecular sieve sample, which was denoted as GPZ3-2.

Comparative Example 3-2

It was identical to Example 3-2, except that the immersion method was used by immersing the hydrogen-type hierarchical ZSM-5 molecular sieve at 20° C. with the aqueous solution containing phosphorus to produce a phosphorus-containing hierarchical ZSM-5 molecular sieve comparative sample, which was denoted as D3-2.

The phosphorus dispersity K data for GPZ3-1, D3-1, GPZ3-2, and D3-2 were shown in Table 1.

Example 4-1

Example 4-1 illustrated the phosphorus-containing hierarchical ZSM-5 molecular sieve of the present invention and a process of preparing the same.

9.3 g of diammonium hydrogen phosphate, 108 g of a hydrogen-type hierarchical ZSM-5 molecular sieve, and 120 g of deionized water were vigorously mixed and stirred to form a slurry. The slurry was maintained at 90° C. for 2 hours, dried in an oven at 110° C., and calcined in air at 550° C. for 2 h to produce a phosphorus-containing hierarchical ZSM-5 molecular sieve, which was denoted as GPZ4-1.

Comparative Example 4-1

It was identical to Example 4-1, except that the immersion method was used by immersing the hydrogen-type hierarchical ZSM-5 molecular sieve at 20° C. to produce a phosphorus-containing hierarchical ZSM-5 molecular sieve comparative sample, which was denoted as D4-1.

Example 4-2

It was identical to Example 4-1, except that the drying was followed by the treatment at 350° C., 100% water vapor for 2 hours to produce a phosphorus-containing hierarchical ZSM-5 molecular sieve sample, which was denoted as GPZ4-2.

Comparative Example 4-2

It was identical to Example 4-2, except that the immersion method was used by immersing the hydrogen-type hierarchical ZSM-5 molecular sieve at 20° C. to produce a phosphorus-containing hierarchical ZSM-5 molecular sieve comparative sample, which was denoted as D4-2.

The phosphorus dispersity K data for GPZ4-1, D4-1, GPZ4-2, and D4-2 were shown in Table 1.

Example 5-1

Example 5-1 illustrated the phosphorus-containing hierarchical ZSM-5 molecular sieve of the present invention and a process of preparing the same.

9.7 g trimethyl phosphate, 108 g of a hydrogen-type hierarchical ZSM-5 molecular sieve, and 80 g of deionized water were vigorously mixed and stirred to form a slurry. The slurry was heated to 120° C., maintained for 8 hours, dried in an oven at 110° C., and calcined in air at 550° C. for 2 h to produce a phosphorus-containing hierarchical ZSM-5 molecular sieve sample, which was denoted as GPZ5-1.

Comparative Example 5-1

It was identical to Example 5-1, except that the immersion method was used by immersing the hydrogen-type hierarchical ZSM-5 molecular sieve at 20° C. to produce a phosphorus-containing hierarchical ZSM-5 molecular sieve comparative sample, which was denoted as D5-1.

Example 5-2

It was identical to Example 5-1, except that the drying was followed by the calcining treatment at 500° C., 40% water vapor for 4 h to produce a phosphorus-containing hierarchical ZSM-5 molecular sieve sample, which was denoted as GPZ5-2.

Comparative Example 5-2

It was identical to Example 5-2, except that the immersion method was used by immersing the hydrogen-type hierarchical ZSM-5 molecular sieve at 20° C. to produce a phosphorus-containing hierarchical ZSM-5 molecular sieve comparative sample, which was denoted as D5-2.

The phosphorus dispersity K data for GPZ5-1, D5-1, GPZ5-2, and D5-2 were shown in Table 1.

Example 6-1

Example 6-1 illustrated the phosphorus-containing hierarchical ZSM-5 molecular sieve of the present invention and a process of preparing the same.

13.2 g of boron phosphate, 108 g of a hydrogen-type hierarchical ZSM-5 molecular sieve, and 100 g of deionized water were vigorously mixed and stirred to form a slurry. The slurry was maintained at 150° C. for 2 hours, dried at 110° C. in the oven, and calcined in air at 550° C. for 2 h to produce a phosphorus-containing hierarchical ZSM-5 molecular sieve sample, which was denoted as GPZ6-1.

Comparative Example 6-1

It was identical to Example 6-1, except that the immersion method was used by immersing the hydrogen-type hierarchical ZSM-5 molecular sieve at 20° C. to produce a phosphorus-containing hierarchical ZSM-5 molecular sieve comparative sample, which was denoted as D6-1.

Example 6-2

It was identical to Example 6-1, except that the drying was followed by the hydrothermal calcining treatment at 350° C., 60% water vapor for 4 h to produce a phosphorus-containing hierarchical ZSM-5 molecular sieve sample, which was denoted as GPZ6-2.

Comparative Example 6-2

It was identical to Example 6-2, except that the immersion method was used by immersing the hydrogen-type hierarchical ZSM-5 molecular sieve at 20° C. to produce a phosphorus-containing hierarchical ZSM-5 molecular sieve comparative sample, which was denoted as D6-2.

The phosphorus dispersity K data for GPZ6-1, D6-1, GPZ6-2, and D6-2 were shown in Table 1.

Example 7-1

Example 7-1 illustrated the phosphorus-containing hierarchical ZSM-5 molecular sieve of the present invention and a process of preparing the same.

16.3 g of triphenylphosphine was dissolved in 80 g of deionized water, and stirred for 2 h to produce an aqueous solution containing phosphorus; 108 g of a hydrogen-type hierarchical ZSM-5 molecular sieve was taken; the above-mentioned aqueous solution containing phosphorus and the above-mentioned hydrogen-type hierarchical ZSM-5 molecular sieve were respectively heated to 80° C. and then mixed for 4 hours, dried in an oven at 110° C., and calcined in air at 550° C. for 2 h to produce a phosphorus-containing hierarchical ZSM-5 molecular sieve sample, which was denoted as GPZ7-1.

Comparative Example 7-1

It was identical to Example 7-1, except that the immersion method was used by immersing the hydrogen-type hierarchical ZSM-5 molecular sieve at 20° C. with the aqueous solution containing phosphorus to produce a phosphorus-containing hierarchical ZSM-5 molecular sieve comparative sample, which was denoted as D7-1.

Example 7-2

It was identical to Example 7-1, except that the drying was followed by the calcining treatment at 600° C., 50% water vapor for 2 h to produce a phosphorus-containing hierarchical ZSM-5 molecular sieve sample, which was denoted as GPZ7-2.

Comparative Example 7-2

It was identical to Example 7-2, except that the immersion method was used by immersing the hydrogen-type hierarchical ZSM-5 molecular sieve at 20° C. with the aqueous solution containing phosphorus to produce a phosphorus-containing hierarchical ZSM-5 molecular sieve comparative sample, which was denoted as D7-2.

The phosphorus dispersity K data for GPZ7-1, D7-1, GPZ7-2, and D7-2 were shown in Table 1.

Example 8-1

It was identical to Example 4-1, except that the phosphorus source was diammonium hydrogen phosphate and crystallized boron phosphate, and the weight ratio of the two was 3:1 to produce a phosphorus-containing hierarchical ZSM-5 molecular sieve sample, which was denoted as GPZ8-1.

Example 8-2

It was identical to Example 4-2, except that the phosphorus source was diammonium hydrogen phosphate and crystallized boron phosphate, and the weight ratio of the two was 3:1 to produce a phosphorus-containing hierarchical ZSM-5 molecular sieve sample, which was denoted as GPZ8-2.

Example 9-1

It was identical to Example 4-1, except that the phosphorus source was diammonium hydrogen phosphate and crystallized boron phosphate, and the weight ratio of the two was 2:2 to produce a phosphorus-containing hierarchical ZSM-5 molecular sieve sample, which was denoted as GPZ9-1.

Example 9-2

It was identical to Example 4-2, except that the phosphorus source was diammonium hydrogen phosphate and crystallized boron phosphate, and the weight ratio of the two was 2:2 to produce a phosphorus-containing hierarchical ZSM-5 molecular sieve sample, which was denoted as GPZ9-2.

Example 10-1

It was identical to Example 4-1, except that the phosphorus source was diammonium hydrogen phosphate and crystallized boron phosphate, and the weight ratio of the two was 1:3 to produce a phosphorus-containing hierarchical ZSM-5 molecular sieve sample, which was denoted as GPZ10-1.

Example 10-2

It was identical to Example 4-2, except that the phosphorus source was diammonium hydrogen phosphate and crystallized boron phosphate, and the weight ratio of the two was 1:3 to produce a phosphorus-containing hierarchical ZSM-5 molecular sieve sample, which was denoted as GPZ10-2.

The phosphorus dispersity K data for GPZ8-1, GPZ8-2, GPZ9-1, GPZ9-2, GPZ10-1, and GPZ10-2 were shown in Table 1.

Example 11-1

It was identical to Example 8-1, except that the phosphorus source was phosphoric acid and crystallized boron phosphate, and the weight ratio of the two was 3:1 to produce a phosphorus-containing hierarchical ZSM-5 molecular sieve sample, which was denoted as GPZ11-2.

Example 11-2

It was identical to Example 8-2, except that the phosphorus source was phosphoric acid and crystallized boron phosphate, and the weight ratio of the two was 3:1 to produce a phosphorus-containing hierarchical ZSM-5 molecular sieve sample, which was denoted as GPZ11-2.

Example 12-1

It was identical to Example 9-1, except that the phosphorus source was phosphoric acid and crystallized boron phosphate, and the weight ratio of the two was 2:2 to produce a phosphorus-containing hierarchical ZSM-5 molecular sieve sample, which was denoted as GPZ12-1.

Example 12-2

It was identical to Example 9-2, except that the phosphorus source was phosphoric acid and crystallized boron phosphate, and the weight ratio of the two was 2:2 (identical to or near the proportion value of Example 9-1) to produce a phosphorus-containing hierarchical ZSM-5 molecular sieve sample, which was denoted as GPZ12-2.

Example 13-1

It was identical to Example 10-1, except that the phosphorus source was phosphoric acid and crystallized boron phosphate, and the weight ratio of the two was 1:3 to produce a phosphorus-containing hierarchical ZSM-5 molecular sieve sample, which was denoted as GPZ13-2.

Example 13-2

It was identical to Example 10-2, except that the phosphorus source was phosphoric acid and crystallized boron phosphate, and the weight ratio of the two was 1:3 to produce a phosphorus-containing hierarchical ZSM-5 molecular sieve sample, which was denoted as GPZ13-2.

The phosphorus dispersity K data for GPZ11-1, GPZ11-2, GPZ12-1, GPZ12-2, GPZ13-1, and GPZ13-2 were shown in Table 1.

It could be seen from the data in Table 1 that the phosphorus-modified hierarchical ZSM-5 molecular sieves of the present invention had a higher phosphorus dispersity, for example, the sample GPZ8-2 in Example 8-2, which was modified with a dual phosphorus source, i.e., phosphoric acid and crystallized boron phosphate, achieved a dispersity K value of 85%. The following examples illustrated the phosphorus-modified micropore ZSM-5 molecular sieves of the present invention and the processes for preparing the same. The molecular sieves could be used in the preparation of the catalytic cracking auxiliary of the present invention and the catalytic cracking catalyst of the present invention.

Example 14-1

Example 14-1 illustrated a phosphorus-containing micropore ZSM-5 molecular sieve of the present invention and a process of preparing the same.

16.2 g of diammonium hydrogen phosphate, 113 g of an HZ SM-5 molecular sieve (provided by Qilu Branch of Sinopec Catalyst Company, the relative crystallinity was 91.1%, the silica/alumina molar ratio was 24.1, the Na2O content was 0.039 wt %, the specific surface area was 353 m2/g, the total pore volume was 0.177 mL/g, the same below) and 60 g of deionized water were vigorously mixed and stirred to form a slurry. The slurry was heated to 100° C., maintained for 2 hours, dried at 110° C., and treated at 550° C. under an air atmosphere for 0.5 h to produce a phosphorus-modified ZSM-5 molecular sieve sample, which was denoted as GPZ14-1.

Comparative Example 14-1

Comparative Example 14-1 illustrated the current industry-conventional method and the resulting phosphorus-modified ZSM-5 comparative sample.

It was identical to Example 14-1, except that the immersion method was used by immersing the HZSM-5 molecular sieve at 20° C. for 2 hours to produce a phosphorus-modified ZSM-5 molecular sieve comparative sample, which was denoted as D14-1.

Example 14-2

Example 14-2 illustrated a phosphorus-containing micropore ZSM-5 molecular sieve of the present invention and a process of preparing the same.

It was identical to Example 14-1, except that the treatment at 550° C. under the air atmosphere was changed to the treatment at 500° C., 50% water vapor for 0.5 h to produce a phosphorus-modified ZSM-5 molecular sieve sample, which was denoted as GPZ14-2.

Comparative Example 14-2

It was identical to Example 14-2, except that the immersion method was used by immersing the hydrogen-type hierarchical ZSM-5 molecular sieve at 20° C. for 2 hours to produce a phosphorus-modified ZSM-5 molecular sieve comparative sample, which was denoted as D14-2. The phosphorus dispersity K data for GPZ14-1, D14-1, GPZ14-2, and D14-2 were shown in Table 1.

Example 15-1

Example 15-1 illustrated a phosphorus-containing micropore ZSM-5 molecular sieve of the present invention and a process of preparing the same.

16.2 g of diammonium hydrogen phosphate, 113 g of an HZSM-5 molecular sieve, and 120 g of deionized water were vigorously mixed and stirred to form a slurry. The slurry was maintained at 70° C. for 2 hours, dried at 110° C., and treated at 550° C. under an air atmosphere for 2 h to produce a phosphorus-modified ZSM-5 molecular sieve sample, which was denoted as GPZ15-1.

Comparative Example 15-1

Comparative Example 15-1 illustrated the current industry-conventional method and the resulting phosphorus-modified ZSM-5 comparative sample.

It was identical to Example 15-1, except that the immersion method was used by immersing the HZSM-5 molecular sieve at 20° C. to produce a phosphorus-modified ZSM-5 molecular sieve comparative sample, which was denoted as D15-1.

Example 15-2

Example 15-2 illustrated a phosphorus-containing micropore ZSM-5 molecular sieve of the present invention and a process of preparing the same.

It was identical to Example 15-1, except that the treatment at 550° C. under the air atmosphere was changed to the treatment at 600° C., 30% water vapor for 2 hours to produce a phosphorus-modified ZSM-5 molecular sieve sample, which was denoted as GPZ15-2.

Comparative Example 15-2

It was identical to Example 15-2, except that the immersion method was used by immersing the HZSM-5 molecular sieve at 20° C. to produce a phosphorus-modified ZSM-5 molecular sieve comparative sample, which was denoted as D15-2.

The phosphorus dispersity K data for GPZ15-1, D15-1, GPZ15-2, and D15-2 were shown in Table 1.

Example 16-1

Example 16-1 illustrated a phosphorus-containing micropore ZSM-5 molecular sieve of the present invention and a process of preparing the same.

10.4 g of phosphoric acid was dissolved in 60 g of deionized water, and stirred for 2 h to produce an aqueous solution containing phosphorus; 113 g of an HZSM-5 molecular sieve was taken; the above-mentioned aqueous solution containing phosphorus and the above-mentioned HZSM-5 molecular sieve were respectively heated to 80° C. and then mixed for 4 hours, dried at 110° C., and treated at 550° C. under an air atmosphere for 2 h to produce a phosphorus-modified ZSM-5 molecular sieve sample, which was denoted as GPZ16-1.

Comparative Example 16-1

Comparative Example 16-1 illustrated the current industry-conventional method and the resulting phosphorus-modified ZSM-5 comparative sample.

It was identical to Example 16-1, except that the immersion method was used by immersing the HZSM-5 molecular sieve at 20° C. with the aqueous solution containing phosphorus to produce a phosphorus-modified ZSM-5 molecular sieve comparative sample, which was denoted as D16-1.

Example 16-2

Example 16-2 illustrated a phosphorus-containing micropore ZSM-5 molecular sieve of the present invention and a process of preparing the same.

It was identical to Example 16-1, except that the treatment at 550° C. under the air atmosphere was changed to the treatment at 400° C., 100% water vapor for 2 hours to produce a phosphorus-modified ZSM-5 molecular sieve sample, which was denoted as GPZ16-2.

Comparative Example 16-2

It was identical to Example 16-2, except that the immersion method was used by immersing the HZSM-5 molecular sieve at 20° C. with the aqueous solution containing phosphorus to produce a phosphorus-modified ZSM-5 molecular sieve comparative sample, which was denoted as D16-2.

The phosphorus dispersity K data for GPZ16-1, D16-1, GPZ16-2, and D16-2 were shown in Table 1.

Example 17-1

Example 17-1 illustrated a phosphorus-containing micropore ZSM-5 molecular sieve of the present invention and a process of preparing the same.

8.1 g of diammonium hydrogen phosphate, 113 g of an HZSM-5 molecular sieve, and 120 g of deionized water were vigorously mixed and stirred to form a slurry. The slurry was maintained at 90° C. for 4 hours, dried at 110° C., and treated at 550° C. under an air atmosphere for 2 h to produce a phosphorus-modified ZSM-5 molecular sieve sample, which was denoted as GPZ17-1.

Comparative Example 17-1

Comparative Example 17-1 illustrated the current industry-conventional method and the resulting phosphorus-modified ZSM-5 comparative sample.

It was identical to Example 17-1, except that the immersion method was used by immersing the HZSM-5 molecular sieve at 20° C. to produce a phosphorus-modified ZSM-5 molecular sieve comparative sample, which was denoted as D17-1.

Example 17-2

It was identical to Example 17-1, except that the treatment at 550° C. under the air atmosphere was changed to the treatment at 300° C., 100% water vapor for 2 hours to produce a phosphorus-modified ZSM-5 molecular sieve sample, which was denoted as GPZ17-2.

Comparative Example 17-2

It was identical to Example 17-2, except that the immersion method was used by immersing the HZSM-5 molecular sieve at 20° C. to produce a phosphorus-modified ZSM-5 molecular sieve comparative sample, which was denoted as D17-2.

The phosphorus dispersity K data for GPZ17-1, D17-1, GPZ17-2, and D17-2 were shown in Table 1.

Example 18-1

8.5 g of trimethyl phosphate, 113 g of an HZSM-5 molecular sieve, and 80 g of deionized water were vigorously mixed and stirred to form a slurry. The slurry was heated to 120° C., maintained for 8 hours, dried at 110° C., and treated at 550° C. under an air atmosphere for 2 h to produce a phosphorus-modified ZSM-5 molecular sieve sample, which was denoted as GPZ18-1.

Comparative Example 18-1

Comparative Example 18-1 illustrated the current industry-conventional method and the resulting phosphorus-modified ZSM-5 comparative sample.

It was identical to Example 18-1, except that the immersion method was used by immersing the HZSM-5 molecular sieve at 20° C. to produce a phosphorus-modified ZSM-5 molecular sieve comparative sample, which was denoted as D18-1.

Example 18-2

Example 18-2 illustrated a phosphorus-containing micropore ZSM-5 molecular sieve of the present invention and a process of preparing the same.

It was identical to Example 18-1, except that the treatment at 550° C. under the air atmosphere was changed to the treatment at 500° C., 80% water vapor for 4 h to produce a phosphorus-modified ZSM-5 molecular sieve sample, which was denoted as GPZ18-2.

Comparative Example 18-2

It was identical to Example 18-2, except that the immersion method was used by immersing the HZSM-5 molecular sieve at 20° C. to produce a phosphorus-modified ZSM-5 molecular sieve comparative sample, which was denoted as D18-2.

The phosphorus dispersity K data for GPZ18-1, D18-1, GPZ18-2, and D18-2 were shown in Table 1.

Example 19-1

Example 19-1 illustrated a phosphorus-containing micropore ZSM-5 molecular sieve of the present invention and a process of preparing the same.

11.6 g of boron phosphate, 113 g of an HZSM-5 molecular sieve, and 100 g of deionized water were vigorously mixed and stirred to form a slurry. The slurry was maintained at 150° C. for 2 hours, dried at 110° C., and treated at 550° C. under an air atmosphere for 2 h to produce a phosphorus-modified ZSM-5 molecular sieve sample, which was denoted as GPZ19-1.

Comparative Example 19-1

Comparative Example 19-1 illustrated the current industry-conventional method and the resulting phosphorus-modified ZSM-5 comparative sample.

It was identical to Example 19-1, except that the immersion method was used by immersing the HZSM-5 molecular sieve at 20° C. to produce a phosphorus-modified ZSM-5 molecular sieve comparative sample, which was denoted as D19-1.

Example 19-2

Example 19-2 illustrated a phosphorus-containing micropore ZSM-5 molecular sieve of the present invention and a process of preparing the same.

It was identical to Example 19-1, except that the treatment at 550° C. under the air atmosphere was changed to the treatment at 400° C., 100% water vapor for 4 h to produce a phosphorus-modified ZSM-5 molecular sieve sample, which was denoted as GPZ19-2.

Comparative Example 19-2

It was identical to Example 19-2, except that the immersion method was used by immersing the HZSM-5 molecular sieve at 20° C. to produce a phosphorus-modified ZSM-5 molecular sieve comparative sample, which was denoted as D19-2.

The phosphorus dispersity K data for GPZ19-1, D19-1, GPZ19-2, and D19-2 were shown in Table 1.

Example 20-1

Example 20-1 illustrated a phosphorus-containing micropore ZSM-5 molecular sieve of the present invention and a process of preparing the same.

14.2 g of triphenylphosphine was dissolved in 80 g of deionized water, and stirred for 2 h to produce an aqueous solution containing phosphorus; 113 g of an HZ SM-5 molecular sieve was taken; the above-mentioned aqueous solution containing phosphorus and the above-mentioned HZ SM-5 molecular sieve were respectively heated to 80° C. and then mixed for 4 hours, dried at 110° C., and treated at 550° C. under an air atmosphere for 2 h to produce a phosphorus-modified ZSM-5 molecular sieve sample, which was denoted as GPZ20-1.

Comparative Example 20-1

Comparative Example 20-1 illustrated the current industry-conventional method and the resulting phosphorus-modified ZSM-5 comparative sample.

It was identical to Example 20-1, except that the immersion method was used by immersing the HZSM-5 molecular sieve at 20° C. with the aqueous solution containing phosphorus to produce a phosphorus-modified ZSM-5 molecular sieve comparative sample, which was denoted as D20-1.

Example 20-2

Example 20-2 illustrated a phosphorus-containing micropore ZSM-5 molecular sieve of the present invention and a process of preparing the same.

It was identical to Example 20-1, except that the treatment at 550° C. under the air atmosphere was changed to the treatment at 600° C., 30% water vapor for 4 h to produce a phosphorus-modified ZSM-5 molecular sieve sample, which was denoted as GPZ20-2.

Comparative Example 20-2

It was identical to Example 20-2, except that the immersion method was used by immersing the HZ SM-5 molecular sieve at 20° C. with the aqueous solution containing phosphorus to produce a phosphorus-modified ZSM-5 molecular sieve comparative sample, which was denoted as D20-2.

The phosphorus dispersity K data for GPZ20-1, D20-1, GPZ20-2, and D20-2 were shown in Table 1.

Example 21-1

It was identical to Example 17-1, except that the phosphorus source was diammonium hydrogen phosphate and crystallized boron phosphate, and the weight ratio of the two was 3:1 to produce a phosphorus-containing ZSM-5 molecular sieve sample, which was denoted as GPZ21-1.

Example 21-2

It was identical to Example 17-2, except that the phosphorus source was diammonium hydrogen phosphate and crystallized boron phosphate, and the weight ratio of the two was 3:1 to produce a phosphorus-containing ZSM-5 molecular sieve sample, which was denoted as GPZ21-2.

Example 22-1

It was identical to Example 17-1, except that for example, the dual phosphorus source was diammonium hydrogen phosphate and crystallized boron phosphate, and the weight ratio of the two was 2:2 to produce a phosphorus-containing ZSM-5 molecular sieve sample, which was denoted as GPZ22-1.

Example 22-2

It was identical to Example 17-2, except that the phosphorus source was diammonium hydrogen phosphate and crystallized boron phosphate, and the weight ratio of the two was 2:2 to produce a phosphorus-containing ZSM-5 molecular sieve sample, which was denoted as GPZ23-2.

Example 23-1

It was identical to Example 17-1, except that the phosphorus source was diammonium hydrogen phosphate and crystallized boron phosphate, and the weight ratio of the two was 1:3 to produce a phosphorus-containing ZSM-5 molecular sieve sample, which was denoted as GPZ23-1.

Example 23-2

It was identical to Example 17-2, except that the phosphorus source was diammonium hydrogen phosphate and crystallized boron phosphate, and the weight ratio of the two was 1:3 to produce a phosphorus-containing ZSM-5 molecular sieve sample, which was denoted as GPZ23-2.

The phosphorus dispersity K data for GPZ21-1, GPZ21-2, GPZ22-1, GPZ22-2, GPZ23-1, and GPZ23-2 were shown in Table 1.

Example 24-1 to Example 26-2

The phosphorus sources in Example 21-1 to Example 23-2 were respectively replaced with phosphoric acid and crystallized boron phosphate in turn, the ratios of the two were 3:1, 3:1, 2:2, 2:2, 1:3, and 1:3 respectively to produce samples, which were denoted as GPZ24-1, GPZ24-2, GPZ25-1, GPZ25-2, GPZ26-1, and GPZ26-2, and the phosphorus dispersity K data were shown in Table 1.

It could be seen from the data in Table 1 that the phosphorus-modified ZSM-5 molecular sieves of the present invention had a higher phosphorus dispersity, especially, the sample in Example 24-2, which was modified with a dual phosphorus source, i.e., diammonium hydrogen phosphate and crystallized boron phosphate, achieved a dispersity K value of 80%, with a maximum increase of 18 percentage points.

TABLE 1

| Sample | | Dispersity K |
|---|---|---|
| Example 1-1 | GPZ1-1 | 0.76 |
| Example 1-2 | GPZ1-2 | 0.78 |
| Example 2-1 | GPZ2-1 | 0.75 |
| Example 2-2 | GPZ2-2 | 0.76 |
| Example 3-1 | GPZ3-1 | 0.78 |
| Example 3-2 | GPZ3-2 | 0.77 |
| Example 4-1 | GPZ4-1 | 0.77 |

TABLE 1-continued

| Sample | | Dispersity K |
|---|---|---|
| Example 4-2 | GPZ4-2 | 0.8 |
| Example 5-1 | GPZ5-1 | 0.7 |
| Example 5-2 | GPZ5-2 | 0.72 |
| Example 6-1 | GPZ6-1 | 0.76 |
| Example 6-2 | GPZ6-2 | 0.79 |
| Example 7-1 | GPZ7-1 | 0.73 |
| Example 7-2 | GPZ7-2 | 0.75 |
| Example 8-1 | GPZ8-1 | 0.75 |
| Example 8-2 | GPZ8-2 | 0.85 |
| Example 9-1 | GPZ9-1 | 0.73 |
| Example 9-2 | GPZ9-2 | 0.82 |
| Example 10-1 | GPZ10-1 | 0.72 |
| Example 10-2 | GPZ10-2 | 0.81 |
| Example 11-1 | GPZ11-1 | 0.77 |
| Example 11-2 | GPZ11-2 | 0.84 |
| Example 12-1 | GPZ12-1 | 0.74 |
| Example 12-2 | GPZ12-2 | 0.82 |
| Example 13-1 | GPZ13-1 | 0.72 |
| Example 13-2 | GPZ13-2 | 0.8 |
| Example 14-1 | GPZ14-1 | 0.71 |
| Example 14-2 | GPZ14-2 | 0.73 |
| Example 15-1 | GPZ15-1 | 0.7 |
| Example 15-2 | GPZ15-2 | 0.71 |
| Example 16-1 | GPZ15-1 | 0.7 |
| Example 16-2 | GPZ16-2 | 0.71 |
| Example 17-1 | GPZ17-1 | 0.72 |
| Example 17-2 | GPZ17-2 | 0.73 |
| Example 18-1 | GPZ18-1 | 0.7 |
| Example 18-2 | GPZ18-2 | 0.72 |
| Example 19-1 | GPZ19-1 | 0.75 |
| Example 19-2 | GPZ19-2 | 0.72 |
| Example 20-1 | GPZ20-1 | 0.74 |
| Example 20-2 | GPZ20-2 | 0.75 |
| Example 21-1 | GPZ21-1 | 0.74 |
| Example 21-2 | GPZ21-2 | 0.8 |
| Example 22-1 | GPZ22-1 | 0.72 |
| Example 22-2 | GPZ22-2 | 0.78 |
| Example 23-1 | GPZ23-1 | 0.7 |
| Example 23-2 | GPZ23-2 | 0.78 |
| Example 24-1 | GPZ24-1 | 0.73 |
| Example 24-2 | GPZ24-2 | 0.8 |
| Example 25-1 | GPZ25-1 | 0.71 |
| Example 25-2 | GPZ25-2 | 0.75 |
| Example 26-1 | GPZ26-1 | 0.7 |
| Example 26-2 | GPZ26-2 | 0.74 |
| Comparative Example 1-1 | D1-1 | 0.63 |
| Comparative Example 1-2 | D1-2 | 0.69 |
| Comparative Example 2-1 | D2-1 | 0.62 |
| Comparative Example 2-2 | D2-2 | 0.66 |
| Comparative Example 3-1 | D3-1 | 0.6 |
| Comparative Example 3-2 | D3-2 | 0.64 |
| Comparative Example 4-1 | D4-1 | 0.64 |
| Comparative Example 4-2 | D4-2 | 0.67 |
| Comparative Example 5-1 | D5-1 | 0.63 |
| Comparative Example 5-2 | D5-2 | 0.64 |
| Comparative Example 6-1 | D6-1 | 0.68 |
| Comparative Example 6-2 | D6-2 | 0.69 |
| Comparative Example 7-1 | D7-1 | 0.64 |
| Comparative Example 7-2 | D7-2 | 0.67 |
| Comparative Example 14-1 | D14-1 | 0.62 |
| Comparative Example 14-2 | D14-2 | 0.65 |
| Comparative Example 15-1 | D15-1 | 0.62 |
| Comparative Example 15-2 | D15-2 | 0.68 |
| Comparative Example 16-1 | D16-1 | 0.63 |
| Comparative Example 16-2 | D16-2 | 0.65 |
| Comparative Example 17-1 | D17-1 | 0.67 |
| Comparative Example 17-2 | D17-2 | 0.68 |
| Comparative Example 18-1 | D18-1 | 0.64 |
| Comparative Example 18-2 | D18-2 | 0.67 |
| Comparative Example 19-1 | D19-1 | 0.69 |
| Comparative Example 19-2 | D19-2 | 0.68 |
| Comparative Example 20-1 | D20-1 | 0.65 |
| Comparative Example 20-2 | D20-2 | 0.67 |

Micro-Reaction Evaluation

Micro-reaction evaluation conditions: the molecular sieve loading amount was 2 g, the feedstock oil was n-tetradecane, the oil feedstock amount was 1.56 g, the reaction temperature was 550° C., and the regeneration temperature was 600° C. (the same as below).

GPZ-1, D1-1, GPZ1-2 and D1-2; GPZ2-1, D2-1, GPZ2-2 and D2-2; GPZ3-1, D3-1, GPZ3-2 and D3-2; GPZ4-1, D4-1, GPZ4-2 and D4-2; GPZ5-1, D5-1, GPZ5-2 and D5-2; GPZ6-1, D6-1, GPZ6-2 and D6-2; GPZ7-1, D7-1, GPZ7-2 and D7-2; GPZ8-1, GPZ8-2, GPZ9-1, GPZ9-2, GPZ10-1, GPZ10-2, GPZ11-1, GPZ11-2, GPZ12-1, GPZ12-2, GPZ13-1, and GPZ13-2; GPZ14-1, D14-1, GPZ14-2, and D14-2; GPZ15-1, D15-1, GPZ15-2, and D15-2; GPZ16-1, D16-1, GPZ16-2, and D16-2; GPZ17-1, D17-1, GPZ17-2, and D17-2; GPZ18-1, D18-1, GPZ18-2, and D18-2; GPZ19-1, D19-1, GPZ19-2, and D19-2; GPZ20-1, D20-1, GPZ20-2, and D20-2; GPZ21-1, GPZ21-2, GPZ22-1, GPZ22-2, GPZ23-1, GPZ23-2, GPZ24-1, GPZ24-2, GPZ25-1, GPZ25-2, GPZ26-1, and GPZ26-2 were subjected to the hydrothermal aging treatment at 800° C. under 100% water vapor for 17 hours, and then evaluated for the cracking of n-tetradecane. The evaluation data were shown in Table 2.

TABLE 2

| Sample | | N-C14 Conversion/ m % | Material balance, m % | | | | Main products in the cracking gas, m % | | |
|---|---|---|---|---|---|---|---|---|---|
| | | | Dry gas | Liquefied gas | Gasoline | Diesel | Ethylene | Propylene | Total butylene |
| Example | | | | | | | | | |
| 1-1 | GPZ1-1 | 70.4 | 4.6 | 37.6 | 36.9 | 20.4 | 3.7 | 14.8 | 8.2 |
| 1-2 | GPZ1-2 | 71.8 | 5 | 43.7 | 22 | 22 | 4 | 14.5 | 10.2 |
| 2-1 | GPZ2-1 | 69.4 | 3.8 | 32.9 | 35.1 | 25.8 | 2.9 | 12.2 | 6.5 |
| 2-2 | GPZ2-2 | 70.6 | 4.8 | 38.3 | 35.1 | 20 | 3.9 | 15.3 | 8.3 |
| 3-1 | GPZ3-1 | 71.9 | 4.4 | 35.1 | 33.6 | 25 | 3.4 | 13.8 | 7.4 |
| 3-2 | GPZ3-2 | 72.1 | 4.2 | 39.2 | 34.3 | 19.3 | 3.6 | 14.2 | 8.4 |
| 4-1 | GPZ4-1 | 75.7 | 4.4 | 41 | 33.7 | 18.9 | 3.9 | 15.8 | 9.8 |
| 4-2 | GPZ4-2 | 77.9 | 4.2 | 38 | 37.3 | 15.9 | 4 | 17 | 9.7 |
| 5-1 | GPZ5-1 | 73.8 | 4.3 | 37.6 | 34.9 | 21.2 | 3.7 | 15.4 | 9.5 |
| 5-2 | GPZ5-2 | 75.9 | 4.7 | 42.8 | 23.4 | 23.2 | 3.8 | 16.7 | 10.4 |
| 6-1 | GPZ6-1 | 75.2 | 4.8 | 39.7 | 29.4 | 19.2 | 3.8 | 16 | 7.6 |
| 6-2 | GPZ6-2 | 76 | 5.6 | 41 | 28.6 | 18.3 | 4 | 16.3 | 8 |
| 7-1 | GPZ7-1 | 73.9 | 4.9 | 40.2 | 31.6 | 20.8 | 3.8 | 15.3 | 10.7 |
| 7-2 | GPZ7-2 | 75.1 | 4.1 | 41.8 | 33.2 | 19.2 | 3.5 | 15.6 | 12.4 |
| 8-1 | GPZ8-1 | 69.4 | 5.1 | 32 | 32.1 | 28.8 | 3 | 12.1 | 6.5 |
| 8-2 | GPZ8-2 | 80.8 | 4.2 | 42.5 | 36 | 15.3 | 4.2 | 16.5 | 10.1 |
| 9-1 | GPZ9-1 | 70.3 | 5.2 | 34.1 | 31.9 | 26.8 | 3.2 | 11.5 | 6.6 |
| 9-2 | GPZ9-2 | 81.6 | 4.5 | 40.3 | 35.4 | 17.8 | 3.9 | 15.9 | 9.7 |
| 10-1 | GPZ10-1 | 64.2 | 5.6 | 30.8 | 30.7 | 30.9 | 3.1 | 10.7 | 5.8 |
| 10-2 | GPZ10-2 | 76.9 | 4.8 | 37.9 | 33.9 | 21.4 | 3.7 | 15.6 | 9.3 |
| 11-1 | GPZ11-1 | 73.9 | 4.8 | 34.7 | 33.6 | 26.3 | 3.6 | 12.8 | 6.8 |
| 11-2 | GPZ11-2 | 82.9 | 4 | 41.2 | 35.1 | 15 | 3.8 | 16.2 | 9.4 |
| 12-1 | GPZ12-1 | 72.8 | 5 | 35.7 | 31 | 24.3 | 3 | 10.4 | 6.4 |
| 12-2 | GPZ12-2 | 80.5 | 4.3 | 39.6 | 34.1 | 16.3 | 3.7 | 15.2 | 9 |
| 13-1 | GPZ13-1 | 68.8 | 5.1 | 31.3 | 29.5 | 25.7 | 2.9 | 11.5 | 6 |
| 13-2 | GPZ13-2 | 78.6 | 4.5 | 37 | 32.6 | 20.5 | 3.3 | 15.2 | 8.7 |
| 14-1 | GPZ14-2 | 67.5 | 3.9 | 32.4 | 33.8 | 26.9 | 2.7 | 11.9 | 6.2 |
| 14-2 | GPZ14-1 | 69.2 | 3.7 | 33 | 34.7 | 25.9 | 2.9 | 12.4 | 6.6 |
| 15-1 | GPZ15-1 | 66.4 | 4.1 | 31.2 | 35.6 | 26.9 | 2.5 | 11.4 | 6 |
| 15-2 | GPZ15-2 | 67.5 | 3.8 | 33.2 | 34.9 | 25.7 | 2.8 | 12.1 | 6.6 |
| 16-1 | GPZ15-1 | 65.2 | 3.6 | 32.2 | 33 | 27.5 | 3.2 | 12.1 | 6.8 |
| 16-2 | GPZ16-2 | 66.5 | 3.9 | 35 | 33.6 | 25.1 | 3 | 13.2 | 7.9 |
| 17-1 | GPZ17-1 | 66.9 | 4.1 | 26.4 | 35.6 | 28.1 | 2.8 | 9.7 | 5.7 |
| 17-2 | GPZ17-2 | 67.6 | 3.7 | 28.2 | 38.6 | 27.4 | 2.9 | 10.8 | 5.5 |
| 18-1 | GPZ18-1 | 64.1 | 3.9 | 24.9 | 34.1 | 27.8 | 3.1 | 9.7 | 6.5 |
| 18-2 | GPZ18-2 | 65.6 | 3.7 | 26.5 | 32.7 | 26.6 | 2.7 | 10.6 | 6.9 |
| 19-1 | GPZ19-1 | 61.1 | 3 | 28.7 | 29.1 | 35.2 | 2.7 | 12.3 | 7 |
| 19-2 | GPZ19-2 | 64.5 | 3.7 | 31.2 | 29.8 | 33.6 | 2.6 | 13.4 | 7.5 |
| 20-1 | GPZ20-1 | 62.7 | 3.5 | 29.9 | 30.2 | 32.2 | 3 | 12.3 | 6.8 |
| 20-2 | GPZ20-2 | 64.1 | 3.8 | 32.5 | 31.6 | 30.6 | 3.6 | 13.4 | 7.8 |
| 21-1 | GPZ21-1 | 65.8 | 5.3 | 31 | 34.2 | 29.5 | 3.1 | 11.8 | 6.3 |
| 21-2 | GPZ21-2 | 79.6 | 4 | 41.5 | 37 | 17.5 | 4 | 15.1 | 10 |
| 22-1 | GPZ22-1 | 68.7 | 5 | 33.4 | 30.6 | 31 | 3 | 11.1 | 6.1 |
| 22-2 | GPZ22-2 | 79.5 | 4.1 | 38.5 | 36.8 | 20.6 | 3.1 | 15.2 | 9 |
| 23-1 | GPZ23-1 | 62.1 | 5.1 | 28.9 | 32.3 | 33.7 | 3 | 10.2 | 5.2 |
| 23-2 | GPZ23-2 | 73.2 | 4.2 | 35.3 | 35.4 | 25.1 | 3.4 | 15 | 9 |
| 24-1 | GPZ24-1 | 70.5 | 3.8 | 32.9 | 33.8 | 29.5 | 3.7 | 12.8 | 6.9 |
| 24-2 | GPZ24-2 | 74.6 | 3.5 | 38.5 | 31.4 | 26.6 | 3.9 | 13.9 | 7.4 |
| 25-1 | GPZ25-1 | 70.1 | 4 | 32.2 | 33.9 | 29.9 | 4 | 12.8 | 6.3 |
| 25-2 | GPZ25-2 | 73.1 | 4 | 36.2 | 29.9 | 29.9 | 4 | 12.8 | 6.3 |
| 26-1 | GPZ26-1 | 68.3 | 3.8 | 31 | 34.2 | 31 | 3.7 | 11.3 | 5.7 |
| 26-2 | GPZ26-2 | 72.8 | 3.8 | 36.4 | 31.1 | 28.7 | 3.8 | 12.7 | 6.9 |
| Comparative Example | | | | | | | | | |
| 1-1 | D1-1 | 64.3 | 5.1 | 32.1 | 31.8 | 28 | 3.2 | 12 | 5.6 |
| 1-2 | D1-2 | 66.2 | 3.6 | 32 | 34.9 | 23.7 | 3 | 13.4 | 6.6 |
| 2-1 | D2-1 | 65 | 5 | 31.6 | 32.8 | 28.9 | 3.1 | 11.5 | 5.8 |
| 2-2 | D2-2 | 66.4 | 3.6 | 32.5 | 23.2 | 34.5 | 2.7 | 13.8 | 7.6 |
| 3-1 | D3-1 | 65.9 | 3.6 | 30.4 | 35.9 | 26.6 | 2.8 | 13 | 6.2 |
| 3-2 | D3-2 | 66.8 | 4.8 | 31.6 | 33.2 | 27.6 | 3.3 | 12.5 | 6.5 |
| 4-1 | D4-1 | 73.1 | 4.9 | 31.9 | 40.8 | 16.3 | 3.9 | 13.5 | 5.4 |
| 4-2 | D4-2 | 74 | 4.9 | 34 | 31.7 | 25.4 | 3.4 | 13 | 6.7 |
| 5-1 | D5-1 | 71.9 | 4.9 | 32.1 | 31 | 30 | 3 | 11.6 | 5 |
| 5-2 | D5-2 | 73.5 | 5.3 | 39.1 | 28.7 | 25 | 3.9 | 14.4 | 9.1 |
| 6-1 | D6-1 | 73.3 | 4.7 | 35.4 | 27.3 | 27.9 | 3.6 | 15.1 | 7 |
| 6-2 | D6-2 | 74.1 | 4.1 | 36.2 | 27 | 29 | 3.5 | 14.2 | 11.5 |
| 7-1 | D7-1 | 70.4 | 4.4 | 38.3 | 29.7 | 21.9 | 3.2 | 13.1 | 9.2 |
| 7-2 | D7-2 | 71.3 | 6.3 | 39.6 | 31.9 | 20.3 | 4.3 | 13.5 | 8.8 |
| 14-1 | D14-2 | 66.8 | 4.2 | 31.5 | 34.1 | 27.8 | 2.6 | 11.2 | 5.6 |
| 14-2 | D14-1 | 68.9 | 3.8 | 32.9 | 35.1 | 25.8 | 2.9 | 12.2 | 6.5 |
| 15-1 | D15-1 | 65.2 | 4.3 | 30 | 34.8 | 27.5 | 2.3 | 10.2 | 5.2 |

TABLE 2-continued

| Sample | | N-C14 Conversion/ m % | Material balance, m % | | | | Main products in the cracking gas, m % | | |
|---|---|---|---|---|---|---|---|---|---|
| | | | Dry gas | Liquefied gas | Gasoline | Diesel | Ethylene | Propylene | Total butylene |
| 15-2 | D15-2 | 66 | 3.8 | 33 | 35.4 | 25.9 | 2.7 | 12 | 6.4 |
| 16-1 | D16-1 | 64.8 | 3.9 | 31.8 | 32.8 | 27.9 | 2.7 | 11.4 | 6.1 |
| 16-2 | D16-2 | 65.9 | 3.7 | 34.1 | 33.2 | 25.6 | 2.9 | 12.8 | 7.7 |
| 17-1 | D17-1 | 65.7 | 3.5 | 26.8 | 34.3 | 25.4 | 2.5 | 10.2 | 6.3 |
| 17-2 | D17-2 | 65 | 4.3 | 25.7 | 34.8 | 29.3 | 3.1 | 9.5 | 5.2 |
| 18-1 | D18-1 | 63.2 | 4.3 | 23.8 | 34.2 | 28.5 | 3.3 | 9 | 5.8 |
| 18-2 | D18-2 | 65.1 | 3.5 | 25.3 | 33.2 | 26.1 | 2.5 | 10 | 6.1 |
| 19-1 | D19-1 | 59.3 | 2.8 | 27.8 | 29.7 | 36.6 | 2 | 11.7 | 6.7 |
| 19-2 | D19-2 | 60.1 | 3.9 | 29.8 | 28.9 | 34.2 | 3.2 | 12.8 | 6.5 |
| 20-1 | D20-1 | 61.3 | 3.4 | 28.7 | 31.3 | 33.9 | 2.7 | 12 | 6.3 |
| 20-2 | D20-2 | 62.5 | 4.2 | 31.7 | 30.9 | 31.4 | 4.2 | 13 | 7.1 |

After the hydrothermal aging treatment at 800° C., 100% water vapor for 17 h, the samples of examples showed excellent activity and conversion for the catalytic cracking of n-tetradecane, and the liquefied gas yield and the yields for three olefins were improved. It showed that the phosphorus-modified MFI-structured molecular sieves of the present invention provided higher liquefied gas yield while increasing the lower carbon olefin yield.

Examples 27-30 illustrated the phosphorus-aluminum inorganic binder used in the catalytic cracking auxiliary/catalyst of the present invention.

Example 27

1.91 kg of pseudo-boehmite (containing Al2O3, 1.19 kg), 0.56 kg of kaolin (0.5 kg on a dry basis), and 3.27 kg of decationized water were vigorously mixed and stirred for 30 minutes to form a slurry, and 5.37 kg of concentrated phosphoric acid (mass concentration 85%) was added to the slurry under stirring, wherein the addition rate of phosphoric acid was 0.04 kg of phosphoric acid/min/kg alumina source. The mixture was warmed up to 70° C. and then reacted at this temperature for 45 minutes to produce the phosphorus-aluminum inorganic binder. The material composition was shown in Table 3, and the sample number was Binder 1.

Examples 28-30

The phosphorus-aluminum inorganic binders were prepared according to the method of Example 27, the material compositions were shown in Table 3, and the sample numbers were Binder 2, Binder 3, and Binder 4.

TABLE 3

| | Example | | | |
|---|---|---|---|---|
| | Example 27 | Example 28 | Example 29 | Example 30 |
| | Binder number | | | |
| | Binder 1 | Binder 2 | Binder 3 | Binder 4 |
| Pseudo-boehmite, kg | 1.91 | | | 1.6 |
| Al$_2$O$_3$, kg | 1.19 | | | 1 |
| SB aluminum hydroxide powder, kg | | 0.94 | | |
| Al$_2$O$_3$, kg | | 0.7 | | |
| γ-alumina, kg | | | 0.58 | |
| Al$_2$O$_3$, kg | | | 0.58 | |
| Rectorite, kg | | 1.28 | 1.93 | |
| Dry basis, kg | | 1 | 1.5 | |
| Kaolin, kg | 0.56 | | | |
| Dry basis, kg | 0.5 | | | |
| phosphoric acid, kg | 5.37 | 5.36 | 4.03 | 6.5 |
| P2O5, kg | 3.31 | 3.3 | 2.92 | 4 |
| Decationized water, kg | 3.27 | 6.71 | 20.18 | 4.4 |
| Total amount, kg | 11.11 | 14.29 | 25 | 12.5 |
| Total dry basis, kg | 5 | 5 | 5 | 5 |
| Binder solid content, kg/kg | 0.45 | 0.35 | 0.2 | 0.4 |
| P/Al | 2.29 | 3.89 | 4.19 | 3.3 |
| Al2O3, wt % | 23.82 | 14 | 11.53 | 20 |
| P2O5, wt % | 66.18 | 66 | 58.47 | 80 |
| First clay, wt % | 10 | 20 | 30 | 0 |
| pH | 2.2 | 2.37 | 1.78 | 2.46 |

TABLE 4

| Item | Feedstock oil |
|---|---|
| Density (20° C.), g/cm³ | 0.9334 |
| Refraction (70° C.) | 1.5061 |
| SARA, m % | |
| Saturates | 55.6 |
| Aromatics | 30 |
| Resin | 14.4 |
| Asphaltene | <0.1 |
| Freezing point,° C. | 34 |
| Metal content, ppm | |
| Ca | 3.9 |
| Fe | 1.1 |
| Mg | <0.1 |
| Na | 0.9 |
| Ni | 3.1 |
| Pb | <0.1 |
| V | 0.5 |
| Cm % | 86.88 |
| Hm % | 11.94 |
| Sm % | 0.7 |
| Carbon residue m % | 1.77 |

TABLE 5

| Material | Naphtha |
|---|---|
| Density (20° C.)/(g · m⁻³) | 735.8 |
| Vapor pressure/kPa | 32 |
| Group component/m % | |
| Paraffin | 51.01 |
| Normal paraffin | 29.4 |
| Naphthene | 38.24 |
| Olefins | 0.12 |
| Aromatics | 10.52 |
| Distillation range/° C. | |
| Initial | 45.5 |
| 0.05 | 72.5 |
| 0.1 | 86.7 |
| 0.3 | 106.5 |
| 0.5 | 120 |
| 0.7 | 132.7 |
| 0.9 | 148.5 |
| 0.95 | 155.2 |
| Endpoint | 166.5 |

Example 31 to Example 56 provided the catalytic cracking auxiliaries of the present invention, and Comparative Example 31 to Comparative Example 56 illustrated the comparative catalytic cracking auxiliaries, wherein, Example 31 to Example 43 were hierarchical ZSM-5 molecular sieves, and Example 44 to Example 56 were micropore ZSM-5 molecular sieves.

Example 31-1

Phosphorus-modified molecular sieve GPZ1-1 prepared in Example 1-1, kaolin and pseudo-boehmite were taken, and decationized water and alumina sol were added. The mixture was vigorously mixed and stirred for 120 minutes to produce a slurry having a solid content of 30 wt %. Hydrochloric acid was added to adjust the pH of the slurry to 3.0, and then the vigorously mixing and stirring was continued for 45 minutes. Then the phosphorus-aluminum inorganic binder, Binder 1 prepared in Example 27 was added, and the mixture was stirred for 30 minutes. The resulting slurry was spray-dried to produce microspheres. The microspheres were calcined at 500° C. for 1 hour to produce a catalytic cracking auxiliary sample, which was denoted as CAZ1-1 and had a composition: molecular sieve: 50%, kaolin: 23%, Binder 1: 18%, pseudo-boehmite (as Al2O3): 5%, and alumina sol (as Al2O3): 4%.

A fixed bed micro-reaction apparatus was used to evaluate the reaction performances of a 100% equilibrium catalyst and an equilibrium catalyst to which CAZ1-1 was incorporated, in order to illustrate the catalytic cracking reaction effect of the catalytic cracking auxiliary provided in the present disclosure.

The auxiliary CAZ1-1 was subjected to aging treatment at 800° C., 100% water vapor atmosphere for 17 hours. The aging-treated CAZ1-1 was mixed with an industrial FCC equilibrium catalyst (brand: DVR-3, and having a light oil micro-activity of 63). A mixture of the equilibrium catalyst and the auxiliary was loaded into the fixed-bed micro-reaction reactor, and the feedstock oil shown in Table 4 was catalytically cracked. The evaluation condition included the reaction temperature of 620° C., the regeneration temperature of 620° C., and the catalyst-oil ratio of 3.2. Table 6 provided the reaction results, including the blank test agent.

Example 31-2

It was identical to Example 31-1, except that the phosphorus-modified molecular sieve GPZ1-1 was replaced with the phosphorus-modified molecular sieve GPZ1-2 prepared in Example 1-2 to produce a catalytic cracking auxiliary sample, which was denoted as CAZ1-2. Its evaluation was identical to that of Example 31-1, and the result was shown in Table 6.

Comparative Example 31-1

It was identical to Example 12-1, except that the phosphorus-modified molecular sieve GPZ1-1 was replaced with the comparative sample D1-1 of Comparative Example 1-1 to produce a catalytic cracking auxiliary comparative sample, which was denoted as DCAZ1-1. Its evaluation was identical to that of Example 31-1, and the result was shown in Table 6.

Comparative Example 31-2

It was identical to Example 31-1, except that the phosphorus-modified molecular sieve GPZ1-1 was replaced with the comparative sample D1-2 of Comparative Example 1-2 to produce a catalytic cracking auxiliary comparative sample, which was denoted as DCAZ1-2. Its evaluation was identical to that of Example 31-1, and the result was shown in Table 6.

Example 32-1

It was identical to Example 31-1, except that the phosphorus-modified molecular sieve GPZ1-1 was replaced with the phosphorus-modified molecular sieve GPZ2-1 prepared in Example 2-1 to produce a catalytic cracking auxiliary sample, which was denoted as CAZ2-1. Its evaluation was identical to that of Example 31-1, and the result was shown in Table 6.

Example 32-2

It was identical to Example 32-1, except that the phosphorus-modified molecular sieve GPZ2-1 was replaced with the phosphorus-modified molecular sieve GPZ2-2 prepared in Example 2-2 to produce a catalytic cracking auxiliary sample, which was denoted as CAZ2-2. Its evaluation was identical to that of Example 31-1, and the result was shown in Table 6.

Comparative Example 32-1

It was identical to Example 32-1, except that the phosphorus-modified molecular sieve GPZ2-1 was replaced with the comparative sample D2-1 of Comparative Example 2-1 to produce a catalytic cracking auxiliary comparative sample, which was denoted as DCAZ2-1. Its evaluation was identical to that of Example 31-1, and the result was shown in Table 6.

Comparative Example 32-2

It was identical to Example 32-1, except that the phosphorus-modified molecular sieve GPZ2-1 was replaced with the comparative sample D2-2 of Comparative Example 2-2 to produce a catalytic cracking auxiliary comparative sample, which was denoted as DCAZ2-2. Its evaluation was identical to that of Example 31-1, and the result was shown in Table 6.

Example 33-1

It was identical to Example 31-1, except that the phosphorus-modified molecular sieve GPZ1-1 was replaced with the phosphorus-modified molecular sieve GPZ3-1 prepared in Example 3-1 to produce a catalytic cracking auxiliary sample, which was denoted as CAZ3-1. Its evaluation was identical to that of Example 31-1, and the result was shown in Table 6.

Example 33-2

It was identical to Example 31-1, except that the phosphorus-modified molecular sieve GPZ1-1 was replaced with the phosphorus-modified molecular sieve GPZ3-2 prepared in Example 3-2 to produce a catalytic cracking auxiliary sample, which was denoted as CAZ3-2. Its evaluation was identical to that of Example 31-1, and the result was shown in Table 6.

Comparative Example 33-1

It was identical to Example 31-1, except that the phosphorus-modified molecular sieve GPZ1-1 was replaced with the comparative sample D3-1 of Comparative Example 3-1 to produce a catalytic cracking auxiliary comparative sample, which was denoted as DCAZ3-1. Its evaluation was identical to that of Example 31-1, and the result was shown in Table 6.

Comparative Example 33-2

It was identical to Example 31-1, except that the phosphorus-modified molecular sieve GPZ1-1 was replaced with the comparative sample D3-2 of Comparative Example 3-2 to produce a catalytic cracking auxiliary comparative sample, which was denoted as DCAZ3-2. Its evaluation was identical to that of Example 31-1, and the result was shown in Table 6.

Example 34-1

It was identical to Example 31-1, except that the phosphorus-modified molecular sieve GPZ1-1 was replaced with the phosphorus-modified molecular sieve GPZ4-1 prepared in Example 4-1 to produce a catalytic cracking auxiliary sample, which was denoted as CAZ4-1. Its evaluation was identical to that of Example 31-1, and the result was shown in Table 6.

Example 34-2

It was identical to Example 34-1, except that the phosphorus-modified molecular sieve GPZ4-1 was replaced with the phosphorus-modified molecular sieve GPZ4-2 prepared in Example 4-2 to produce a catalytic cracking auxiliary sample, which was denoted as CAZ4-2. Its evaluation was identical to that of Example 31-1, and the result was shown in Table 6.

Comparative Example 34-1

It was identical to Example 34-1, except that the phosphorus-modified molecular sieve GPZ4-1 was replaced with the comparative sample D4-1 of Comparative Example 4-1 to produce a catalytic cracking auxiliary comparative sample, which was denoted as DCAZ4-1. Its evaluation was identical to that of Example 31-1, and the result was shown in Table 6.

Comparative Example 34-2

It was identical to Example 34-1, except that the phosphorus-modified molecular sieve GPZ4-1 was replaced with the comparative sample D4-2 of Comparative Example 2-2 to produce a catalytic cracking auxiliary comparative sample, which was denoted as DCAZ4-2. Its evaluation was identical to that of Example 31-1, and the result was shown in Table 6.

Example 35-1

It was identical to Example 31-1, except that the phosphorus-modified molecular sieve GPZ1-1 was replaced with the phosphorus-modified molecular sieve GPZ5-1 prepared in Example 5-1 to produce a catalytic cracking auxiliary sample, which was denoted as CAZ5-1. Its evaluation was identical to that of Example 31-1, and the result was shown in Table 6.

Example 35-2

It was identical to Example 35-1, except that the phosphorus-modified molecular sieve GPZ5-1 was replaced with the phosphorus-modified molecular sieve GPZ5-2 prepared in Example 5-2 to produce a catalytic cracking auxiliary sample, which was denoted as CAZ5-2. Its evaluation was identical to that of Example 35-1, and the result was shown in Table 6.

Comparative Example 35-1

It was identical to Example 35-1, except that the phosphorus-modified molecular sieve GPZ5-1 was replaced with the comparative sample D5-1 of Comparative Example 5-1 to produce a catalytic cracking auxiliary comparative sample, which was denoted as DCAZ5-1. Its evaluation was identical to that of Example 35-1, and the result was shown in Table 6.

Comparative Example 35-2

It was identical to Example 35-1, except that the phosphorus-modified molecular sieve GPZ5-1 was replaced with the comparative sample D5-2 of Comparative Example 2-2 to produce a catalytic cracking auxiliary comparative sample, which was denoted as DCAZ5-2. Its evaluation was identical to that of Example 35-1, and the result was shown in Table 6.

Example 36-1

It was identical to Example 31-1, except that the phosphorus-modified molecular sieve GPZ1-1 was replaced with the phosphorus-modified molecular sieve GPZ6-1 prepared in Example 6-1 to produce a catalytic cracking auxiliary sample, which was denoted as CAZ6-1. Its evaluation was identical to that of Example 31-1, and the result was shown in Table 6.

Example 36-2

It was identical to Example 36-1, except that the phosphorus-modified molecular sieve GPZ6-1 was replaced with the phosphorus-modified molecular sieve GPZ6-2 prepared in Example 6-2 to produce a catalytic cracking auxiliary sample, which was denoted as CAZ6-2. Its evaluation was identical to that of Example 36-1, and the result was shown in Table 6.

Comparative Example 36-1

It was identical to Example 36-1, except that the phosphorus-modified molecular sieve GPZ6-1 was replaced with the comparative sample D6-1 of Comparative Example 6-1 to produce a catalytic cracking auxiliary comparative sample, which was denoted as DCAZ6-1. Its evaluation was identical to that of Example 36-1, and the result was shown in Table 6.

Comparative Example 36-2

It was identical to Example 36-1, except that the phosphorus-modified molecular sieve GPZ6-1 was replaced with the comparative sample D6-2 of Comparative Example 6-2 to produce a catalytic cracking auxiliary comparative sample, which was denoted as DCAZ6-2. Its evaluation was identical to that of Example 36-1, and the result was shown in Table 6.

Example 37-1

It was identical to Example 31-1, except that the phosphorus-modified molecular sieve GPZ1-1 was replaced with the phosphorus-modified molecular sieve GPZ7-1 prepared in Example 7-1 to produce a catalytic cracking auxiliary sample, which was denoted as CAZ7-1. Its evaluation was identical to that of Example 31-1, and the result was shown in Table 6.

Example 37-2

It was identical to Example 37-1, except that the phosphorus-modified molecular sieve GPZ7-1 was replaced with the phosphorus-modified molecular sieve GPZ7-2 prepared in Example 7-2 to produce a catalytic cracking auxiliary sample, which was denoted as CAZ7-2. Its evaluation was identical to that of Example 31-1, and the result was shown in Table 6.

Comparative Example 37-1

It was identical to Example 37-1, except that the phosphorus-modified molecular sieve GPZ7-1 was replaced with the comparative sample D7-1 of Comparative Example 7-1 to produce a catalytic cracking auxiliary comparative sample, which was denoted as DCAZ7-1. Its evaluation was identical to that of Example 31-1, and the result was shown in Table 6.

Comparative Example 37-2

It was identical to Example 37-1, except that the phosphorus-modified molecular sieve GPZ7-1 was replaced with the comparative sample D7-2 of Comparative Example 7-2 to produce a catalytic cracking auxiliary comparative sample, which was denoted as DCAZ7-2. Its evaluation was identical to that of Example 31-1, and the result was shown in Table 6.

Example 38 to Example 43

It was identical to Example 31-1, except that the phosphorus-modified molecular sieve GPZ1-1 was replaced with the phosphorus-modified molecular sieves GPZ8-1 to GPZ13-2 prepared in Example 8-1 to Example 13-2 respectively to produce catalytic cracking auxiliary samples, which were successively denoted as CAZ8-1 to CAZ13-2. Their evaluations were identical to that of Example 31-1, and the results were shown in Table 6 respectively.

Example 44 to Example 56

Example 44 to Example 56 were successively auxiliaries CAZ14 to CAZ26 containing microporous ZSM-5 (GPZ14 to GPZ26) respectively, and their material compositions corresponded to those of Example 31 to Example 43 respectively, for example, in Example 44-1, GPZ1-1 was replaced with GPZ14-1, in Example 44-2, GPZ1-2 was replaced with GPZ14-2, and so on, until in Example 56-1, GPZ14-1 was replaced with GPZ26-1, in Example 56-2, GPZ14-2 was replaced with GPZ26-2. Their evaluations were identical to that of Example 31-1, and the results were shown in Table 6 respectively.

Comparative Example 44 to Comparative Example 50

Comparative Example 44 to Comparative Example 50 were successively comparative auxiliaries DCAZ-14 to DCAZ-20 containing microporous ZSM-5 (D14 to D20) respectively, and their material compositions corresponded to those of Example 44 to Example 50 respectively, for example, in Comparative Example 44-1, GPZ1-1 was replaced with D14-1, in Comparative Example 44-2, GPZ1-2 was replaced with D14-2, and so on, until in Comparative Example 50-1, GPZ14-1 was replaced with D20-1, in Comparative Example 50-2, GPZ14-2 was replaced with D20-2. Their evaluations were identical to that of Example 31-1, and the results were shown in Table 6 respectively.

Example 57 to Example 62

It was identical to Example 31-1, except that the phosphorus-modified molecular sieve GPZ1-1 was successively replaced with the phosphorus-modified molecular sieves GPZ21-1 to GPZ26-2 prepared in Example 21-1 to Example 26-2 respectively to produce catalytic cracking auxiliary samples, which were successively denoted as CAZ27-1 to CAZ32-2. Their evaluations were identical to that of Example 31-1, and the results were shown in Table 6 respectively.

Example 63-1

It was identical to Example 31-1, except that the phosphorus-aluminum inorganic binder was replaced with Binder 2 prepared in Example 28 to produce a catalytic cracking auxiliary, which was denoted as CAZ33-1. Its evaluation was identical to that of Example 31-1, and the result was shown in Table 6.

Example 63-2

It was identical to Example 31-2, except that the phosphorus-aluminum inorganic binder was replaced with Binder 2 prepared in Example 28 to produce a catalytic cracking auxiliary, which was denoted as CAZ33-2. Its evaluation was identical to that of Example 31-1, and the result was shown in Table 6.

Example 64-1

It was identical to Example 31-1, except that the phosphorus-aluminum inorganic binder was replaced with Binder 3 prepared in Example 29 to produce a catalytic cracking auxiliary, which was denoted as CAZ34-1. Its evaluation was identical to that of Example 31-1, and the result was shown in Table 6.

Example 64-2

It was identical to Example 31-2, except that the phosphorus-aluminum inorganic binder was replaced with Binder 3 prepared in Example 29 to produce a catalytic cracking auxiliary, which was denoted as CAZ34-2. Its evaluation was identical to that of Example 31-1, and the result was shown in Table 6.

Example 65-1

It was identical to Example 31-1, except that the phosphorus-aluminum inorganic binder was replaced with Binder 4 prepared in Example 30 to produce a catalytic cracking auxiliary, which was denoted as CAZ35-1. Its evaluation was identical to that of Example 31-1, and the result was shown in Table 6.

Example 65-2

It was identical to Example 31-2, except that the phosphorus-aluminum inorganic binder was replaced with Binder 4 prepared in Example 30 to produce a catalytic cracking auxiliary, which was denoted as CAZ35-2. Its evaluation was identical to that of Example 31-1, and the result was shown in Table 6.

Example 66-1

It was identical to Example 31-1, except that the phosphorus-modified ZSM-5 molecular sieve sample GPZ1-1 (45 wt %), kaolin (18 wt %), the phosphorus-aluminum inorganic binder, Binder 3 (22 wt %), pseudo-boehmite (10 wt %), and alumina sol (5 wt %) were used to produce a catalytic cracking auxiliary, which was denoted as CAZ36-1. Its evaluation was identical to that of Example 31-1, and the result was shown in Table 6.

Example 66-2

It was identical to Example 66-1, except that GPZ1-1 was replaced with GPZ1-2 to produce a catalytic cracking auxiliary, which was denoted as CAZ36-2. Its evaluation was identical to that of Example 31-1, and the result was shown in Table 6.

Comparative Example 66-1

It was identical to Example 66-1, except that GPZ1-1 was replaced with D1-1 to produce a catalytic cracking auxiliary comparative sample, which was denoted as DCAZ36-1. Its evaluation was identical to that of Example 31-1, and the result was shown in Table 6.

Comparative Example 66-2

It was identical to Example 66-1, except that GPZ1-1 was replaced with D1-2 to produce a catalytic cracking auxiliary comparative sample, which was denoted as DCAZ36-2. Its evaluation was identical to that of Example 31-1, and the result was shown in Table 6.

Example 67-1

It was identical to Example 44-1, except that the phosphorus-modified ZSM-5 molecular sieve sample GPZ14-1 (40 wt %), kaolin (24 wt %), the phosphorus-aluminum inorganic binder, Binder 4 (20 wt %), pseudo-boehmite (6 wt %), and silica sol (10 wt %) were used to produce a catalytic cracking auxiliary, which was denoted as CAZ37-1. Its evaluation was identical to that of Example 31-1, and the result was shown in Table 6.

Example 67-2

It was identical to Example 67-1, except that GPZ14-1 was replaced with GPZ14-2 to produce a catalytic cracking auxiliary, which was denoted as CAZ37-2. Its evaluation was identical to that of Example 31-1, and the result was shown in Table 6.

Comparative Example 67-1

It was identical to Example 67-1, except that GPZ14-1 was replaced with D14-1 to produce a catalytic cracking auxiliary comparative sample, which was denoted as DCAZ37-1. Its evaluation was identical to that of Example 31-1, and the result was shown in Table 6.

Comparative Example 67-2

It was identical to Example 67-1, except that GPZ14-1 was replaced with D14-2 to produce a catalytic cracking auxiliary comparative sample, which was denoted as DCAZ37-2. Its evaluation was identical to that of Example 31-1, and the result was shown in Table 6.

Example 68-1

The binder, alumina sol was mixed with kaolin, and decationized water was added to form a slurry with a solid content of 30 wt %. The slurry was stirred well, and adjusted with hydrochloric acid to a pH of 2.8. The slurry was allowed to stand at 55° C. to age for 1 hour. Then the phosphorus-modified molecular sieve GPZ1-1 prepared in Example 1-1 was added to form a slurry with a solid content of 35 wt %. The slurry was continuously stirred and spray-dried to form microspheres. The microspheres were then calcined at 500° C. for 1 hour, washed with ammonium sulfate at 60° C. (wherein, ammonium sulfate:microspheres:water=0.5:1:10) to the sodium oxide content of less than 0.25 wt %, followed by rinsed with deionized water and filtered, and then dried at 110° C. to produce the auxiliary CAZ38-1. Its composition comprised: the molecular sieve, 50%; kaolin, 23%; and alumina sol (as Al2O3), 27%. Its evaluation was identical to that of Example 31-1, and the result was shown in Table 6.

Example 68-2

It was identical to Example 68-1, except that the phosphorus-modified molecular sieve GPZ1-1 was replaced with the phosphorus-modified molecular sieve GPZ1-2 prepared in Example 1-2 to produce a catalytic cracking auxiliary sample, which was denoted as CAZ38-2. Its evaluation was identical to that of Example 31-1, and the result was shown in Table 6.

Comparative Example 68-1

It was identical to Example 68-1, except that the phosphorus-modified molecular sieve GPZ1-1 was replaced with the comparative sample D1-1 of Comparative Example 1-1 to produce a catalytic cracking auxiliary comparative sample, which was denoted as DCAZ38-1. Its evaluation was identical to that of Example 31-1, and the result was shown in Table 6.

Comparative Example 68-2

It was identical to Example 68-1, except that the phosphorus-modified molecular sieve GPZ1-1 was replaced with the comparative sample D1-2 of Comparative Example 1-2 to produce a catalytic cracking auxiliary comparative sample, which was denoted as DCAZ38-2. Its evaluation was identical to that of Example 31-1, and the result was shown in Table 6.

TABLE 6

| Item | Catalyst mixture | | Material balance, wt % | | |
|---|---|---|---|---|---|
| | | | Liquefied gas | Ethylene yield | Propylene yield |
| Example 31-1 | 10% CAZ1-1 | 90% equilibrium catalyst | 32.39 | 3.69 | 15.58 |
| Example 31-2 | 10% CAZ1-2 | 90% equilibrium catalyst | 38.69 | 4.5 | 17.32 |
| Example 32-1 | 10% CAZ2-1 | 90% equilibrium catalyst | 39.22 | 4.31 | 16.3 |
| Example 32-2 | 10% CAZ2-2 | 90% equilibrium catalyst | 43.2 | 4.8 | 16.99 |
| Example 33-1 | 10% CAZ3-1 | 90% equilibrium catalyst | 36.47 | 4.1 | 14.68 |
| Example 33-2 | 10% CAZ3-2 | 90% equilibrium catalyst | 39.71 | 4.5 | 15.83 |
| Example 34-1 | 10% CAZ4-1 | 90% equilibrium catalyst | 38.3 | 4.15 | 15.25 |
| Example 34-2 | 10% CAZ4-2 | 90% equilibrium catalyst | 41.7 | 4.61 | 16.06 |
| Example 35-1 | 10% CAZ5-1 | 90% equilibrium catalyst | 33.41 | 3.69 | 13.22 |
| Example 35-2 | 10% CAZ5-2 | 90% equilibrium catalyst | 36.48 | 4.02 | 14.68 |
| Example 36-1 | 10% CAZ6-1 | 90% equilibrium catalyst | 37.71 | 3.91 | 14.95 |
| Example 36-2 | 10% CAZ6-2 | 90% equilibrium catalyst | 41.64 | 4.61 | 15.86 |
| Example 37-1 | 10% CAZ7-1 | 90% equilibrium catalyst | 27.49 | 2.96 | 10.87 |
| Example 37-2 | 10% CAZ7-2 | 90% equilibrium catalyst | 31.92 | 3.69 | 13.18 |
| Example 38-1 | 10% CAZ8-1 | 90% equilibrium catalyst | 29.44 | 3.31 | 14.87 |

TABLE 6-continued

|  |  |  | Material balance, wt % | | |
|---|---|---|---|---|---|
| Item | Catalyst mixture | | Liquefied gas | Ethylene yield | Propylene yield |
| Example 38-2 | 10% CAZ8-2 | 90% equilibrium catalyst | 36.6 | 3.65 | 15.8 |
| Example 39-1 | 10% CAZ9-1 | 90% equilibrium catalyst | 29.03 | 3.26 | 14.84 |
| Example 39-2 | 10% CAZ9-2 | 90% equilibrium catalyst | 35.92 | 3.46 | 15.38 |
| Example 40-1 | 10% CAZ10-1 | 90% equilibrium catalyst | 29.12 | 3.17 | 14.53 |
| Example 40-2 | 10% CAZ10-2 | 90% equilibrium catalyst | 36.06 | 3.47 | 15.37 |
| Example 41-1 | 10% CAZ11-1 | 90% equilibrium catalyst | 32.86 | 3.56 | 13.7 |
| Example 41-2 | 10% CAZ11-2 | 90% equilibrium catalyst | 38.02 | 4.34 | 16.34 |
| Example 42-1 | 10% CAZ12-1 | 90% equilibrium catalyst | 32.09 | 3.62 | 13.9 |
| Example 42-2 | 10% CAZ12-2 | 90% equilibrium catalyst | 39.01 | 4.56 | 16.02 |
| Example 43-1 | 10% CAZ13-1 | 90% equilibrium catalyst | 31.89 | 3.38 | 13.09 |
| Example 43-2 | 10% CAZ13-2 | 90% equilibrium catalyst | 38.78 | 4.31 | 16.81 |
| Example 44-1 | 10% CAZ14-1 | 90% equilibrium catalyst | 30.09 | 3.5 | 14.52 |
| Example 44-2 | 10% CAZ14-2 | 90% equilibrium catalyst | 35.94 | 4.27 | 16.14 |
| Example 45-1 | 10% CAZ15-1 | 90% equilibrium catalyst | 36.44 | 4.09 | 15.19 |
| Example 45-2 | 10% CAZ15-2 | 90% equilibrium catalyst | 40.13 | 4.55 | 15.83 |
| Example 46-1 | 10% CAZ16-1 | 90% equilibrium catalyst | 33.88 | 3.89 | 13.68 |
| Example 46-2 | 10% CAZ16-2 | 90% equilibrium catalyst | 36.89 | 4.27 | 14.75 |
| Example 47-1 | 10% CAZ17-1 | 90% equilibrium catalyst | 35.58 | 3.93 | 14.21 |
| Example 47-2 | 10% CAZ17-2 | 90% equilibrium catalyst | 38.74 | 4.37 | 14.97 |
| Example 48-1 | 10% CAZ18-1 | 90% equilibrium catalyst | 31.04 | 3.5 | 12.32 |
| Example 48-2 | 10% CAZ18-2 | 90% equilibrium catalyst | 33.89 | 3.81 | 13.68 |
| Example 49-1 | 10% CAZ19-1 | 90% equilibrium catalyst | 35.03 | 3.71 | 13.93 |
| Example 49-2 | 10% CAZ19-2 | 90% equilibrium catalyst | 38.68 | 4.37 | 14.78 |
| Example 50-1 | 10% CAZ20-1 | 90% equilibrium catalyst | 25.54 | 2.81 | 10.13 |
| Example 50-2 | 10% CAZ20-2 | 90% equilibrium catalyst | 29.65 | 3.5 | 12.28 |

TABLE 6-continued

|  |  |  | Material balance, wt % | | |
|---|---|---|---|---|---|
| Item | Catalyst mixture | | Liquefied gas | Ethylene yield | Propylene yield |
| Example 51-1 | 10% CAZ21-1 | 90% equilibrium catalyst | 31.41 | 3.79 | 15.32 |
| Example 51-2 | 10% CAZ21-2 | 90% equilibrium catalyst | 40.75 | 4.7 | 17.49 |
| Example 52-1 | 10% CAZ22-1 | 90% equilibrium catalyst | 28.55 | 3.49 | 13.36 |
| Example 52-2 | 10% CAZ22-2 | 90% equilibrium catalyst | 37.04 | 4.33 | 15.25 |
| Example 53-1 | 10% CAZ23-1 | 90% equilibrium catalyst | 28.49 | 3.01 | 11.46 |
| Example 53-2 | 10% CAZ23-2 | 90% equilibrium catalyst | 33.08 | 3.77 | 13.91 |
| Example 54-1 | 10% CAZ24-1 | 90% equilibrium catalyst | 31.77 | 3.49 | 12.32 |
| Example 54-2 | 10% CAZ24-2 | 90% equilibrium catalyst | 34.69 | 3.8 | 13.68 |
| Example 55-1 | 10% CAZ25-1 | 90% equilibrium catalyst | 35.86 | 3.7 | 13.93 |
| Example 55-2 | 10% CAZ25-2 | 90% equilibrium catalyst | 39.6 | 4.36 | 14.78 |
| Example 56-1 | 10% CAZ26-1 | 90% equilibrium catalyst | 26.14 | 2.8 | 10.13 |
| Example 56-2 | 10% CAZ26-2 | 90% equilibrium catalyst | 30.36 | 3.49 | 12.28 |
| Example 57-1 | 10% CAZ27-1 | 90% equilibrium catalyst | 26.79 | 2.99 | 13.22 |
| Example 57-2 | 10% CAZ27-2 | 90% equilibrium catalyst | 33.31 | 3.3 | 14.05 |
| Example 58-1 | 10% CAZ28-1 | 90% equilibrium catalyst | 26.42 | 2.95 | 13.19 |
| Example 58-2 | 10% CAZ28-2 | 90% equilibrium catalyst | 32.69 | 3.13 | 13.67 |
| Example 59-1 | 10% CAZ29-1 | 90% equilibrium catalyst | 26.5 | 2.87 | 12.92 |
| Example 59-2 | 10% CAZ29-2 | 90% equilibrium catalyst | 32.81 | 3.14 | 13.66 |
| Example 60-1 | 10% CAZ30-1 | 90% equilibrium catalyst | 26.11 | 3.02 | 12.89 |
| Example 60-2 | 10% CAZ30-2 | 90% equilibrium catalyst | 32.46 | 3.33 | 13.7 |
| Example 61-1 | 10% CAZ31-1 | 90% equilibrium catalyst | 25.75 | 2.97 | 12.87 |
| Example 61-2 | 10% CAZ31-2 | 90% equilibrium catalyst | 31.86 | 3.16 | 13.33 |
| Example 62-1 | 10% CAZ32-1 | 90% equilibrium catalyst | 25.83 | 2.89 | 12.6 |
| Example 62-2 | 10% CAZ32-2 | 90% equilibrium catalyst | 31.99 | 3.16 | 13.33 |
| Example 63-1 | 10% CAZ33-1 | 90% equilibrium catalyst | 29.81 | 3.5 | 15.18 |

TABLE 6-continued

| Item | Catalyst mixture | | Material balance, wt % | | |
|---|---|---|---|---|---|
| | | | Liquefied gas | Ethylene yield | Propylene yield |
| Example 63-2 | 10% CAZ33-2 | 90% equilibrium catalyst | 37.06 | 3.87 | 16.13 |
| Example 64-1 | 10% CAZ34-1 | 90% equilibrium catalyst | 29.4 | 3.45 | 15.16 |
| Example 64-2 | 10% CAZ34-2 | 90% equilibrium catalyst | 36.38 | 3.66 | 15.71 |
| Example 65-1 | 10% CAZ35-1 | 90% equilibrium catalyst | 29.48 | 3.36 | 14.84 |
| Example 65-2 | 10% CAZ35-2 | 90% equilibrium catalyst | 36.51 | 3.68 | 15.69 |
| Example 66-1 | 10% CAZ36-1 | 90% equilibrium catalyst | 30.17 | 3.16 | 14.44 |
| Example 66-2 | 10% CAZ36-2 | 90% equilibrium catalyst | 35.04 | 3.68 | 16.24 |
| Example 67-1 | 10% CAZ37-1 | 90% equilibrium catalyst | 36.68 | 3.88 | 15.33 |
| Example 67-2 | 10% CAZ37-2 | 90% equilibrium catalyst | 40.39 | 4.32 | 15.97 |
| Example 68-1 | 10% CAZ38-1 | 90% equilibrium catalyst | 33.85 | 3.73 | 16.44 |
| Example 68-2 | 10% CAZ38-2 | 90% equilibrium catalyst | 40.43 | 4.55 | 18.27 |
| Blank test example | / | 100% equilibrium catalyst | 18.54 | 1.39 | 8.05 |
| Comparative Example 31-1 | 10% DCAZ1-1 | 90% equilibrium catalyst | 26.17 | 2.74 | 11.17 |
| Comparative Example 31-2 | 10% DCAZ-2 | 90% equilibrium catalyst | 27.29 | 2.9 | 12.02 |
| Comparative Example 32-1 | 10% DCAZ2-1 | 90% equilibrium catalyst | 27.72 | 2.89 | 12.07 |
| Comparative Example 32-2 | 10% DCAZ2-2 | 90% equilibrium catalyst | 31 | 3.3 | 12.75 |
| Comparative Example 33-1 | 10% DCAZ3-1 | 90% equilibrium catalyst | 26.28 | 2.86 | 11.44 |
| Comparative Example 33-2 | 10% DCAZ3-2 | 90% equilibrium catalyst | 30.68 | 3.15 | 12.19 |
| Comparative Example 34-1 | 10% DCAZ4-1 | 90% equilibrium catalyst | 28.08 | 3 | 12.43 |
| Comparative Example 34-2 | 10% DCAZ4-2 | 90% equilibrium catalyst | 31.84 | 3.2 | 12.98 |
| Comparative Example 35-1 | 10% DCAZ5-1 | 90% equilibrium catalyst | 22.88 | 3.15 | 9.62 |
| Comparative Example 35-2 | 10% DCAZ5-2 | 90% equilibrium catalyst | 24.72 | 3.35 | 10.77 |
| Comparative Example 36-1 | 10% DCAZ6-1 | 90% equilibrium catalyst | 28.2 | 3 | 12.91 |
| Comparative Example 36-2 | 10% DCAZ6-2 | 90% equilibrium catalyst | 29.85 | 3.35 | 13.64 |
| Comparative Example 37-1 | 10% DCAZ7-1 | 90% equilibrium catalyst | 18.76 | 3.09 | 8.82 |

TABLE 6-continued

| | | Material balance, wt % | | |
|---|---|---|---|---|
| Item | Catalyst mixture | | Liquefied gas | Ethylene yield | Propylene yield |
| Comparative Example 37-2 | 10% DCAZ7-2 | 90% equilibrium catalyst | 20.32 | 3.23 | 9.98 |
| Comparative Example 44-1 | 10% DCAZ14-1 | 90% equilibrium catalyst | 24.31 | 2.6 | 10.41 |
| Comparative Example 44-2 | 10% DCAZ14-2 | 90% equilibrium catalyst | 25.35 | 2.75 | 11.2 |
| Comparative Example 45-1 | 10% DCAZ15-1 | 90% equilibrium catalyst | 25.75 | 2.74 | 11.25 |
| Comparative Example 45-2 | 10% DCAZ15-2 | 90% equilibrium catalyst | 28.8 | 3.13 | 11.88 |
| Comparative Example 46-1 | 10% DCAZ16-1 | 90% equilibrium catalyst | 24.41 | 2.71 | 10.66 |
| Comparative Example 46-2 | 10% DCAZ16-2 | 90% equilibrium catalyst | 28.5 | 2.99 | 11.36 |
| Comparative Example 47-1 | 10% DCAZ17-1 | 90% equilibrium catalyst | 26.09 | 2.84 | 11.58 |
| Comparative Example 47-2 | 10% DCAZ17-2 | 90% equilibrium catalyst | 29.58 | 3.03 | 12.1 |
| Comparative Example 48-1 | 10% DCAZ18-1 | 90% equilibrium catalyst | 21.26 | 2.99 | 8.97 |
| Comparative Example 48-2 | 10% DCAZ18-2 | 90% equilibrium catalyst | 22.96 | 3.18 | 10.04 |
| Comparative Example 49-1 | 10% DCAZ19-1 | 90% equilibrium catalyst | 26.2 | 2.84 | 12.03 |
| Comparative Example 49-2 | 10% DCAZ19-2 | 90% equilibrium catalyst | 27.73 | 3.18 | 12.71 |
| Comparative Example 50-1 | 10% DCAZ20-1 | 90% equilibrium catalyst | 17.43 | 2.93 | 8.22 |
| Comparative Example 50-2 | 10% DCAZ20-2 | 90% equilibrium catalyst | 18.88 | 3.06 | 9.3 |
| Comparative Example 66-1 | 10% DCAZ36-1 | 90% equilibrium catalyst | 22.03 | 2.15 | 9.96 |
| Comparative Example 66-2 | 10% DCAZ36-2 | 90% equilibrium catalyst | 24.37 | 2.76 | 11.16 |
| Comparative Example 67-1 | 10% DCAZ37-1 | 90% equilibrium catalyst | 25.93 | 2.61 | 11.35 |
| Comparative Example 67-2 | 10% DCAZ37-2 | 90% equilibrium catalyst | 28.99 | 2.97 | 11.99 |
| Comparative Example 68-1 | 10% DCAZ38-1 | 90% equilibrium catalyst | 27.35 | 2.77 | 11.79 |
| Comparative Example 68-2 | 10% DCAZ38-2 | 90% equilibrium catalyst | 28.52 | 2.93 | 12.68 |

Example 69-1 and Example 69-2

In Example 69-1 and Example 69-2 were respectively used the catalytic cracking auxiliaries CAZ1-1 and CAZ1-2 of Example 31-1 and Example 31-2. The feedstock oil for catalytic cracking was the naphtha shown in Table 5.

The evaluation condition included the reaction temperature of 620° C., the regeneration temperature of 620° C., and the catalyst-oil ratio of 3.2.

Table 7 showed the weight composition and the reaction result of each catalyst mixture containing the catalytic cracking auxiliary.

Comparative Example 69-1 and Comparative Example 69-2

It was identical to Example 69-1, except that the catalytic cracking comparative auxiliaries DCAZ1-1 and DCAZ1-2 of Comparative Example 31-1 and Comparative Example 31-2 were used respectively.

The weight composition and the reaction result of each catalyst mixture containing the catalytic cracking auxiliary comparative sample were shown in Table 7.

Example 70-1 and Example 70-2

In Example 70-1 and Example 70-2 were respectively used the catalytic cracking auxiliaries CAZ14-1 and CAZ14-2 of Example 44-1 and Example 44-2. The feedstock oil for catalytic cracking was the naphtha shown in Table 5.

The evaluation condition included the reaction temperature of 620° C., the regeneration temperature of 620° C., and the catalyst-oil ratio of 3.2.

Table 7 showed the weight composition and the reaction result of each catalyst mixture containing the catalytic cracking auxiliary.

Comparative Example 70-1 and Comparative Example 70-2

It was identical to Example 70-1, except that the catalytic cracking comparative auxiliaries DCAZ14-1 and DCAZ14-2 of Comparative Example 44-1 and Comparative Example 44-2 were used respectively.

The weight composition and the reaction result of each catalyst mixture containing the catalytic cracking auxiliary comparative sample were shown in Table 7.

TABLE 7

| | Catalyst mixture | | Cracked gas product yield/wt % | |
|---|---|---|---|---|
| | | | Liquefied gas | Propylene yield |
| Blank test example | / | 100% equilibrium catalyst | 69.13 | 8.42 |
| Example 69-1 | 10% CAZ1-1 | 90% equilibrium catalyst | 80.32 | 14.1 |
| Example 69-2 | 10% CAZ1-2 | 90% equilibrium catalyst | 85.42 | 15.36 |
| Comparative Example 69-1 | 10% DCAZ1-1 | 90% equilibrium catalyst | 73.16 | 9.98 |
| Comparative Example 69-2 | 10% DCAZ1-2 | 90% equilibrium catalyst | 75.46 | 10.68 |
| Example 70-1 | 10% CAZ14-1 | 90% equilibrium catalyst | 73.17 | 12.92 |
| Example 70-2 | 10% CAZ14-2 | 90% equilibrium catalyst | 77.82 | 14.07 |
| Comparative Example 70-1 | 10% DCAZ14-1 | 90% equilibrium catalyst | 66.65 | 9.14 |
| Comparative Example 70-2 | 10% DCAZ14-2 | 90% equilibrium catalyst | 68.74 | 9.78 |

Example Y31 to Example Y56 provided the catalytic cracking catalysts of the present invention, and Comparative Example Y31 to Comparative Example Y56 illustrated comparative catalytic cracking comparative catalysts, wherein Example Y31 to Example Y43 contained phosphorus-modified hierarchical ZSM-5 molecular sieves, and Example Y44 to Example Y56 contained phosphorus-modified micropore ZSM-5 molecular sieves.

Example Y31-1

Phosphorus-modified molecular sieve GPZ1-1 prepared in Example 1-1, Y zeolite (PSRY zeolite), kaolin, and pseudo-boehmite were taken, and decationized water and alumina sol were added. The mixture was vigorously mixed and stirred for 120 minutes to produce a slurry having a solid content of 30 wt %. Hydrochloric acid was added to adjust the pH of the slurry to 3.0, and then the vigorously mixing and stirring was continued for 45 minutes. Then the phosphorus-aluminum inorganic binder, Binder 1 prepared in Example 27 was added, and the mixture was stirred for 30 minutes. The resulting slurry was spray-dried to produce microspheres. The microspheres were calcined at 500° C. for 1 hour to produce a catalytic cracking catalyst sample, which was denoted as CAZY1-1 And had a composition of phosphorus-modified ZSM-5 molecular sieve: 40%, PSRY zeolite: 10%, kaolin: 18%, Binder 1: 18%, pseudo-boehmite (as Al2O3): 5%, alumina sol (as Al2O3): 9%.

A fixed bed micro-reaction apparatus was used to evaluate the reaction performances of 100% equilibrium catalyst and the equilibrium catalyst to which CAZY1-1 was incorporated, in order to illustrate the catalytic cracking reaction effect.

The catalyst CAZY1-1 was subjected to aging treatment at 800° C., 100% water vapor atmosphere for 17 hours. The aging-treated CAZY1-1 was mixed with an industrial FCC equilibrium catalyst (brand: DVR-3, and having a light oil micro-activity of 63). A mixture of the equilibrium catalyst and the catalyst was loaded into the fixed-bed micro-reaction reactor, and the feedstock oil shown in Table 4 was catalytically cracked. The evaluation condition included the reaction temperature of 620° C., the regeneration temperature of 620° C., and the catalyst-oil ratio of 3.2. Table 8 provided the reaction results, including the blank test agent.

Example Y31-2

It was identical to Example Y31-1, except that the phosphorus-modified molecular sieve GPZ1-1 was replaced with the phosphorus-modified molecular sieve GPZ1-2 prepared in Example 1-2 to produce a catalytic cracking catalyst, which was denoted as CAZY1-2. Its evaluation was identical to that of Example Y31-1, and the result was shown in Table 8.

Comparative Example Y31-1

It was identical to Example Y31-1, except that the phosphorus-modified molecular sieve GPZ1-1 was replaced with the comparative sample D1-1 of Comparative Example 1-1 to produce a catalytic cracking catalyst comparative sample, which was denoted as DCAZY1-1. Its evaluation was identical to that of Example Y31-1, and the result was shown in Table 8.

Comparative Example Y31-2

It was identical to Example Y31-1, except that the phosphorus-modified molecular sieve GPZ1-1 was replaced with the comparative sample D1-2 of Comparative Example 1-2 to produce a catalytic cracking catalyst comparative sample, which was denoted as DCAZY1-2. Its evaluation was identical to that of Example Y31-1, and the result was shown in Table 8.

Example Y32-1

It was identical to Example Y31-1, except that the phosphorus-modified molecular sieve GPZ1-1 was replaced with the phosphorus-modified molecular sieve GPZ2-1 prepared in Example 2-1 to produce a catalytic cracking catalyst, which was denoted as CAZY2-1. Its evaluation was identical to that of Example Y31-1, and the result was shown in Table 8.

Example Y32-2

It was identical to Example Y32-1, except that the phosphorus-modified molecular sieve GPZ2-1 was replaced with the phosphorus-modified molecular sieve GPZ2-2 prepared in Example 2-2 to produce a catalytic cracking catalyst, which was denoted as CAZY2-2. Its evaluation was identical to that of Example Y31-1, and the result was shown in Table 8.

Comparative Example Y32-1

It was identical to Example Y32-1, except that the phosphorus-modified molecular sieve GPZ2-1 was replaced with the comparative sample D2-1 of Comparative Example 2-1 to produce a catalytic cracking catalyst comparative sample, which was denoted as DCAZY2-1. Its evaluation was identical to that of Example Y31-1, and the result was shown in Table 8.

Comparative Example Y32-2

It was identical to Example Y32-1, except that the phosphorus-modified molecular sieve GPZ2-1 was replaced with the comparative sample D2-2 of Comparative Example 2-2 to produce a catalytic cracking catalyst comparative sample, which was denoted as DCAZY2-2. Its evaluation was identical to that of Example Y31-1, and the result was shown in Table 8.

Example Y33-1

It was identical to Example Y31-1, except that the phosphorus-modified molecular sieve GPZ1-1 was replaced with the phosphorus-modified molecular sieve GPZ3-1 prepared in Example 3-1 to produce a catalytic cracking catalyst, which was denoted as CAZY3-1. Its evaluation was identical to that of Example Y31-1, and the result was shown in Table 8.

Example Y33-2

It was identical to Example Y31-1, except that the phosphorus-modified molecular sieve GPZ1-1 was replaced with the phosphorus-modified molecular sieve GPZ3-2 prepared in Example 3-2 to produce a catalytic cracking catalyst, which was denoted as CAZY3-2. Its evaluation was identical to that of Example Y31-1, and the result was shown in Table 8.

Comparative Example Y33-1

It was identical to Example Y31-1, except that the phosphorus-modified molecular sieve GPZ1-1 was replaced with the comparative sample D3-1 of Comparative Example 3-1 to produce a catalytic cracking catalyst comparative sample, which was denoted as DCAZY3-1. Its evaluation was identical to that of Example Y31-1, and the result was shown in Table 8.

Comparative Example Y33-2

It was identical to Example Y31-1, except that the phosphorus-modified molecular sieve GPZ1-1 was replaced with the comparative sample D3-2 of Comparative Example 3-2 to produce a catalytic cracking catalyst comparative sample, which was denoted as DCAZY3-2. Its evaluation was identical to that of Example Y31-1, and the result was shown in Table 8.

Example Y34-1

It was identical to Example Y31-1, except that the phosphorus-modified molecular sieve GPZ1-1 was replaced with the phosphorus-modified molecular sieve GPZ4-1 prepared in Example 4-1 to produce a catalytic cracking catalyst, which was denoted as CAZY4-1. Its evaluation was identical to that of Example Y31-1, and the result was shown in Table 8.

Example Y34-2

It was identical to Example Y34-1, except that the phosphorus-modified molecular sieve GPZ4-1 was replaced with the phosphorus-modified molecular sieve GPZ4-2 prepared in Example 4-2 to produce a catalytic cracking catalyst, which was denoted as CAZY4-2. Its evaluation was identical to that of Example Y31-1, and the result was shown in Table 8.

Comparative Example Y34-1

It was identical to Example Y34-1, except that the phosphorus-modified molecular sieve GPZ4-1 was replaced with the comparative sample D4-1 of Comparative Example 4-1 to produce a catalytic cracking catalyst comparative sample, which was denoted as DCAZY4-1. Its evaluation was identical to that of Example Y31-1, and the result was shown in Table 8.

Comparative Example Y34-2

It was identical to Example Y34-1, except that the phosphorus-modified molecular sieve GPZ1-1 was replaced with the comparative sample D4-2 of Comparative Example 4-2 to produce a catalytic cracking catalyst comparative sample, which was denoted as DCAZY4-2. Its evaluation was identical to that of Example Y31-1, and the result was shown in Table 8.

Example Y35-1

It was identical to Example Y31-1, except that the phosphorus-modified molecular sieve GPZ1-1 was replaced with the phosphorus-modified molecular sieve GPZ5-1 prepared in Example 5-1 to produce a catalytic cracking catalyst, which was denoted as CAZY5-1. Its evaluation was identical to that of Example Y31-1, and the result was shown in Table 8.

Example Y35-2

It was identical to Example Y35-1, except that the phosphorus-modified molecular sieve GPZ5-1 was replaced with the phosphorus-modified molecular sieve GPZ5-2 prepared in Example 5-2 to produce a catalytic cracking catalyst, which was denoted as CAZY5-2. Its evaluation was identical to that of Example Y35-1, and the result was shown in Table 8.

Comparative Example Y35-1

It was identical to Example Y35-1, except that the phosphorus-modified molecular sieve GPZ5-1 was replaced with the comparative sample D5-1 of Comparative Example 5-1 to produce a catalytic cracking catalyst comparative sample, which was denoted as DCAZY5-1. Its evaluation was identical to that of Example Y35-1, and the result was shown in Table 8.

Comparative Example Y35-2

It was identical to Example Y35-1, except that the phosphorus-modified molecular sieve GPZ5-1 was replaced with the comparative sample D5-2 of Comparative Example 5-2 to produce a catalytic cracking catalyst comparative sample, which was denoted as DCAZY5-2. Its evaluation was identical to that of Example Y35-1, and the result was shown in Table 8.

Example Y36-1

It was identical to Example Y31-1, except that the phosphorus-modified molecular sieve GPZ1-1 was replaced with the phosphorus-modified molecular sieve GPZ6-1 prepared in Example 6-1 to produce a catalytic cracking catalyst, which was denoted as CAZY6-1. Its evaluation was identical to that of Example Y31-1, and the result was shown in Table 8.

Example Y36-2

It was identical to Example Y36-1, except that the phosphorus-modified molecular sieve GPZ6-1 was replaced with the phosphorus-modified molecular sieve GPZ6-2 prepared in Example 6-2 to produce a catalytic cracking catalyst, which was denoted as CAZY6-2. Its evaluation was identical to that of Example Y36-1, and the result was shown in Table 8.

Comparative Example Y36-1

It was identical to Example Y36-1, except that the phosphorus-modified molecular sieve GPZ6-1 was replaced with the comparative sample D6-1 of Comparative Example 6-1 to produce a catalytic cracking catalyst comparative sample, which was denoted as DCAZY6-1. Its evaluation was identical to that of Example Y36-1, and the result was shown in Table 8.

Comparative Example Y36-2

It was identical to Example Y36-1, except that the phosphorus-modified molecular sieve GPZ6-1 was replaced with the comparative sample D6-2 of Comparative Example 6-2 to produce a catalytic cracking catalyst comparative sample, which was denoted as DCAZY6-2. Its evaluation was identical to that of Example Y36-1, and the result was shown in Table 8.

Example Y37-1

It was identical to Example Y31-1, except that the phosphorus-modified molecular sieve GPZ1-1 was replaced with the phosphorus-modified molecular sieve GPZ7-1 prepared in Example 7-1 to produce a catalytic cracking catalyst, which was denoted as CAZY7-1. Its evaluation was identical to that of Example Y31-1, and the result was shown in Table 8.

Example Y37-2

It was identical to Example Y37-1, except that the phosphorus-modified molecular sieve GPZ7-1 was replaced with the phosphorus-modified molecular sieve GPZ7-2 prepared in Example 7-2 to produce a catalytic cracking catalyst, which was denoted as CAZY7-2. Its evaluation was identical to that of Example Y31-1, and the result was shown in Table 8.

Comparative Example Y37-1

It was identical to Example Y37-1, except that the phosphorus-modified molecular sieve GPZ7-1 was replaced with the comparative sample D7-1 of Comparative Example 7-1 to produce a catalytic cracking catalyst comparative sample, which was denoted as DCAZY7-1. Its evaluation was identical to that of Example Y31-1, and the result was shown in Table 8.

Comparative Example Y37-2

It was identical to Example Y37-1, except that the phosphorus-modified molecular sieve GPZ7-1 was replaced with the comparative sample D7-2 of Comparative Example 7-2 to produce a catalytic cracking catalyst comparative sample, which was denoted as DCAZY7-2. Its evaluation was identical to that of Example Y31-1, and the result was shown in Table 8.

Example Y38 to Example Y43

It was identical to Example Y31-1, except that the phosphorus-modified molecular sieve GPZ1-1 was replaced with the phosphorus-modified molecular sieves GPZ8-1 to GPZ13-2 prepared in Example 8-1 to Example 13-2 respectively to produce catalytic cracking catalyst samples, which were successively denoted as CAZY8-1 to CAZY13-2. Their evaluations were identical to that of Example Y31-1, and the results were shown in Table 8 respectively.

Example Y44 to Example Y56

Example Y44 to Example Y56 were successively catalysts CAZY14 to CAZY26 containing microporous ZSM-5 (GPZ14 to GPZ26) respectively, and their material compositions corresponded to those of Example Y31 to Example Y43 respectively, for example, in Example Y44-1, GPZ1-1 was replaced with GPZ14-1, in Example 44-2, GPZ1-2 was replaced with GPZ14-2, and so on, until in Example Y56-1, GPZ13-1 was replaced with GPZ26-1, in Example 56-2, GPZ13-2 was replaced with GPZ26-2. Their evaluations were identical to that of Example Y31-1, and the results were shown in Table 8 respectively.

Comparative Example Y44 to Comparative Example Y50

Comparative Example Y44 to Comparative Example Y50 were successively comparative catalysts DCAZY-14 to DCAZY-20 containing microporous ZSM-5 (D14 to D20) respectively, and their material compositions corresponded to those of Example Y44 to Example Y50 respectively, for example, in Comparative Example Y44-1, GPZ1-1 was replaced with D14-1, in Comparative Example Y44-2, GPZ1-2 was replaced with D14-2, and so on, until in Comparative Example Y50-1, GPZ14-1 was replaced with D20-1, in Comparative Example 50-2, GPZ14-2 was replaced with D20-2. Their evaluations were identical to that of Example Y31-1, and the results were shown in Table 8 respectively.

Example Y57 to Example Y62

It was identical to Example Y31-1, except that the phosphorus-modified molecular sieve GPZ1-1 was successively replaced with the phosphorus-modified molecular sieves GPZ21-1 to GPZ26-2 prepared in Example 21-1 to Example 26-2 respectively to produce catalytic cracking catalyst samples, which were successively denoted as CAZY27-1 to CAZY32-2. Their evaluations were identical to that of Example Y31-1, and the results were shown in Table 8 respectively.

Example Y63-1

It was identical to Example Y31-1, except that the phosphorus-aluminum inorganic binder was replaced with Binder 2 prepared in Example Y28 to produce a catalytic cracking catalyst, which was denoted as CAZY33-1. Its evaluation was identical to that of Example Y31-1, and the result was shown in Table 8.

Example Y63-2

It was identical to Example Y31-2, except that the phosphorus-aluminum inorganic binder was replaced with Binder 2 prepared in Example Y28 to produce a catalytic cracking catalyst, which was denoted as CAZY33-2. Its evaluation was identical to that of Example Y31-1, and the result was shown in Table 8.

Example Y64-1

It was identical to Example Y31-1, except that the phosphorus-aluminum inorganic binder was replaced with Binder 3 prepared in Example Y29 to produce a catalytic cracking catalyst, which was denoted as CAZY34-1. Its evaluation was identical to that of Example Y31-1, and the result was shown in Table 8.

Example Y64-2

It was identical to Example Y31-2, except that the phosphorus-aluminum inorganic binder was replaced with Binder 3 prepared in Example Y29 to produce a catalytic cracking catalyst, which was denoted as CAZY34-2. Its evaluation was identical to that of Example Y31-1, and the result was shown in Table 8.

Example Y65-1

It was identical to Example Y31-1, except that the phosphorus-aluminum inorganic binder was replaced with Binder 4 prepared in Example Y30 to produce a catalytic cracking catalyst, which was denoted as CAZY35-1. Its evaluation was identical to that of Example Y31-1, and the result was shown in Table 8.

Example Y65-2

It was identical to Example Y31-2, except that the phosphorus-aluminum inorganic binder was replaced with Binder 4 prepared in Example Y30 to produce a catalytic cracking catalyst, which was denoted as CAZY35-2. Its evaluation was identical to that of Example Y31-1, and the result was shown in Table 8.

Example Y66-1

It was identical to Example Y31-1, except that the phosphorus-modified hierarchical ZSM-5 molecular sieve sample GPZ1-1 (35 wt %), PSRY zeolite (10 wt %), kaolin (18 wt %), the phosphorus-aluminum inorganic binder, Binder 3 (22 wt %), pseudo-boehmite (10 wt %), and alumina sol (5 wt %) were used to produce a catalytic cracking catalyst, which was denoted as CAZY36-1. Its evaluation was identical to that of Example Y31-1, and the result was shown in Table 8.

Example Y66-2

It was identical to Example Y66-1, except that GPZ1-1 was replaced with GPZ1-2 to produce a catalytic cracking catalyst, which was denoted as CAZY36-2. Its evaluation was identical to that of Example Y31-1, and the result was shown in Table 8.

Comparative Example Y66-1

It was identical to Example Y66-1, except that GPZ1-1 was replaced with D1-1 to produce a catalytic cracking catalyst comparative sample, which was denoted as DCAZY36-1. Its evaluation was identical to that of Example Y31-1, and the result was shown in Table 8.

Comparative Example Y66-2

It was identical to Example Y66-1, except that GPZ1-1 was replaced with D1-2 to produce a catalytic cracking catalyst comparative sample, which was denoted as DCAZY36-2. Its evaluation was identical to that of Example Y31-1, and the result was shown in Table 8.

Example Y67-1

It was identical to Example Y44-1, except that the phosphorus-modified micropore ZSM-5 molecular sieve sample GPZ14-1 (30 wt %), PSRY zeolite (6 wt %), kaolin (24 wt %), the phosphorus-aluminum inorganic binder, Binder 4 (22 wt %), pseudo-boehmite (8 wt %), and silica sol (10 wt %) were used to produce a catalytic cracking catalyst, which was denoted as CAZY37-1. Its evaluation was identical to that of Example Y31-1, and the result was shown in Table 8.

Example Y67-2

It was identical to Example Y67-1, except that GPZ14-1 was replaced with GPZ14-2 to produce a catalytic cracking catalyst, which was denoted as CAZY37-2. Its evaluation was identical to that of Example Y31-1, and the result was shown in Table 8.

Comparative Example Y67-1

It was identical to Example Y67-1, except that GPZ14-1 was replaced with D14-1 to produce a catalytic cracking catalyst comparative sample, which was denoted as DCAZY37-1. Its evaluation was identical to that of Example Y31-1, and the result was shown in Table 8.

Comparative Example Y67-2

It was identical to Example Y67-1, except that GPZ14-1 was replaced with D14-2 to produce a catalytic cracking catalyst comparative sample, which was denoted as DCAZY37-2. Its evaluation was identical to that of Example Y31-1, and the result was shown in Table 8.

Example Y68-1

The binder, alumina sol was mixed with kaolin, and decationized water was added to form a slurry with a solid content of 30 wt %. The slurry was stirred well, and adjusted with hydrochloric acid to a pH of 2.8. The slurry was allowed to stand at 55° C. to age for 1 hour. Then the phosphorus-modified molecular sieve GPZ1-1 prepared in Example 1-1 and Y zeolite (PSRY zeolite) were added to form a catalyst slurry with a solid content of 35 wt %. The slurry was continuously stirred and spray-dried to form catalyst microspheres. The catalyst microspheres were then calcined at 500° C. for 1 hour, washed with ammonium sulfate at 60° C. (wherein, ammonium sulfate:catalyst microspheres:water=0.5:1:10) to the sodium oxide content of less than 0.25 wt %, followed by rinsed with deionized water and filtered, and then dried at 110° C. to produce the catalyst CAZY38-1. Its composition comprised: the phosphorus-modified ZSM-5 molecular sieve GPZ1-1, 40%; PSRY zeolite, 10%; kaolin, 25%; and alumina sol (as Al2O3), 25%. Its evaluation was identical to that of Example Y31-1, and the result was shown in Table 8.

Example Y68-2

It was identical to Example Y68-1, except that the phosphorus-modified molecular sieve GPZ1-1 was replaced with the phosphorus-modified molecular sieve GPZ1-2 prepared in Example 1-2 to produce a catalytic cracking catalyst, which was denoted as CAZY38-2. Its evaluation was identical to that of Example Y31-1, and the result was shown in Table 8.

Comparative Example Y68-1

It was identical to Example Y68-1, except that the phosphorus-modified molecular sieve GPZ1-1 was replaced with the comparative sample D1-1 of Comparative Example Y1-1 to produce a catalytic cracking catalyst comparative sample, which was denoted as DCAZY38-1. Its evaluation was identical to that of Example Y31-1, and the result was shown in Table 8.

Comparative Example Y68-2

It was identical to Example Y68-1, except that the phosphorus-modified molecular sieve GPZ1-1 was replaced with the comparative sample D1-2 of Comparative Example Y1-2 to produce a catalytic cracking catalyst comparative sample, which was denoted as DCAZY38-2. Its evaluation was identical to that of Example Y31-1, and the result was shown in Table 8.

Example Y69-1 and Example Y69-2

In Example Y69-1 and Example Y69-2 were respectively used the catalytic cracking catalysts CAZY1-1 and CAZY1-2 of Example Y31-1 and Example Y31-2. The feedstock oil for catalytic cracking was the naphtha shown in Table 5.

The evaluation condition included the reaction temperature of 620° C., the regeneration temperature of 620° C., and the catalyst-oil ratio of 3.2.

Table 9 showed the weight composition and the reaction result of each catalyst mixture containing the catalytic cracking catalyst.

Comparative Example Y69-1 and Comparative Example Y69-2

TABLE 8

| | Catalyst | | Material balance, wt % | | |
|---|---|---|---|---|---|
| | | | Liquefied gas | Ethylene yield | Propylene yield |
| Example Y31-1 | 10% CAZY1-1 | 90% equilibrium catalyst | 35.63 | 4.01 | 17.87 |
| Example Y31-2 | 10% CAZY1-2 | 90% equilibrium catalyst | 38.91 | 4.15 | 18.53 |
| Example Y32-1 | 10% CAZY2-1 | 90% equilibrium catalyst | 33.63 | 3.68 | 16.67 |
| Example Y32-2 | 10% CAZY2-2 | 90% equilibrium catalyst | 36.71 | 4.01 | 17.78 |
| Example Y33-1 | 10% CAZY3-1 | 90% equilibrium catalyst | 35.34 | 3.81 | 16.98 |
| Example Y33-2 | 10% CAZY3-2 | 90% equilibrium catalyst | 37.72 | 4.12 | 17.98 |
| Example Y34-1 | 10% CAZY4-1 | 90% equilibrium catalyst | 35.01 | 3.68 | 17.13 |
| Example Y34-2 | 10% CAZY4-2 | 90% equilibrium catalyst | 37.98 | 4.23 | 18.54 |
| Example Y35-1 | 10% CAZY5-1 | 90% equilibrium catalyst | 31.56 | 3.31 | 15.61 |

TABLE 8-continued

| | Catalyst | | Material balance, wt % | | |
|---|---|---|---|---|---|
| | | | Liquefied gas | Ethylene yield | Propylene yield |
| Example Y35-2 | 10% CAZY5-2 | 90% equilibrium catalyst | 34.29 | 3.8 | 16.59 |
| Example Y36-1 | 10% CAZY6-1 | 90% equilibrium catalyst | 35.89 | 3.9 | 17.67 |
| Example Y36-2 | 10% CAZY6-2 | 90% equilibrium catalyst | 38.45 | 4.34 | 18.23 |
| Example Y37-1 | 10% CAZY7-1 | 90% equilibrium catalyst | 32.67 | 3.56 | 16.03 |
| Example Y37-2 | 10% CAZY7-2 | 90% equilibrium catalyst | 35.02 | 4.01 | 16.69 |
| Example Y38-1 | 10% CAZY8-1 | 90% equilibrium catalyst | 30.35 | 3.21 | 16.12 |
| Example Y38-2 | 10% CAZY8-2 | 90% equilibrium catalyst | 38.85 | 4.46 | 18.62 |
| Example Y39-1 | 10% CAZY9-1 | 90% equilibrium catalyst | 28.58 | 2.96 | 14.27 |
| Example Y39-2 | 10% CAZY9-2 | 90% equilibrium catalyst | 36.51 | 4.21 | 17.31 |
| Example Y40-1 | 10% CAZY10-1 | 90% equilibrium catalyst | 27.51 | 2.89 | 13.12 |
| Example Y40-2 | 10% CAZY10-2 | 90% equilibrium catalyst | 35.68 | 4.02 | 17.15 |
| Example Y41-1 | 10% CAZY11-1 | 90% equilibrium catalyst | 30.69 | 3.46 | 16.98 |
| Example Y41-2 | 10% CAZY11-2 | 90% equilibrium catalyst | 38.61 | 4.31 | 18.02 |
| Example Y42-1 | 10% CAZY12-1 | 90% equilibrium catalyst | 28.13 | 2.81 | 14.02 |
| Example Y42-2 | 10% CAZY12-2 | 90% equilibrium catalyst | 35.84 | 4.16 | 17.12 |
| Example Y43-1 | 10% CAZY13-1 | 90% equilibrium catalyst | 27.03 | 2.8 | 13.02 |
| Example Y43-2 | 10% CAZY13-2 | 90% equilibrium catalyst | 34.79 | 3.87 | 17 |
| Example Y44-1 | 10% CAZY14-1 | 90% equilibrium catalyst | 34.14 | 3.67 | 16.89 |
| Example Y44-2 | 10% CAZY14-2 | 90% equilibrium catalyst | 36.37 | 4.01 | 17.92 |
| Example Y45-1 | 10% CAZY15-1 | 90% equilibrium catalyst | 31.54 | 3.34 | 16.09 |
| Example Y45-2 | 10% CAZY15-2 | 90% equilibrium catalyst | 35.43 | 3.87 | 17.1 |
| Example Y46-1 | 10% CAZY16-1 | 90% equilibrium catalyst | 33.65 | 3.45 | 16.68 |
| Example Y46-2 | 10% CAZY16-2 | 90% equilibrium catalyst | 36.56 | 4.16 | 17.76 |
| Example Y47-1 | 10% CAZY17-1 | 90% equilibrium catalyst | 30.45 | 3.23 | 15.03 |
| Example Y47-2 | 10% CAZY17-2 | 90% equilibrium catalyst | 33.13 | 3.31 | 16.05 |

TABLE 8-continued

| | Catalyst | | Material balance, wt % | | |
|---|---|---|---|---|---|
| | | | Liquefied gas | Ethylene yield | Propylene yield |
| Example Y48-1 | 10% CAZY18-1 | 90% equilibrium catalyst | 34.16 | 3.65 | 16.69 |
| Example Y48-2 | 10% CAZY18-2 | 90% equilibrium catalyst | 37.57 | 4.16 | 17.53 |
| Example Y49-1 | 10% CAZY19-1 | 90% equilibrium catalyst | 31.34 | 3.23 | 15.13 |
| Example Y49-2 | 10% CAZY19-2 | 90% equilibrium catalyst | 33.74 | 3.87 | 16.12 |
| Example Y50-1 | 10% CAZY20-1 | 90% equilibrium catalyst | 32.07 | 3.36 | 15.78 |
| Example Y50-2 | 10% CAZY20-2 | 90% equilibrium catalyst | 34.46 | 3.89 | 16.54 |
| Example Y51-1 | 10% CAZY21-1 | 90% equilibrium catalyst | 28.67 | 3.12 | 15.68 |
| Example Y51-2 | 10% CAZY21-2 | 90% equilibrium catalyst | 36.13 | 4.13 | 17.58 |
| Example Y52-1 | 10% CAZY22-1 | 90% equilibrium catalyst | 26.89 | 2.78 | 13.95 |
| Example Y52-2 | 10% CAZY22-2 | 90% equilibrium catalyst | 34.68 | 4.01 | 16.35 |
| Example Y53-1 | 10% CAZY23-1 | 90% equilibrium catalyst | 26.56 | 2.59 | 12.69 |
| Example Y53-2 | 10% CAZY23-2 | 90% equilibrium catalyst | 34.12 | 3.87 | 16.02 |
| Example Y54-1 | 10% CAZY24-1 | 90% equilibrium catalyst | 28.95 | 3.24 | 16.12 |
| Example Y54-2 | 10% CAZY24-2 | 90% equilibrium catalyst | 36.59 | 4.14 | 17.28 |
| Example Y55-1 | 10% CAZY25-1 | 90% equilibrium catalyst | 27.02 | 2.65 | 13.61 |
| Example Y55-2 | 10% CAZY25-2 | 90% equilibrium catalyst | 33.72 | 4.01 | 16.47 |
| Example Y56-1 | 10% CAZY26-1 | 90% equilibrium catalyst | 26.23 | 2.67 | 12.71 |
| Example Y56-2 | 10% CAZY26-2 | 90% equilibrium catalyst | 33.61 | 3.78 | 16.13 |
| Example Y57-1 | 10% CAZY27-1 | 90% equilibrium catalyst | 28.68 | 3.12 | 15.45 |
| Example Y57-2 | 10% CAZY27-2 | 90% equilibrium catalyst | 36.23 | 4.34 | 18.01 |
| Example Y58-1 | 10% CAZY28-1 | 90% equilibrium catalyst | 26.46 | 2.46 | 13.43 |
| Example Y58-2 | 10% CAZY28-2 | 90% equilibrium catalyst | 34.87 | 4.13 | 16.73 |
| Example Y59-1 | 10% CAZY29-1 | 90% equilibrium catalyst | 26.24 | 2.46 | 13.01 |
| Example Y59-2 | 10% CAZY29-2 | 90% equilibrium catalyst | 33.62 | 3.74 | 16.35 |
| Example Y60-1 | 10% CAZY30-1 | 90% equilibrium catalyst | 28.89 | 3.17 | 15.78 |

TABLE 8-continued

|  | Catalyst | | Material balance, wt % | | |
|---|---|---|---|---|---|
|  |  |  | Liquefied gas | Ethylene yield | Propylene yield |
| Example Y60-2 | 10% CAZY30-2 | 90% equilibrium catalyst | 36.9 | 4.12 | 16.92 |
| Example Y61-1 | 10% CAZY31-1 | 90% equilibrium catalyst | 26.46 | 2.23 | 13.13 |
| Example Y61-2 | 10% CAZY31-2 | 90% equilibrium catalyst | 34.82 | 4.01 | 16.34 |
| Example Y62-1 | 10% CAZY32-1 | 90% equilibrium catalyst | 26.02 | 2.34 | 12.64 |
| Example Y62-2 | 10% CAZY32-2 | 90% equilibrium catalyst | 33.23 | 3.46 | 16.03 |
| Example Y63-1 | 10% CAZY33-1 | 90% equilibrium catalyst | 33.61 | 3.84 | 17.51 |
| Example Y63-2 | 10% CAZY33-2 | 90% equilibrium catalyst | 41.78 | 4.24 | 18.61 |
| Example Y64-1 | 10% CAZY34-1 | 90% equilibrium catalyst | 33.14 | 3.78 | 17.48 |
| Example Y64-2 | 10% CAZY34-2 | 90% equilibrium catalyst | 41.01 | 4.01 | 18.12 |
| Example Y65-1 | 10% CAZY35-1 | 90% equilibrium catalyst | 33.24 | 3.68 | 17.12 |
| Example Y65-2 | 10% CAZY35-2 | 90% equilibrium catalyst | 41.16 | 4.03 | 18.1 |
| Example Y66-1 | 10% CAZY36-1 | 90% equilibrium catalyst | 33.12 | 3.45 | 16.12 |
| Example Y66-2 | 10% CAZY36-2 | 90% equilibrium catalyst | 36.63 | 3.78 | 16.96 |
| Example Y67-1 | 10% CAZY37-1 | 90% equilibrium catalyst | 36.68 | 3.88 | 15.33 |
| Example Y67-2 | 10% CAZY37-2 | 90% equilibrium catalyst | 40.39 | 4.32 | 15.97 |
| Example Y68-1 | 10% CAZY38-1 | 90% equilibrium catalyst | 33.85 | 3.73 | 16.44 |
| Example Y68-2 | 10% CAZY38-2 | 90% equilibrium catalyst | 40.43 | 4.55 | 18.27 |
| Blank test example | / | 100% equilibrium catalyst | 18.54 | 1.39 | 8.05 |
| Comparative Example Y31-1 | 10% DCAZY1-1 | 90% equilibrium catalyst | 25.12 | 2.56 | 11.35 |
| Comparative Example Y31-2 | 10% DCAZY-2 | 90% equilibrium catalyst | 28.9 | 2.9 | 11.87 |
| Comparative Example Y32-1 | 10% DCAZY2-1 | 90% equilibrium catalyst | 24.68 | 2.45 | 11.01 |
| Comparative Example Y32-2 | 10% DCAZY2-2 | 90% equilibrium catalyst | 27.39 | 2.68 | 11.13 |
| Comparative Example Y33-1 | 10% DCAZY3-1 | 90% equilibrium catalyst | 22.76 | 2.31 | 11.03 |
| Comparative Example Y33-2 | 10% DCAZY3-2 | 90% equilibrium catalyst | 24.82 | 2.54 | 11.09 |
| Comparative Example Y34-1 | 10% DCAZY4-1 | 90% equilibrium catalyst | 24.79 | 2.67 | 11.37 |

TABLE 8-continued

| | Catalyst | | Material balance, wt % | | |
|---|---|---|---|---|---|
| | | | Liquefied gas | Ethylene yield | Propylene yield |
| Comparative Example Y34-2 | 10% DCAZY4-2 | 90% equilibrium catalyst | 26.86 | 2.81 | 11.8 |
| Comparative Example Y35-1 | 10% DCAZY5-1 | 90% equilibrium catalyst | 23.09 | 2.42 | 11.12 |
| Comparative Example Y35-2 | 10% DCAZY5-2 | 90% equilibrium catalyst | 23.34 | 2.5 | 11.21 |
| Comparative Example Y36-1 | 10% DCAZY6-1 | 90% equilibrium catalyst | 25.78 | 2.79 | 13.74 |
| Comparative Example Y36-2 | 10% DCAZY6-2 | 90% equilibrium catalyst | 27.8 | 2.98 | 14.12 |
| Comparative Example Y37-1 | 10% DCAZY7-1 | 90% equilibrium catalyst | 23.69 | 2.62 | 11.82 |
| Comparative Example Y37-2 | 10% DCAZY7-2 | 90% equilibrium catalyst | 25.52 | 2.81 | 11.99 |
| Comparative Example Y44-1 | 10% DCAZY14-1 | 90% equilibrium catalyst | 23.65 | 2.74 | 10.86 |
| Comparative Example Y44-2 | 10% DCAZY14-2 | 90% equilibrium catalyst | 27.02 | 2.8 | 11.23 |
| Comparative Example Y45-1 | 10% DCAZY15-1 | 90% equilibrium catalyst | 23.62 | 2.34 | 10.68 |
| Comparative Example Y45-2 | 10% DCAZY15-2 | 90% equilibrium catalyst | 25.6 | 2.45 | 11.03 |
| Comparative Example Y46-1 | 10% DCAZY16-1 | 90% equilibrium catalyst | 23.95 | 2.48 | 11.02 |
| Comparative Example Y46-2 | 10% DCAZY16-2 | 90% equilibrium catalyst | 25.84 | 2.67 | 11.43 |
| Comparative Example Y47-1 | 10% DCAZY17-1 | 90% equilibrium catalyst | 22.68 | 2.28 | 11.03 |
| Comparative Example Y47-2 | 10% DCAZY17-2 | 90% equilibrium catalyst | 23.12 | 2.34 | 11.11 |
| Comparative Example Y48-1 | 10% DCAZY18-1 | 90% equilibrium catalyst | 23.46 | 2.56 | 12.83 |
| Comparative Example Y48-2 | 10% DCAZY18-2 | 90% equilibrium catalyst | 26.12 | 2.84 | 13.69 |
| Comparative Example Y49-1 | 10% DCAZY19-1 | 90% equilibrium catalyst | 22.17 | 2.53 | 11.23 |
| Comparative Example Y49-2 | 10% DCAZY19-2 | 90% equilibrium catalyst | 24.79 | 2.67 | 11.79 |
| Comparative Example Y50-1 | 10% DCAZY20-1 | 90% equilibrium catalyst | 22.73 | 2.87 | 11.63 |
| Comparative Example Y50-2 | 10% DCAZY20-2 | 90% equilibrium catalyst | 24.56 | 2.69 | 11.98 |
| Comparative Example Y66-1 | 10% DCAZY36-1 | 90% equilibrium catalyst | 22.76 | 2.35 | 11.17 |
| Comparative Example Y66-2 | 10% DCAZY36-2 | 90% equilibrium catalyst | 25.56 | 3.02 | 12.23 |
| Comparative Example Y67-1 | 10% DCAZY37-1 | 90% equilibrium catalyst | 25.93 | 2.61 | 11.35 |
| Comparative Example Y67-2 | 10% DCAZY37-2 | 90% equilibrium catalyst | 28.99 | 2.97 | 11.99 |

TABLE 8-continued

| Catalyst | | Material balance, wt % | | |
|---|---|---|---|---|
| | | Liquefied gas | Ethylene yield | Propylene yield |
| Comparative Example Y68-1 | 10% DCAZY38-1 | 90% equilibrium catalyst | 27.35 | 2.77 | 11.79 |
| Comparative Example Y68-2 | 10% DCAZY38-2 | 90% equilibrium catalyst | 28.52 | 2.93 | 12.68 |

It was identical to Example Y69-1, except that the comparative catalytic cracking catalysts DCAZY1-1 and DCAZY1-2 of Comparative Example Y31-1 and Comparative Example Y31-2 were used respectively.

The weight composition and the reaction result of each catalyst mixture containing the catalytic cracking catalyst comparative sample were shown in Table 9.

Example Y70-1 and Example Y70-2

In Example Y70-1 and Example Y70-2 were respectively used the catalytic cracking catalysts CAZY14-1 and CAZY14-2 of Example Y44-1 and Example Y44-2. The feedstock oil for catalytic cracking was the naphtha shown in Table 5.

The evaluation condition included the reaction temperature of 620° C., the regeneration temperature of 620° C., and the catalyst-oil ratio of 3.2.

Table 9 showed the weight composition and the reaction result of each catalyst mixture containing the catalytic cracking catalyst.

Comparative Example Y70-1 and Comparative Example Y70-2

It was identical to Example Y70-1, except that the comparative catalytic cracking catalysts DCAZY14-1 and DCAZY14-2 of Comparative Example Y44-1 and Comparative Example Y44-2 were used respectively.

The weight composition and the reaction result of each catalyst mixture containing the catalytic cracking catalyst comparative sample were shown in Table 9.

TABLE 9

| Catalyst | | Cracked gas product yield/wt % | |
|---|---|---|---|
| | | Liquefied gas | Propylene yield |
| Blank test example | / | 100% equilibrium catalyst | 69.13 | 8.42 |
| Example Y69-1 | 10% CAZY1-1 | 90% equilibrium catalyst | 78.82 | 13.56 |
| Example Y69-2 | 10% CAZY1-2 | 90% equilibrium catalyst | 82.56 | 15.12 |
| Comparative Example Y69-1 | 10% DCAZY1-1 | 90% equilibrium catalyst | 70.59 | 9.5 |
| Comparative Example Y69-2 | 10% DCAZY1-2 | 90% equilibrium catalyst | 73.49 | 10.12 |
| Example Y70-1 | 10% CAZY14-1 | 90% equilibrium catalyst | 77.83 | 14.01 |
| Example Y70-2 | 10% CAZY14-2 | 90% equilibrium catalyst | 83.12 | 15.18 |
| Comparative Example Y70-1 | 10% DCAZY14-1 | 90% equilibrium catalyst | 71.72 | 9.56 |

TABLE 9-continued

| Catalyst | | Cracked gas product yield/wt % | |
|---|---|---|---|
| | | Liquefied gas | Propylene yield |
| Comparative Example Y70-2 | 10% DCAZY14-2 | 90% equilibrium catalyst | 73.05 | 10.12 |

Example Y71-1

It was identical to Example Y31-1, except that the Y zeolite (PSRY) was replaced with HRY-1 to produce a catalyst sample, which was denoted as CAZY39-1. Its evaluation was identical to that of Example Y31-1, and the result was shown in Table 10.

Example Y71-2

It was identical to Example Y31-1, except that the Y zeolite (PSRY) was replaced with HRY-1 to produce a catalyst sample, which was denoted as CAZY39-2. Its evaluation was identical to that of Example Y31-1, and the result was shown in Table 10.

Comparative Example Y71-1

It was identical to Example Y31-1, except that the Y zeolite (PSRY) was replaced with HRY-1 to produce a catalyst comparative sample, which was denoted as DCAZY39-1. Its evaluation was identical to that of Example Y31-1, and the result was shown in Table 10.

Comparative Example Y71-2

It was identical to Example Y31-1, except that the Y zeolite (PSRY) was replaced with HRY-1 to produce a catalyst comparative sample, which was denoted as DCAZY39-2. Its evaluation was identical to that of Example Y31-1, and the result was shown in Table 10.

TABLE 10

| Item | Material balance, wt % | | |
|---|---|---|---|
| | Liquefied gas | Ethylene yield | Propylene yield |
| Blank test example | 18.54 | 1.39 | 8.05 |
| Example Y71-1 | 36.75 | 3.98 | 16.87 |
| Example Y71-2 | 39.43 | 4.45 | 17.95 |
| Comparative Example Y71-1 | 25.58 | 2.89 | 11.96 |

TABLE 10-continued

| Item | Material balance, wt % | | |
|---|---|---|---|
| | Liquefied gas | Ethylene yield | Propylene yield |
| Comparative Example Y71-2 | 26.84 | 2.98 | 12.23 |

The invention claimed is:

1. A phosphorus-modified MFI-structured molecular sieve having a K value that satisfies 70%≤K≤90%;
wherein K=P1/P2×100%,
P1 is a mass content of phosphorus within a region having an area of 100 square nanometers and a vertical depth from 0 to 2 nm at any crystal surface of a crystal grain of the molecular sieve, as measured by an XPS method, and
P2 is a mass content of phosphorus within a region having an area of 100 square nanometers and a vertical depth from 5 to 10 nm at any crystal surface of the crystal grain of the molecular sieve, as measured by an EPMA method.

2. The molecular sieve according to claim 1, wherein the molar ratio of the phosphorus content as $P_2O_5$ to the alumina content is ≥0.01.

3. The molecular sieve according to claim 1, wherein the phosphorus-modified MFI-structured molecular sieve is a micropore ZSM-5 molecular sieve or a hierarchical ZSM-5 molecular sieve.

4. The molecular sieve according to claim 1, wherein the micropore ZSM-5 molecular sieve has a silica/alumina molar ratio of 15-1000.

5. The molecular sieve according to claim 3, wherein the hierarchical ZSM-5 molecular sieve has a proportion of the mesopore volume relative to the total pore volume of greater than 10%, an average pore diameter of 2-20 nm, and a silica/alumina molar ratio of 15-1000.

6. A catalytic cracking auxiliary, based on the dry basis of the catalytic cracking auxiliary, containing 5-75 wt % of the phosphorus-modified MFI-structured molecular sieve according to claim 1, 1-40 wt % of a binder and 0-65 wt % of a second clay.

7. A catalytic cracking catalyst containing phosphorus-modified MFI-structured molecular sieve, based on the dry basis of the catalyst, containing 1-25 wt % of Y zeolite, 5-50 wt % of the phosphorus-modified MFI-structured molecular sieve according to claim 1, 1-60 wt % of an inorganic binder and optionally 0-60 wt % of a second clay.

8. A process of preparing the catalytic cracking auxiliary according to claim 6, comprising mixing the phosphorus-modified MFI-structured molecular sieve, a binder, optionally a second clay and water, and spray-drying the mixture to produce the catalytic cracking auxiliary.

9. The process of preparing the catalytic cracking auxiliary according to claim 8, wherein the binder comprises a phosphorus-aluminum inorganic binder.

10. The process of preparing the catalytic cracking auxiliary according to claim 8, wherein based on the total weight of the catalytic cracking auxiliary, the binder, based on the dry weight, contains 3-39 wt % of the phosphorus-aluminum inorganic binder and 1-30 wt % of one or more additional inorganic binders.

11. The process of preparing the catalytic cracking auxiliary according to claim 10, wherein the one or more additional inorganic binders is selected from pseudo-boehmite, alumina sol, silica-alumina sol, and water glass.

12. The process of preparing the catalytic cracking auxiliary according to claim 11, further comprising: subjecting the spray-dried catalytic cracking auxiliary to a first calcining, and then washing, and optionally drying to produce the catalytic cracking auxiliary, wherein the first calcining is carried out at 300-650° C. for 0.5-8h; and the drying is carried out at 100-200° C. for 0.5-24h.

13. A process of preparing the catalytic cracking catalyst according to claim 7, comprising mixing a Y zeolite, the phosphorus-modified MFI-structured molecular sieve, an inorganic binder, optionally a second clay, and water, and spray-drying the mixture to produce the catalytic cracking catalyst.

14. The process of preparing the catalytic cracking catalyst according to claim 13, wherein the inorganic binder comprises a phosphorus-aluminum inorganic binder.

15. The process of preparing the catalytic cracking catalyst according to claim 13, wherein based on the catalytic cracking catalyst, the inorganic binder comprises on the dry basis 3-39 wt % of the phosphorus-aluminum inorganic binder and on the dry basis 1-30 wt % of at least one additional inorganic binder selected from pseudo-boehmite, alumina sol, silica-alumina sol, and water glass.

16. The process of preparing the catalytic cracking catalyst according to claim 15, further comprising subjecting the spray-dried catalytic cracking catalyst to a first calcining, and then washing, and optionally drying to produce the catalytic cracking catalyst, wherein the first calcining is carried out at 300-650° C. for 0.5-8h; and the drying is carried out at 100-200° C. for 0.5-24h.

17. A process for catalytically cracking a hydrocarbon oil, comprising: contacting a catalyst comprising the catalytic cracking auxiliary according to claim 6 with the hydrocarbon oil under a catalytic cracking condition.

18. The process for catalytically cracking the hydrocarbon oil according to claim 17, wherein the catalyst further comprises a catalytic cracking catalyst, and the content of the catalytic cracking auxiliary is 0.1-30 wt %.

19. The process for catalytically cracking the hydrocarbon oil according to claim 17, wherein the catalytic cracking condition includes: the reaction temperature is 500-800° C.; the hydrocarbon oil is one or more selected from crude oil, naphtha, gasoline, atmospheric residue, vacuum residue, atmospheric gas oil, vacuum gas oil, straight-run gas oil, propane light/heavy deasphalted oil, coker gas oil and coal liquefication product.

20. A process of preparing a phosphorus-modified MFI-structured molecular sieve having a K value that satisfies 70%≤K≤90%, comprising:
mixing an aqueous solution of the phosphorus-containing compound and an MFI-structured molecular sieve when they are at substantially the same temperature for at least 0.1 hours, drying, and calcining at 200-600° C. in air or steam for at least 0.1 hours, the substantially same temperature is in the range of 70-150° C.; or,
mixing and stirring a phosphorus-containing compound, an MFI-structured molecular sieve and water, adjusting the temperature to 70-150° C., 40-150° C., maintaining for at least 0.1 hours, drying, and calcining at 200-600° C. in air or steam for at least 0.1 hours,
wherein K=P1/P2×100%,
P1 is a mass content of phosphorus within a region having an area of 100 square nanometers and a vertical depth from 0 to 2 nm at a crystal surface of the crystal grain of a molecular sieve, as measured by an XPS method, and P2 is a mass content of phosphorus within a region having an area of 100 square nanometers and a vertical depth from 5 to 10 nm at a crystal surface of the crystal grain of a molecular sieve, as measured by an EPMA method.

21. The process of preparing the phosphorus-modified MFI-structured molecular sieve according to claim 20, wherein the phosphorus-containing compound is selected from organic phosphorous compounds and/or inorganic phosphorous compounds; the organic phosphorous compound is selected from trimethyl phosphate, triphenylphosphine, trimethyl phosphite, tetrabutylphosphonium bromide, tetrabutylphosphonium chloride, tetrabutylphosphonium hydroxide, triphenylethylphosphonium bromide, triphenylbutylphosphonium bromide, triphenylbenzylphosphonium bromide, hexamethylphosphoric triamide, dibenzyl diethylphosphoramidite, 1,3-bis((triethyl-phosphaneyl)methyl)benzene, the inorganic phosphorous compound is selected from phosphoric acid, ammonium hydrogen phosphate, diammonium hydrogen phosphate, ammonium phosphate, and boron phosphate.

22. The process of preparing the phosphorus-modified MFI-structured molecular sieve according to claim 21, wherein the molar ratio of the phosphorus-containing compound (as phosphorus) (as oxide) to the MFI-structured molecular sieve (as aluminum) (as oxide) is 0.01-2.

23. The process of preparing the phosphorus-modified MFI-structured molecular sieve according to claim 22, wherein the phosphorus-containing compound is a mixture of boron phosphate and one or more selected from trimethyl phosphate, triphenylphosphine, trimethyl phosphite, phosphoric acid, ammonium hydrogen phosphate, diammonium hydrogen phosphate, and ammonium phosphate, with the proviso that the mixture contains boron phosphate of 10%-80% by weight.

24. The process of preparing the phosphorus-modified MFI-structured molecular sieve according to claim 23, wherein the weight ratio of water/molecular sieve is 0.5-1, and the contacting time is 0.5-40 hours.

25. The process of preparing the phosphorus-modified MFI-structured molecular sieve according to claim 24, wherein the calcining is performed at 450-550° C. in steam.

26. The process of preparing the phosphorus-modified MFI-structured molecular sieve according to claim 20, comprising mixing an aqueous solution of the phosphorus-containing compound at a temperature of 70-130° C. and an MFI-structured molecular sieve at 70-130° C. at substantially the same temperature for at least 0.1 hours, drying, and calcining at 200-600° C. in air or steam for at least 0.1 hours; or, mixing and stirring a phosphorus-containing compound, an MFI-structured molecular sieve and water, adjusting the temperature to 40-150° C., maintaining for at least 0.1 hours, drying, and calcining at 200-600° C. in air or steam for at least 0.1 hours.

27. A process of preparing a phosphorus-modified MFI-structured molecular sieve, comprising:

mixing an aqueous solution of the phosphorus-containing compound at a temperature of 40-150° C., and an MFI-structured molecular sieve when they are at substantially the same temperature for at least 0.1 hours, drying, and calcining at 200-600° C. in air or steam for at least 0.1 hours, the substantially same temperature is in the range of 40-150° C.;

or, mixing and stirring a phosphorus-containing compound, an MFI-structured molecular sieve and water, adjusting the temperature to 40-150° C., maintaining for at least 0.1 hours, drying, and calcining at 200-600° C. in air or steam for at least 0.1 hours, wherein the phosphorus-containing compound is a mixture of boron phosphate and one or more selected from trimethyl phosphate, triphenylphosphine, trimethyl phosphite, phosphoric acid, ammonium hydrogen phosphate, diammonium hydrogen phosphate, and ammonium phosphate, in the mixture, boron phosphate comprises 10%-80% by weight.

* * * * *